(12) United States Patent
Koide et al.

(10) Patent No.: US 7,328,258 B2
(45) Date of Patent: Feb. 5, 2008

(54) DATA COMMUNICATION METHOD, DATA COMMUNICATION APPARATUS, DATA COMMUNICATION SYSTEM AND STORAGE MEDIUM

(75) Inventors: Masami Koide, Tokyo (JP); Akira Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 810 days.

(21) Appl. No.: 10/662,532

(22) Filed: Sep. 16, 2003

(65) Prior Publication Data

US 2004/0148378 A1  Jul. 29, 2004

(30) Foreign Application Priority Data

Sep. 19, 2002   (JP)   ............... 2002-274000

(51) Int. Cl.
*G06F 15/173* (2006.01)
*G06F 15/16* (2006.01)

(52) U.S. Cl. ............ 709/223; 709/203; 709/204; 709/218

(58) Field of Classification Search ......... 709/203, 709/204, 218, 223
See application file for complete search history.

(56) References Cited

U.S. PATENT DOCUMENTS

| | | | |
|---|---|---|---|
| 4,947,202 A | | 8/1990 | Kitajima et al. |
| 5,069,543 A | | 12/1991 | Kitajima et al. |
| 5,581,702 A | * | 12/1996 | McArdle et al. ............ 709/204 |
| 5,619,301 A | | 4/1997 | Suzuki et al. |
| 5,729,678 A | * | 3/1998 | Hunt et al. .................. 714/43 |
| 5,760,896 A | | 6/1998 | Suzuki |
| 5,799,151 A | * | 8/1998 | Hoffer ........................ 709/204 |
| 5,859,974 A | * | 1/1999 | McArdle et al. ............ 709/204 |
| 6,426,773 B1 | | 7/2002 | Suzuki |

(Continued)

FOREIGN PATENT DOCUMENTS

JP   5-207212   8/1993

(Continued)

OTHER PUBLICATIONS

U.S. Appl. No. 11/580,128, filed Oct. 13, 2006, Suzuki et al.

(Continued)

*Primary Examiner*—Ario Etienne
*Assistant Examiner*—Sargon N Nano
(74) *Attorney, Agent, or Firm*—Oblon, Spivak, McClelland, Maier & Neustadt, P.C.

(57) ABSTRACT

A data communication method is used to exchange data among a plurality of computers which are mutually coupled via a network. Each of the computers has a program which causes the computer to have a communicating function to transmit and receive data to and from one or more other computers, a data processing function to process data which are transmitted and received, and an output function to output data to an output section depending on a process of the data processing function. The data communication method includes a storing step to store data received by the communicating function by the data processing function in one computer when receiving data from one or more other computers by the communicating function, and a mode judging step to judge whether or not to output the received data to the output function of the one computer depending on a mode attribute of the received data and a communication mode of the one computer.

31 Claims, 36 Drawing Sheets

U.S. PATENT DOCUMENTS

| | | | |
|---|---|---|---|
| 6,584,493 B1* | 6/2003 | Butler | 709/204 |
| 6,608,820 B1* | 8/2003 | Bradshaw, Jr. | 370/260 |
| 6,609,148 B1* | 8/2003 | Salo et al. | 709/217 |
| 6,630,951 B1 | 10/2003 | Suzuki | |
| 6,668,048 B1* | 12/2003 | Suga et al. | 379/202.01 |
| 6,728,784 B1* | 4/2004 | Mattaway | 709/245 |
| 6,819,752 B2* | 11/2004 | Raniere et al. | 379/202.01 |
| 7,124,372 B2* | 10/2006 | Brin | 715/751 |
| 7,167,182 B2* | 1/2007 | Butler | 345/537 |
| 7,215,752 B2* | 5/2007 | Raniere et al. | 379/202.01 |
| 2002/0061098 A1* | 5/2002 | Raniere et al. | 379/202.01 |
| 2002/0118095 A1* | 8/2002 | Estes | 340/5.6 |
| 2003/0001890 A1* | 1/2003 | Brin | 345/753 |
| 2004/0148378 A1 | 7/2004 | Koide et al. | |
| 2007/0126855 A1* | 6/2007 | Raniere et al. | 348/14.01 |

FOREIGN PATENT DOCUMENTS

| | | |
|---|---|---|
| JP | 6-165171 | 6/1994 |
| JP | 2000-236329 | 8/2000 |

OTHER PUBLICATIONS

U.S. Appl. No. 11/495,669, filed Jul. 31, 2006, Mori et al.
U.S. Appl. No. 10/662,532, filed Sep. 16, 2003, Koide et al.
U.S. Appl. No. 11/183,861, filed Jul. 19, 2005, Hasegawa et al.

* cited by examiner

FIG.5

| OPERATION | EXPANSION PROGRAM | CORRESPONDING TAG |
|---|---|---|
| TEXT DISPLAY | Text Panel | TEXT |
| IMAGE DISPLAY | Image Panel | IMAGE |
| ANIMATION DISPLAY | Movie Panel | MOVIE |
| 3D DISPLAY | 3D Panel | 3D |
| ⋮ | ⋮ | ⋮ |

```
<DOCUMENT>          ← TAG

<TEXT>    MINUTES OF MEETING  <TEXT/>   ← ELEMENT CONTENTS

<TEXT FILE= "BODY, TEXT"/>
                                            ← ATTRIBUTE

<IMAGE FILE= "IMAGE, JPG"  X="100" Y="10"
     WIDTH= "100" HIGH= "100"/>

</DOCUMENT>
```

| ID | NETWORK ADDRESS | PORT | TITLE | VERSION | USER NAME |
|---|---|---|---|---|---|
| 402 | 403 | 404 | 405 | 406 | 407 |

401

S401 — PRESS COMMUNICATION BUTTON

S402 — LIST SERVER ALREADY STARTED IN TERMINAL?

NO → S403 — START LIST SERVER (PORT 5000)

YES →

S404 — DETERMINE RECEIVE PORT

S405 — BROADCAST ID INFORMATION TO NETWORK (TO PORT 5000)

S406 — AWAIT COMMUNICATION FROM LIST SERVER/ OTHER DOCUMENTS

FIG.39
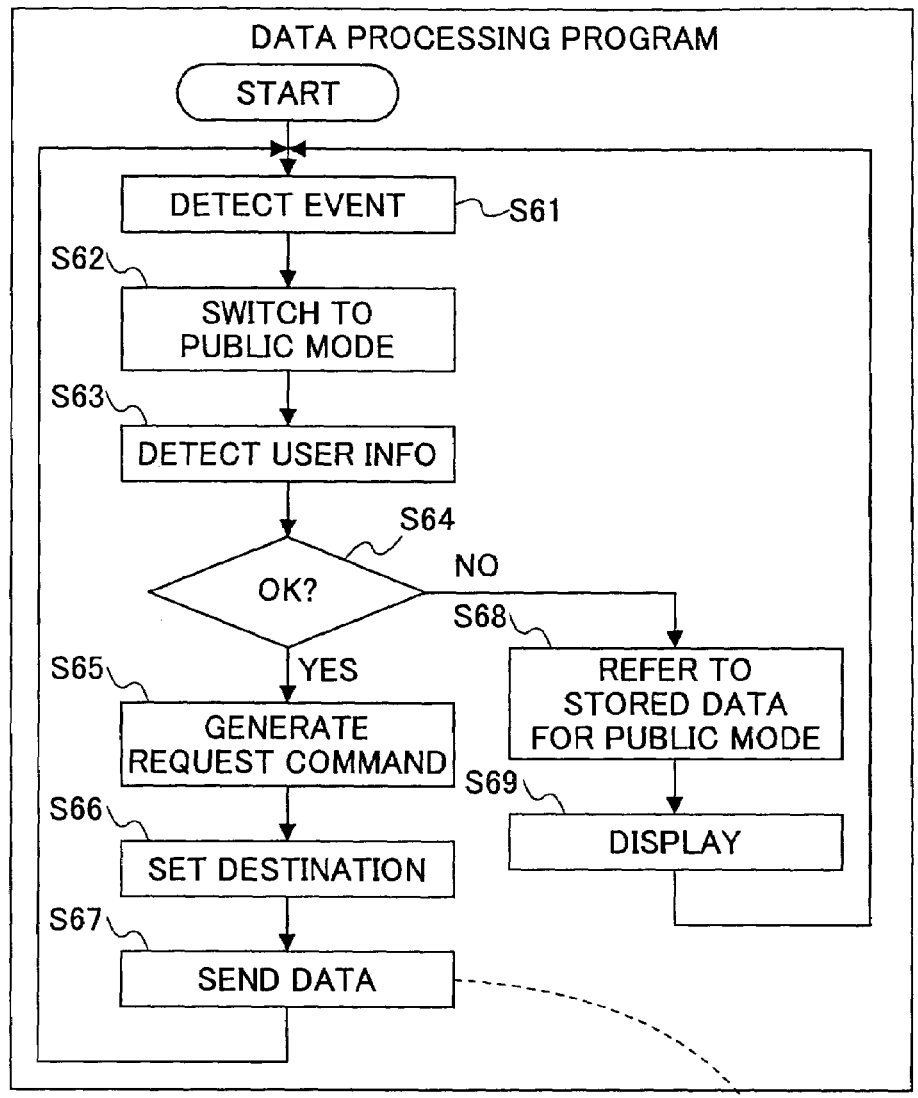
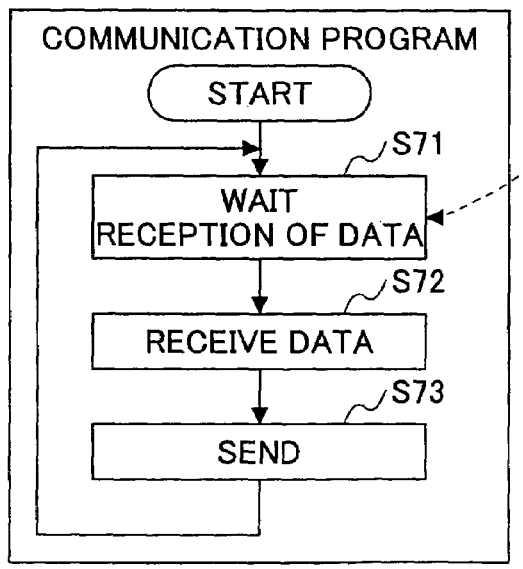

DATA COMMUNICATION METHOD, DATA COMMUNICATION APPARATUS, DATA COMMUNICATION SYSTEM AND STORAGE MEDIUM

BACKGROUND OF THE INVENTION

This application claims the benefit of a Japanese Patent Application No. 2002-274000 filed Sep. 19, 2002, in the Japanese Patent Office, the disclosure of which is hereby incorporated by reference.

1. Field of the Invention

The present invention generally relates to data communication methods, data communication apparatuses, data communication systems and storage media, and more particularly to a data communication method, a data communication apparatus and a data communication system which are suited for application to conferencing systems, presentation systems and the like, and to a computer-readable storage medium which stores a computer program for causing a computer to make a data communication according to such a data communication method.

2. Description of the Related Art

Presently, when making a general presentation, a presenter speaks unilaterally to listeners during the presentation. The presentation is made using a projector, a large-screen display or the like in most cases. When no reference materials are distributed for the presentation, the listener can only obtain information by watching the information displayed by the projector, large-screen display or the like.

When no reference materials are distributed for the presentation, there are problems in that the listener cannot see in advance the contents of slides which will be displayed so as to familiarize himself to the contents of the presentation, the listener cannot check in advance the portions of the presentation which are particularly of interest, and the listener cannot see the contents of the slides which have already been displayed. In addition, when the question-answer time comes after the presentation ends, the questioner may forget the slide with respect to which the questioner intended to question. Moreover, the presenter may not be able to quickly display the slide which is related to the question posed by the questioner, thereby wasting valuable question-answer time due to the troublesome operation required by the presenter to locate and display the related slide.

Some of the problems described above may be eliminated by distributing print-outs of the slides as the reference materials. For example, the listener (or questioner) may check the contents of the slide which is different from the slide which is presently being displayed by the presenter. The listener (or questioner) may also check the contents of the slide he does not understand or has questions on. However, the questioner normally cannot directly specify the slide, and the presenter must display the slide in question by listening to the questions made by the questioner. However, since the presenter must select the slide in question based on verbal communication with the questioner, it usually takes time for the presenter to select the correct slide particularly when the questions of the questioner are not clearly communicated to the presenter. In addition, after the correct-slide is selected and displayed, it is even more difficult to correctly communicate the questions of the questioner to the presenter if the questioner intends to pose questions on a portion of a figure included in the slide, for example.

On the other hand, in a conference situation, materials to be used for the discussions are distributed, and one of the participants acts as the chairman of the conference. The discussions are made based on the distributed materials, but when a speaker talks on a specific page of the materials, it may be unclear to the other participants (listeners) which page is being referred to. In this case, the listener will either keep silent and pretend he understands or, the listener must ask the speaker or the other participants which page is being referred to. However, when the speaker is interrupted directly, the speaker may feel uneasy by the interruption, and the speaker may loose concentration and forget where to restart the talk. Even when the speaker is interrupted indirectly, that is, when the listener asks another participant, the speaker may also feel uneasy by the interruption, and the speaker may loose concentration and forget where to restart the talk. Moreover, the listener who is trying to find out which portion of the materials is being discussed may not be able to catch up with the talk of the speaker and become lost because the talk proceeds while the listener is trying to find out.

Therefore, the listener can hardly understand the contents of the talk if the listener does not ask and find out which page of the materials is being discussed, but the discussions will be interrupted and will not proceed smoothly if the listener asks to find out which page of the materials is being discussed, and the latter may make the speaker and the other participants feel uneasy. When the listener asks another participant, this participant's thinking will be interrupted and this participant may become unable to catch up with the talk of the speaker and become lost.

Furthermore, when the materials include tables and graphs and the speaker wishes to discuss a numerical value in the table or graph, it is very difficult to quickly and accurately communicate the speaker's intentions to all of the listeners.

When holding the conference, the participants actively speak in most cases. Hence, if the intentions of the speaker are not accurately communicated to all of the listeners (or participants), the discussion cannot proceed as desired. It may be regarded that the discussion will proceed smoothly if the page, the numerical value in the table or graph, and the like of the materials can be instantaneously and accurately communicated to all of the participants of the conference.

Recently, various conference systems and presentation systems have been proposed, which do not print out materials to be distributed for the conference or presentation, but treats the materials in the form of electronic data (digital information) which can be inspected by the participants. Basically, most of these proposed systems employ a client-server system. Generally, the client-server system includes one or a plurality of server machines for providing one or more services, and one or a plurality of client machines for receiving the services provided by the one or plurality of server machines. Usually, a large number of client machines receive the services from a small number of server machines in the client-server system.

The client-server system was designed on the basis that, virtually all of the processes are carried out by the server machine having a high performance, and the client machine having a low performance merely receives results of the processes carried out by the server machine. However, due to recent technical progresses made, the difference between the performances of the server machine and the client machine is rapidly decreasing. In addition, due to improved processing capabilities and reduced size and weight of portable computers such as lap-top personal computers, it has become popular for the participant of the conference to bring the lap-top personal computer and take notes using the lap-top personal computer.

Due to these recent changes in the environment, the problems of the conventional client-server system which distinguishes the functions of the server machine and the client machine have become more notable.

First, in the client-server type conference system, the cost of the system is extremely high in most cases due to the complexity of the system structure, and the maintenance of the server and client machines become necessary. Accordingly, in the case of the conference system having a plurality of machines connected to each other, it is more convenient to employ a peer-to-peer network structure which does not require intervention of an exclusive server machine than to employ the client-server system which has the complex system structure. The advantages of employing the peer-to-peer network structure are evident because the location of the conference will not be limited, thereby making it possible to hold the conference at a location where the connection to the exclusive server machine is impossible, as long as the network environment exists. In addition, the peer-to-peer network structure does not require the exclusive server machine which is expensive and does not require the troublesome and costly maintenance of the exclusive server machine.

In addition, in a system in which a plurality of client machines exclusively for information inspection are connected to the server machine exclusively for conference via a network, there is a case where the server machine distributes the information centrally managed thereby so that the information displayed on each client machine becomes the same, and there is a case where the client machine sends a request for a file in the server machine and inspects the file.

In the case where the information is distributed from the server machine, the client machine cannot manipulate the information, and there are problems in that user (participant) of the client machine cannot individually look back at previous information or check the next information (page). In both cases where the information is distributed from the server machine and the client machine inspects the file of the server machine, all of the participants are referring to the same information on the respective client machines, and basically, the information cannot be manipulated from the client machine. Hence, the client machine cannot take an action with respect to the information, such as adding or deleting comments with respect to the speech or data. Even if it were possible to manipulate the information from the client machine to a certain extent, this would require the client machine to first acquire the control right to manipulate the information, thereby making the operation complex and difficult for a seamless discussion to continue. In other words, in the client-server type conference system, the displayed information is always the information which is inspected by all of the participants (client machine) of the conference. Hence, it is impossible to take personal action on the client machines, such as writing personal data or information on each client machine, and exchanging data in a 1:1 communication between two client machines.

In the case of the conference which distributes the printouts of the materials, the participants can listen to the speaker, and at the same time, take personal action such as taking personal notes, referring to a page different from the page referred to by the speaker, and confirming the materials with another participant. Because it is possible to take such a personal action, the participant can acquire and confirm the necessary information without feeling stress.

Therefore, in order to realize a smooth conferencing, the present inventors have found it is essential to realize a technique which can clearly distinguish and effectively process three kinds of information, namely, public information to be inspected by all of the participants, local information (or personal information) for personal use, and private information to be exchanged between specific participants. However, such a desirable technique has not yet been proposed.

A Japanese Laid-Open Patent Application No. 2000-236329 proposes a system which enables the operation of a terminal by each corresponding participant of the conference, and displays personally. held information on a common display unit, so as to share the information. In this proposed system, the common display unit handles the public information, and the terminal handles the local information personally held by the participant. However, there is a problem in that this proposed system requires the provision of the common display unit exclusively for sharing the information.

A Japanese Laid-Open Patent Application No. 5-207212 proposes a telewriting system which exchanges and displays data between two remote terminals. A mode is provided to additionally write with respect to a document, and another mode is provided to manipulate the document. The two modes are appropriately switched so as to smoothly exchange the information between the two remote terminals. However, this proposed system cannot distinguish the public information and the local information, and merely attempts to smoothen the exchange of the public information.

A Japanese Laid-Open Patent Application No. 6-165171 proposes a still image conference system which is provided with a local plotting mode, and distinguishes the public information and the local information. According to this proposed system, the local information, such as personal notes, is written in the local plotting mode and managed as a local file, and the local information and the public information are distinguished by taking measures so that the local information is not transmitted to another terminal.

According to the still image conference system proposed in the Japanese Laid-Open Patent Application No. 6-165171, however, the mode is distinguished at the time of the transmission, but no measures are proposed for the time of the reception, such as when receiving information from another terminal when writing the local information such as the personal notes. Moreover, the local plotting mode is prepared only with respect to the additional writing, and no measures are proposed for other actions.

Therefore, the systems proposed in the Japanese Laid-Open Patent Applications No. 2000-236329, No. 5-207212 and No. 6-165171 do not distinguish and tread the public information which is inspected by all of the participants of the conference, the local information which is personally used by the participant, and the private information which is exchanged between the specific participants. The participants of the conference basically inspect only the public information, and it is difficult to inspect the local information and the private information. As a result, the conference may be interrupted by the participant who wishes to personally look back at the materials, and the participant may lack full understanding of the proceedings because the local information cannot be personally obtained.

As described above, in order to realize a smooth conferencing, the present inventors have found it is essential to clearly distinguish and effectively process three kinds of information, namely, the public information, the local information (or personal information), and the private information, because the participant of the conference usually wishes to confirm unclear portions of the proceedings by obtaining the local information and exchange information with specific participants by obtaining the private information, in addition to inspecting the public information. Therefore, the three kinds of information are essential to holding a conference which is useful to all of the participants. However, as described above, no proposals have yet been made to clearly distinguish the three kinds of information.

SUMMARY OF THE INVENTION

Accordingly, it is a general object of the present invention to provide a novel and useful data communication method, data communication apparatus, data communication system and computer-readable storage medium, in which the problems described above are eliminated.

Another and more specific object of the present invention is to provide a data communication method, a data communication apparatus, a data communication system and a computer-readable storage medium which can distinguish public information, local information and private information, and also effectively and efficiently process such information, so that the problems of the conventional presentation and conference and the problems of the client-server type presentation or conference system are eliminated, and flexible exchange of digital information is made possible.

Still another and more specific object of the present invention is to enable the public information and the local information to be distinguished from each other, and at the same time, enable the public information to be received while making a local operation.

A further specific object of the present invention is to provide a private mode for transmitting and receiving information with a specific computer, in addition to a public mode and a local mode, so as to enable receiving all public information transmitted during the private mode.

Another specific object of the present invention is to enable information to be transmitted in the public mode without requiring the user to perform a transmitting operation such as pushing a transmit button.

Still another specific object of the present invention is not to affect displays of other computers during the local mode.

A further specific object of the present invention is to enable quick switching to a mode which transmits and receives information with a specific computer.

Another specific object of the present invention is to enable the user to freely switch the mode.

Still another specific object of the present invention is to enable an operation to be quickly continued after the mode is returned to the original mode.

A further object of the present invention is to provide a data communication method for exchanging data among a plurality of computers which are mutually coupled via a network, each of the computers comprising a program which causes the computer to have a communicating function to transmit and receive data to and from one or more other computers, a data processing function to process data which are transmitted and received, and an output function to output data to an output section depending on a process of the data processing function, the data communication method comprising a storing step to store data received by the communicating function by the data processing function in one computer when receiving data from one or more other computers by the communicating function; and a mode judging step to judge whether or not to output the received data to the output function of the one computer depending on a mode attribute of the received data and a communication mode of the one computer. According to the data communication method of the present invention, it is possible to output the received data to the output function depending on the communication mode. Further, since the received data is stored regardless of the communication mode, it is possible to receive all data transmitted from another computer without exception, even in the communication mode in which the received data is not output to the output function.

The data communication method may further comprise a public mode receiving step to immediately output the received data to the output function of the one computer when the mode judging step judges that the mode attribute of the received data indicates a public mode and the one computer is in the public mode; and a local mode receiving step which does not output the received data to the output function of the one computer when the mode judging step judges that the mode attribute of the received data indicates the public mode but the one computer is in a local mode. In this case, it is possible to immediately output the public information or the local information to the output function depending on the communication mode at the time when the data is received. Moreover, a look back of the information is possible in the local mode.

Another object of the present invention is to provide a data communication apparatus for exchanging data with a plurality of apparatuses via a network, comprising a computer comprising a program which causes the computer to have a communicating function to transmit and receive data to and from the apparatuses, a data processing function to process data which are transmitted and received, and an output function to output data to an output section depending on a process of the data processing function; a storing section to store data received by the communicating function by the data processing function when receiving data from one of the apparatuses by the communicating function; and a mode judging section to judge whether or not to output the received data to the output function depending on a mode attribute of the received data and a communication mode of the data communication apparatus. According to the data communication apparatus of the present invention, it is possible to output the received data to the output function depending on the communication mode. Further, since the received data is stored regardless of the communication mode, it is possible to receive all data transmitted from another computer without exception, even in the communication mode in which the received data is not output to the output function.

The data communication apparatus may further comprise a public mode receiving section to immediately output the received data to the output function when the mode judging section judges that the mode attribute of the received data indicates a public mode and the data communication apparatus is in the public mode; and a local mode receiving section which does not output the received data to the output function when the mode judging section judges that the mode attribute of the received data indicates the public mode but the data communication apparatus is in a local mode. In this case, it is possible to immediately output the public information or the local information to the output function depending on the communication mode at the time when the data is received. Moreover, a look back of the information is possible in the local mode.

Still another object of the present invention is to provide a data communication system for exchanging data among a plurality of computers which are mutually coupled via a network, each of the computers comprising a program which causes the computer to have a communicating function to transmit and receive data to and from one or more other computers, a data processing function to process data which are transmitted and received, and an output function to output data to an output section depending on a process of the data processing function, each one of the computers receiving data by the communicating function comprising a storing section to store data received by the communicating function by the data processing function; and a mode judging section to judge whether or not to output the received data to the output function of the one computer depending on a mode attribute of the received data and a communication mode of the one computer. According to the data communication system of the present invention, it is possible to output the received data to the output function depending on the communication mode. Further, since the received data is stored regardless of the communication mode, it is possible to receive all data transmitted from another computer without exception, even in the communication mode in which the received data is not output to the output function.

The data communication system may further comprise a public mode receiving-section to immediately output the received data to the output function of the one computer when the mode judging section judges that the mode attribute of the received data indicates a public mode and the one computer is in the public mode; and a local mode receiving section which does not output the received data to the output function of the one computer when the mode judging section judges that the mode attribute of the received data indicates the public mode but the one computer is in a local mode. In this case, it is possible to immediately output the public information or the local information to the output function depending on the communication mode at the time when the data is received. Moreover, a look back of the information is possible in the local mode.

A further object of the present invention is to provide a computer-readable storage medium which stores a program for causing a computer to exchange data with a plurality of other computers which are mutually coupled via a network, the program causing the computer to comprise a communicating function to transmit and receive data to and from one or more other computers; a data processing function to process data which are transmitted and received; an output function to output data to an output section depending on a process of the data processing function; a storing function to store data received by the communicating function by the data processing function when receiving data from one or more other computers by the communicating function; and a mode judging function to judge whether or not to output the received data to the output function depending on a mode attribute of the received data and a communication mode of the computer. According to the computer-readable storage medium of the present invention, it is possible to output the received data to the output function depending on the communication mode. Further, since the received data is stored regardless of the communication mode, it is possible to receive all data transmitted from another computer without exception, even in the communication mode in which the received data is not output to the output function.

In the computer-readable storage medium, the program may further cause the computer to comprise a public mode receiving function to immediately output the received data to the output function when the mode judging function judges that the mode attribute of the received data indicates a public mode and the computer is in the public mode; and a local mode receiving function which does not output the received data to the output function when the mode judging function judges that the mode attribute of the received data indicates the public mode but the computer is in a local mode. In this case, it is possible to immediately output the public information or the local information to the output function depending on the communication mode at the time when the data is received. Moreover, a look back of the information is possible in the local mode.

Other objects and further features of the present invention will be apparent from the following detailed description when read in conjunction with the accompanying drawings.

BRIEF DESCRIPTION OF THE DRAWINGS

FIG. 5 is a diagram showing a data structure of an expansion program reference file included in the program;

FIG. 39 is a flow chart for explaining a process when a public mode button is operated;

DESCRIPTION OF THE PREFERRED EMBODIMENTS

Figure 1:
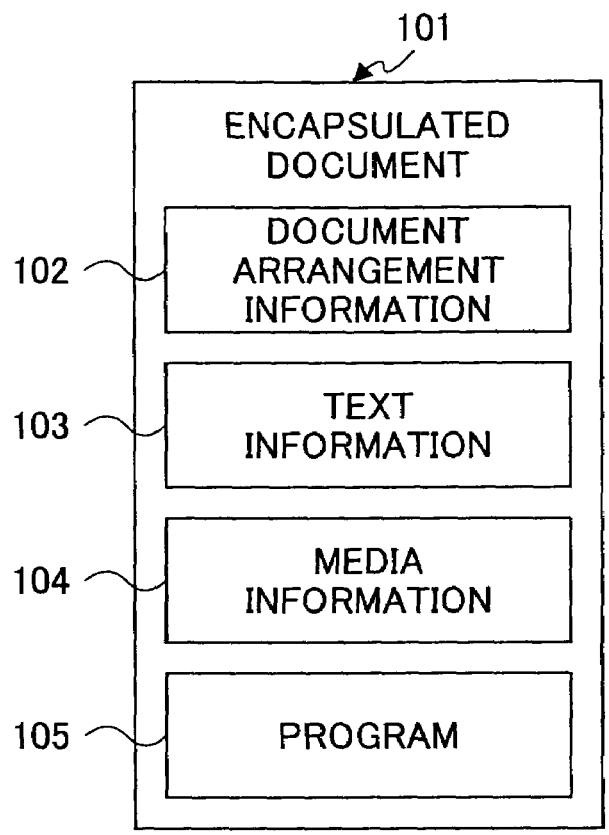
FIG. 1 is a diagram showing a data structure of an encapsulated document.

A document data structure, a storage medium and an information processing apparatus for eliminating some of the problems described above have been proposed in a U.S. patent application Ser. No. 10/183,613 filed Jun. 28, 2002, the disclosure of which is hereby incorporated by reference. More particularly, a document format called encapsulated document format is employed, and in addition to the multimedia contents such as text, image and dynamic image (or animation), a program for displaying the multimedia contents, a communication program an additional write program, a record program and the like are treated as a single library file.

For example, the encapsulated document is distributed as the materials of the presentation, to the lap-top personal computers of the participants of the presentation. By starting the document, the materials, that is, the document, is synchronized among all of the participants of the presentation by utilizing the communication program within the encapsulated document. Hence, if the presenter turns over the page of the document, this information is notified to all of the participants so that all of the participants can inspect the same page of the document as the presenter. Since all of the participants have the same document, the participant will not receive a transmission from another participant or presenter unless put into a communicatable state, and the participant can thus inspect the desired page of the document by himself. In addition, if a certain participant wishes the other participants to view the same document state as that of this certain participant, a synchronization button may be pushed to put the documents of all of the participants in the communicatable state into the same document state as that of this certain participant and synchronize the documents of all of the participants. Accordingly, when the certain participant wishes to pose a question., this certain participant can display a page of the document related to the question, and push the synchronization button, so that all of the participants can view the same page in question as the certain participant. Moreover, since the information additionally written by the additional write program can also be synchronized for viewing by all of the participants, it is possible to communicate in more detail the contents or intentions of the question made by the certain participant to all of the participants.

Accordingly, the above described problems of the presentation or conference, and the above described problems of using the client-server type system are eliminated by utilizing the encapsulated document which includes the communication program and the like.

However, if the certain participant pushes the synchronization button, the documents of all of the participants in the communicatable state will be synchronized and forcibly put into the same document state as the certain participant. For this reason, if a participant is making local operation, for example, this local operation and this participant's thinking will be interrupted by the document synchronization. It is conceivable not to put the participant in the communicatable state when making the local operation, but in this case, it becomes impossible to receive information from the presenter and the other participants. Consequently, although the local operation and this participant's thinking will not be interrupted, this participant will lack knowledge of all exchanges of information made by the presenter and the other participants during the local operation.

Next, a description will be given of embodiments of a data communication method, a data communication apparatus, a data communication system and a computer-readable storage medium according to the present invention, by referring to the drawings.

[Data Structure of Document (Encapsulated Document)]

Prior to describing the embodiments of the present invention, a description will be given of the preconditions of the present invention, that is, the data structure of the document, the storage medium and the information processing apparatus proposed in the U.S. patent application Ser. No. 10/183,613 filed Jun. 28, 2002. FIG. 1 is a diagram showing a data structure of an encapsulated document.

As shown in FIG. 1, an encapsulated document 101 includes document arrangement (or layout) information 102, text information 103, media information 104, and a program 105. The document arrangement information 102 is in the form of a display information file for indicating display states of structure, arrangement (or layout) and the like of the entire document. The text information 103 is in the form of a contents information file (digital information file) indicating the text contents within the document. The media information 104 is in the form of a contents information file (digital information file) indicating other contents such as still images and dynamic (or animation) images. The program 105 includes a plurality operation program files used for displaying the document contents and detecting user operation. Each of the information described above has a structure formed by independent file units which may be managed by an operation system of a general purpose personal computer.

The encapsulated document 101 may be stored in various types of storage media, such as an optical storage media including CD, CD-ROM, CD-R, CD-RW, DVD-ROM and DVD-RAM, magnetic storage media including floppy disk, hard disk and magnetic tape. Hence, depending on the type of storage medium used to store the encapsulated document 101, the encapsulated document 101 may be carried and transported such as the case where a portable recording medium is used. Moreover, the encapsulated document 101 may be transmitted through various types of communication lines, such as LAN and the Internet, and the communication line may be cable or wireless or a combination thereof.

Figure 2:
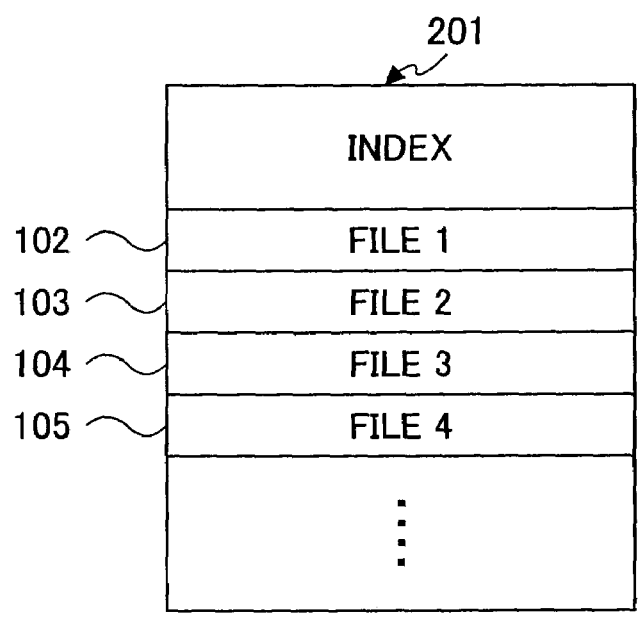
FIG. 2 is a diagram showing a data structure of a library file.
Figure 3:
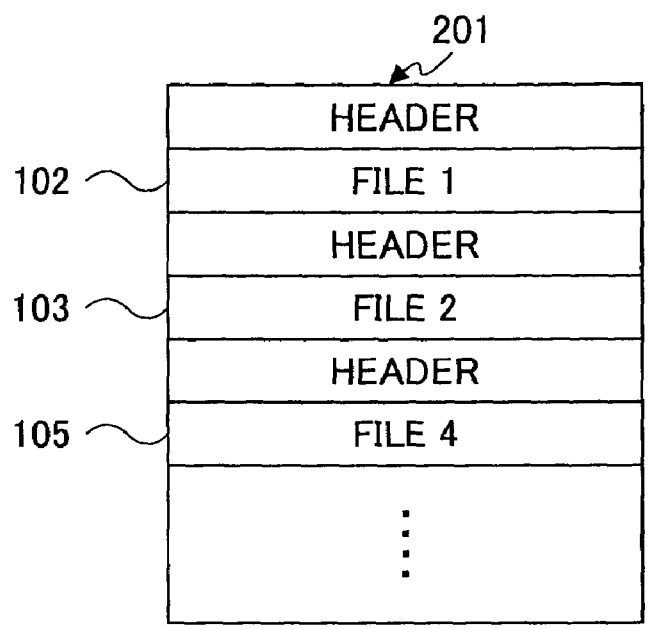
FIG. 3 is a diagram showing another data structure of the library file.

FIG. 2 is a diagram showing a data structure of a library file, and FIG. 3 is a diagram showing another data structure of the library file.

Each of the files 102, 103, 104 and 105 forming the encapsulated document 101 is stored in a single library file 201, as shown in FIGS. 2 and 3. Hence, the library file 201 forms an encapsulating means for encapsulating the document arrangement information (display information file) 102, the text information (contents information file) 103, the media information (contents information file) 104, and the program (operation program file or files) 105 as a single document. Generally file formats such as ZIP and LHA may be used for the file format of the library file 201.

The library file 201 has a file structure for storing the plurality of files 102, 103, 104 and 105 as a single file (library file 201). Such a library file 201 can be treat the plurality of files 102, 103, 104 and 105 as a single file (library file 201) according to a user's request, by using an archiver program which has a storing function and a decompressing function.

In the library file 201 shown in FIG. 2, index information is added to indicate the location of each of the files 102, 103, 104 and 105 within the library file 201. Thus, it is possible to search the positions of the files 102, 103, 104 and 105 based on the index information.

In the library file 201 shown in FIG. 3, header information is added to each of the files 102, 103, 104 and 105 to indicate the positions of the files 102, 103, 104 and 105. Hence, it is possible to search the positions of the files 102, 103, 104 and 105 based on the header information.

Accordingly, the file structure of the encapsulated document 101 has a library file format by which the plurality of files 102, 103, 104 and 105 are managed by use of the index information shown in FIG. 2 or the header information shown in FIG. 3. The user can thus manage and store the plurality of files 102, 103, 104 and 105 as if they were a single file.

Figure 4:
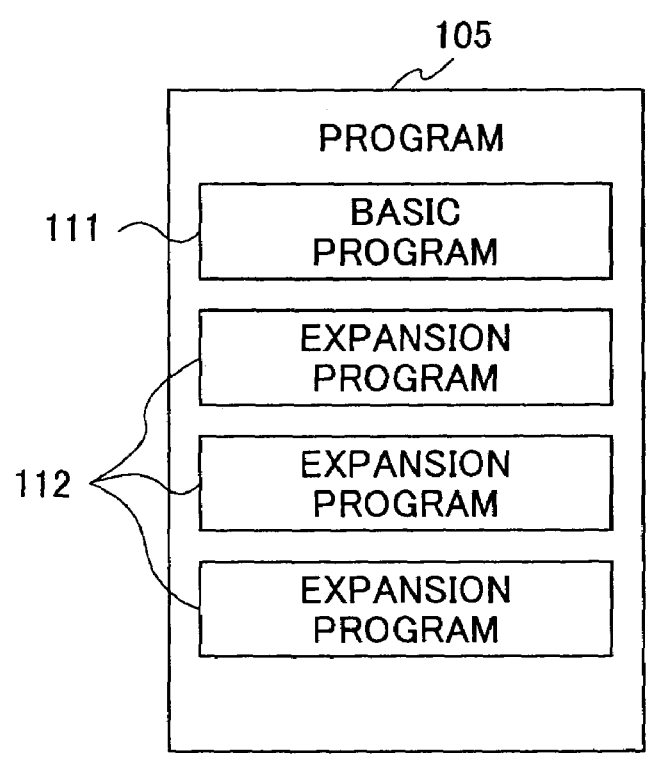
FIG. 4 is a diagram showing a data structure of a program stored in the encapsulated document.

FIG. 4 is a diagram showing a data structure of the program 105 held in the encapsulated document 101, and FIG. 5 is a diagram showing a data structure of the document arrangement information file (display information file) 102 which specifies information concerning expansion programs included in the program 105.

The program 105 which includes a plurality of operation program files stored in the encapsulated document. 101, is formed by a basic program 111 and expansion programs 112, as shown in FIG. 4.

The basic program 111 can be called at the time of starting the encapsulated document 101. Only one basic program 111 exists in common with respect to all of the encapsulated documents 101. This basic program 111 includes a startup program (not shown), and is interpreted, executed and started if necessary or, in response to an access of the encapsulated document 101 by a personal computer 301 shown in FIG. 8 which will be described later.

The expansion programs 112 are added depending on the contents included in the encapsulated document 101, and for example, prepared depending on the types of display media such as text, still (picture) images, dynamic (animation) images, three-dimensional (3D) display and images, as shown in FIG. 5. When the contents information file included in the encapsulated document 101 only includes the text information 103, for example, a text panel program 112a of the expansion program 112 is stored in the encapsulated document 101 in addition to the basic program 111. Moreover, when the media information 104 in the form of the contents information file (digital information file) including the still images, dynamic images and the like is included in the encapsulated document 101, an image panel program 112b, a movie panel program 112c, and a 3D panel program 112d of the expansion programs 112 are stored in the encapsulated document 101 in addition to the basic program 111.

FIG. 5 shows one expansion program reference file 113 which specifies the expansion programs 112 and tags 115 and operations 114 respectively corresponding to the expansion programs 112. Such an expansion program reference file 113 may be stored in the encapsulated document 101 as the program 105.

Next, a description will be given of the document arrangement information 102. The arrangement of each media of the encapsulated document 101, display size, files of each media, and the like are written in the document arrangement information 102. Such information of the document arrangement information 102 is described using the general purpose XML format.

Figures 6, 7:
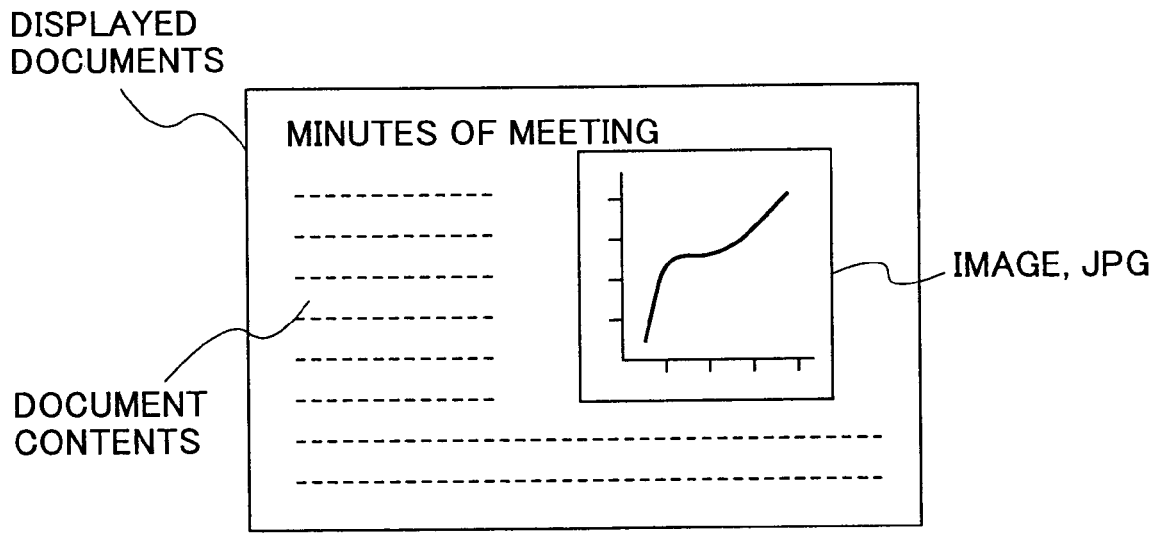
FIG. 6 is a diagram showing an encapsulated document described in XML.
FIG. 7 is a diagram showing a display image of the encapsulated document described in XML as shown in FIG. 6.

FIG. 6 is a diagram showing the encapsulated document 101 described in XML. As shown in FIG. 6, the XML is a file format which describes each element by a tag, and the document is described by a collection of elements, that is, tags. In this case, it is possible to employ an embedded structure in which a tag is inserted within a tag. It is possible to add an attribute to each tag so as to indicate the attribute of each tag.

FIG. 7 is a diagram showing display contents of the encapsulated document 101 described in XML as shown in FIG. 6. The encapsulated document 101 shown in FIG. 7 is displayed based on the XML description shown in FIG. 6.

First, as shown in FIG. 6, tags <DOCUMENT> and </DOCUMENT> indicating the entire document are described at the start and end, and the structure of the document is described therebetween. A title is indicated by tags <TEXT> and </TEXT> having the title described therebetween, and the contents between these tags are displayed when the attribute is omitted. A tag <TEXT FILE="BODY.TEXT"/>, indicates that the text information is read in from a file "BODY.TEXT". A tag <IMAGE FILE="IMAGE.JPG" X="100", Y="10" WIDTH="100" HEIGHT="100"/> corresponds to the arrangement information indicating that a still image "IMAGE.JPG" is displayed with reference to an origin indicated by the X and Y coordinates with a size specified by WIDTH and HEIGHT.

Thus, the document arrangement information 102 instructs the file to be read out and the arrangement of image to be displayed by the XML format.

Although the document arrangement information 102 is described in XML in the case described above, other suitable description languages may be employed, such as HTML and original description formats.

The media information 104 describing the still images, dynamic images, 3D images, voice information and the like may employ the general purpose file format or, an original format if special specifications are used.

As described above, the file structure of the encapsulated document 101 includes the document arrangement information 102 indicating the structure of the entire document, the plurality of media files (text information 103 and media information 104) displayed according to the arrangement information 102, such as the text information file and the image file, and the program 105 which is essentially a group of programs.

[Inspection and the like of Encapsulated Document 101]

A description will be given of the basic operation of the encapsulated document 101, starting from a document starting step to a document inspecting (viewing or reading) step. First, for the purpose of comparison with the case where the encapsulated document 101 is used, a description will be given of the operation of a general personal computer and the document inspecting operation carried out thereby.

Figure 8:
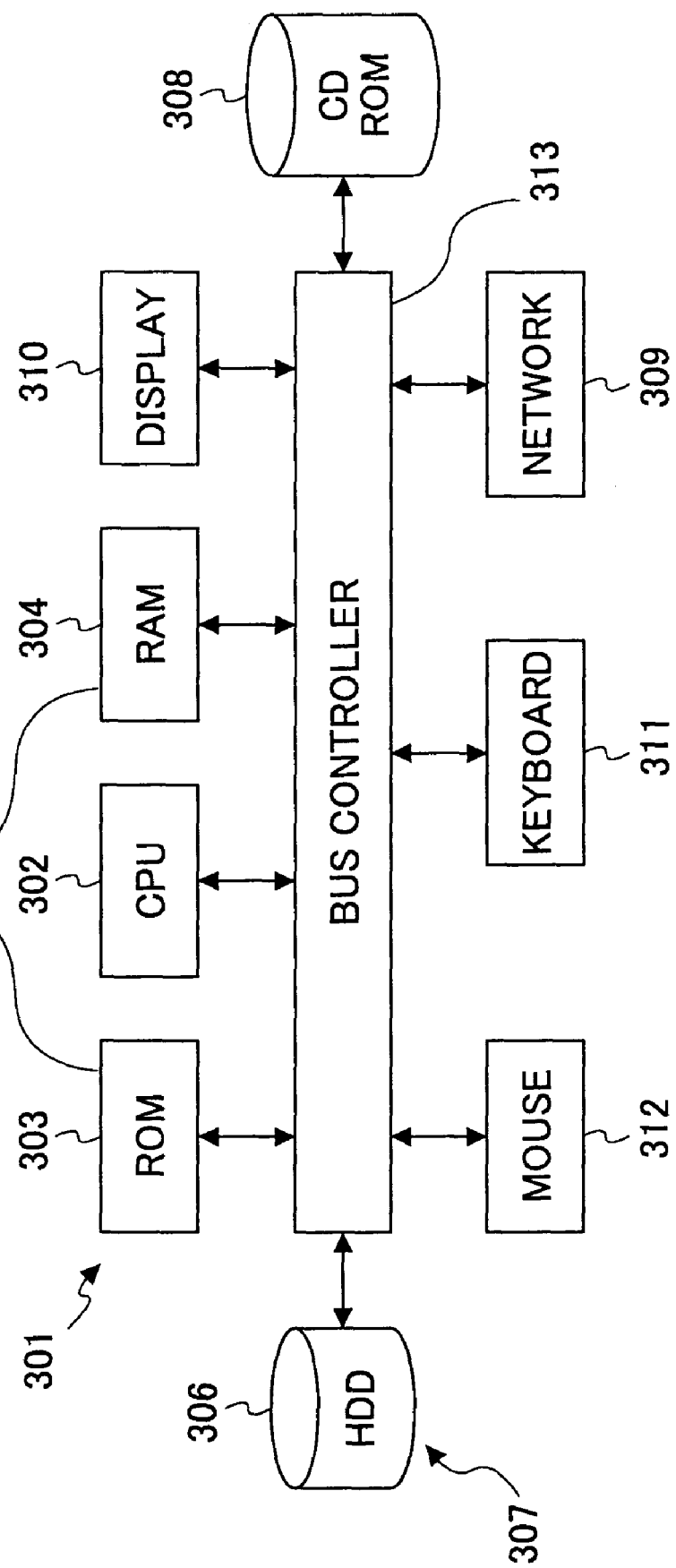
FIG. 8 is a system block diagram showing a hardware structure of a personal computer.

FIG. 8 is a system block diagram showing a hardware structure of a general personal computer (computer) 301 which is also used as an embodiment of the data communication apparatus according to the present invention, as will be described later. The personal computer 301 includes a CPU 302 for processing information, a primary storage device 305, such as a ROM 303 and a RAM 304, for storing information, a secondary storage device 307, such as a hard disk drive (HDD) 306, for storing processed results and the like, and a removable recording medium 308, such as a CD-ROM, for externally storing, distributing and acquiring information. The personal computer 301 also includes a network interface 309 for exchanging information with an external computer via a network (not shown) through communication, a display device 310 for displaying intermediate processing results, processed results and the like to the operator (user), a keyboard 311 which is manipulated by the operator to input instructions and information to the personal computer 301, and a mouse 312 which is manipulated by the operator to input instructions and information to the personal computer 301. The personal computer 301 further includes a bus controller 313 carrying out an arbitration with respect to data which are exchanged among the various elements of the personal computer 301 described above.

Generally, in the personal computer 301, when the user turns the power supply ON, the CPU 302 starts a loader program within the ROM 303, and also reads from the HDD 306 an operating system (OS) which manages the hardware and software of the personal computer 301 and writes the operating system into the RAM 304 to start this operating system. According to operation made by the user, the operating system starts programs, reads information and stores (saves) information. Typical operating systems are Windows (registered trademark) and UNIX (registered trademark). Application programs run on the operating system.

Figure 9:
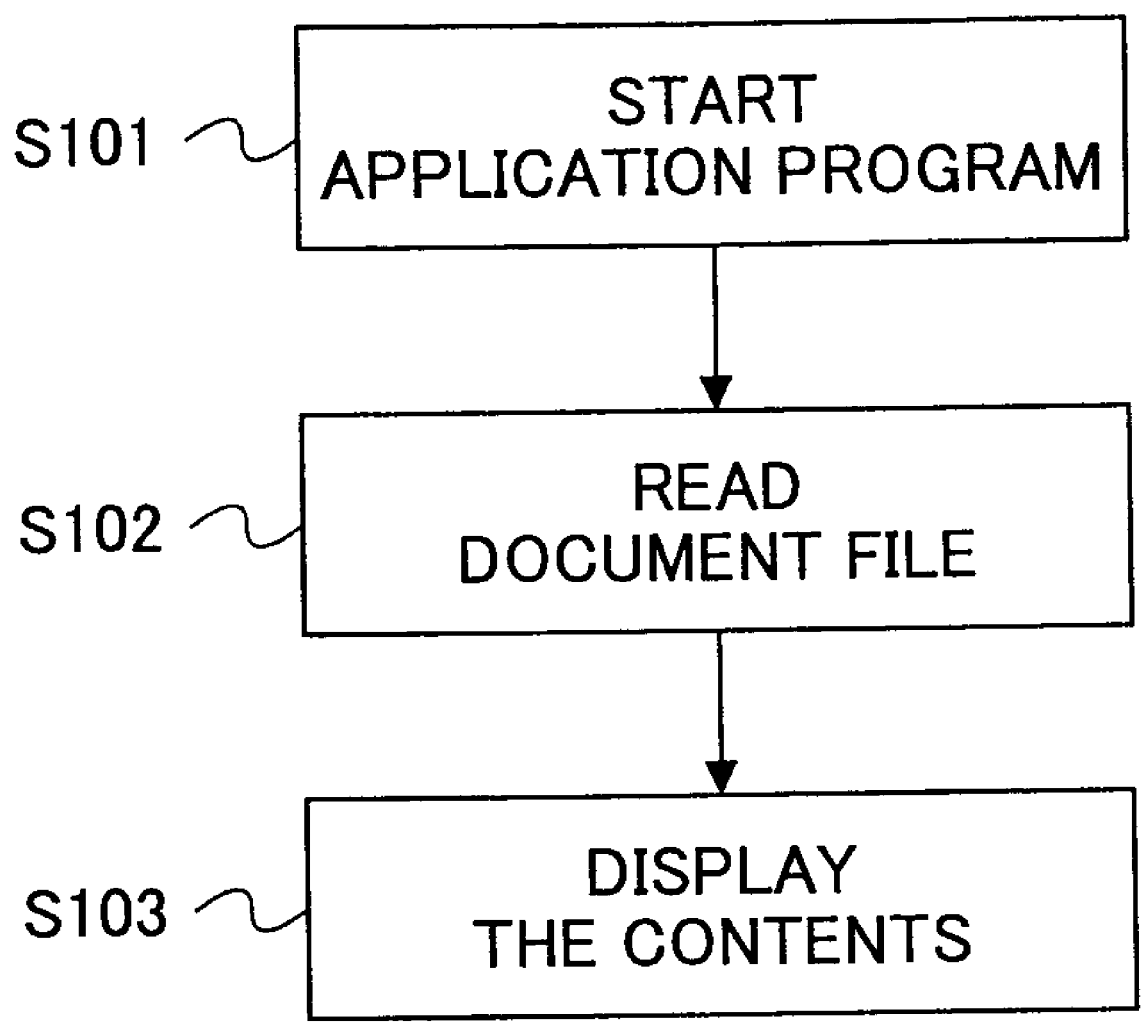
FIG. 9 is a flow chart for explaining a document inspection process of the personal computer.

FIG. 9 is a flow chart showing a document inspecting process of the personal computer 301. As shown in FIG. 9, when the document inspecting process starts, an application program for the document inspection is started in a step S101. A document file suited to the format of the started application program is read from the application program in a step S102. The read document file is displayed in a step S103.

According to the document inspecting process described above, when the user selects and starts the document file by a double-click of the mouse 312, for example, the application program which is related to the selected document file is started. That is, according to the document inspecting process of the personal computer 301, the document data is read from the application program. Therefore, in order to display and edit the document included in the document file, the application program corresponding to the document is essential.

Figure 10:
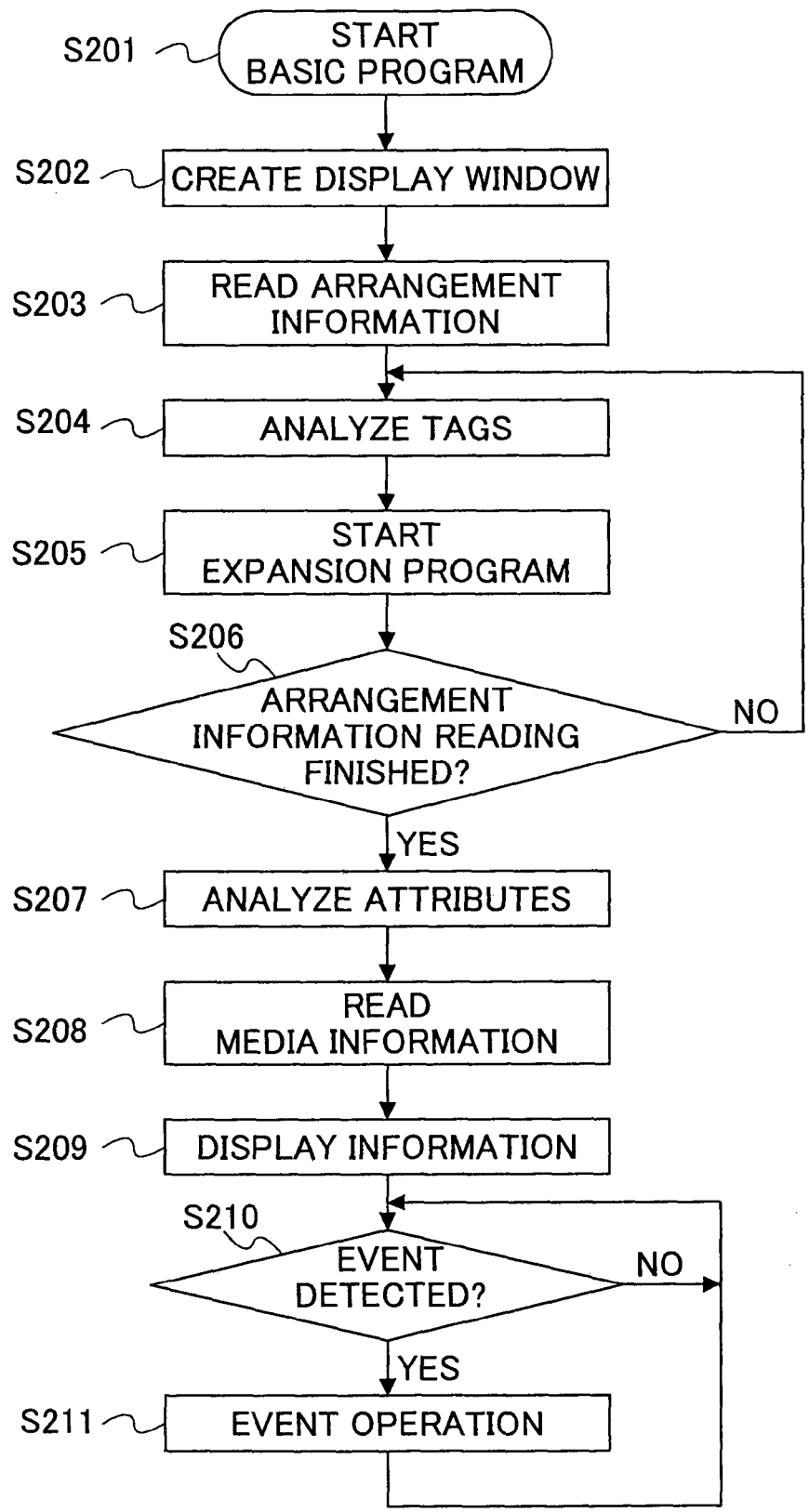
FIG. 10 is a flow chart for explaining a document inspection process of the personal computer for an encapsulated document.

FIG. 10 is a flow chart for explaining a document inspecting process of the personal computer 301 using the encapsulated document 101. The personal computer 301 and the encapsulated document 101 form an information processing apparatus.

The encapsulated document 101 includes an icon file related to icons (not shown) to be displayed on the personal computer 301 and corresponding to substance data such as the text information 103 and the media information 104. Thus, the icons in accordance with the icon file are displayed on the personal computer 301. When the user selects and starts the icon corresponding to the substance data of the encapsulated document 101 by a double-click of the mouse 312, for example, the basic program 111 stored in the library format as the library file 201 within the encapsulated document 101 is started in a step S201. After being started, the basic program 111 creates a display window for displaying the document in a step S202. Then, the basic program 111 reads the document arrangement information 102 in the library file 201 described by XML or the like in a step S203.

After reading the document arrangement information 102, the basic program 111 analyzes the tag structure in a step S204. The basic program 111 starts the expansion program 112 corresponding to the tag name shown in FIG. 5, for example, by another thread, and hands the attribute described in the document arrangement information 102 to the expansion programs 112 in a step S205. The basic program 111 decides whether or not the all of the tags have been analyzed and the reading of the document arrangement information 102 stored in the encapsulated document 101 has ended, in a step S206. The process returns to the step S204 if the decision result in the step S206 is NO. Hence, the basic program 111 performs the above described process for all the tags described in the document arrangement information 102 of the encapsulated document 101. As a result, the plurality of expansion programs 112 described in the document arrangement information 102 are started by different threads in the step S205.

If the decision result in the step S206 is YES, each expansion program 112 analyzes the attribute received from the basic program 111, in a step S207. In addition, each expansion program 112 reads the required text information 103 and the media information 104 from the library file 201 within the encapsulated document 101 depending on the contents of the read attribute, in a step S208. Each expansion programs 112 displays the text information 103 and the media information 104 in regions having sizes depending on the attributes within the window created by the basic program 111, in a step S209. By performing such a process, the encapsulated document 101 can display a plurality of sets of text information 103 and media information 104 in the window created by the basic program 111.

Moreover, after such a display operation, the expansion program 112 decides whether or not an even is detection, in a step S210. If the decision result in the step S210 becomes YES, the expansion program 112 executes a process depending on the detected event. Thus, the encapsulated document 101 can display the document using a structure which is fundamentally different from that of the conventional document.

[Communication Function Using Expansion Program 112]

A description will be given of the communication function using the expansion program 112.

This communication function performs a communication between the encapsulated documents 101 started in two or more personal computers 301 which are connected to a network via the respective network interfaces 309.

The communication function may be added to the encapsulated document 101 described above. In this case, the tag of the XML specifying the communication function is <com/>, for example. For example, the basic program 111 starts the expansion program 112 which has the communication function when this tag is read, and the expansion program 112 displays a communication button (not shown) within the display of the encapsulated document 101 which is displayed on the display device 310.

Figure 11:
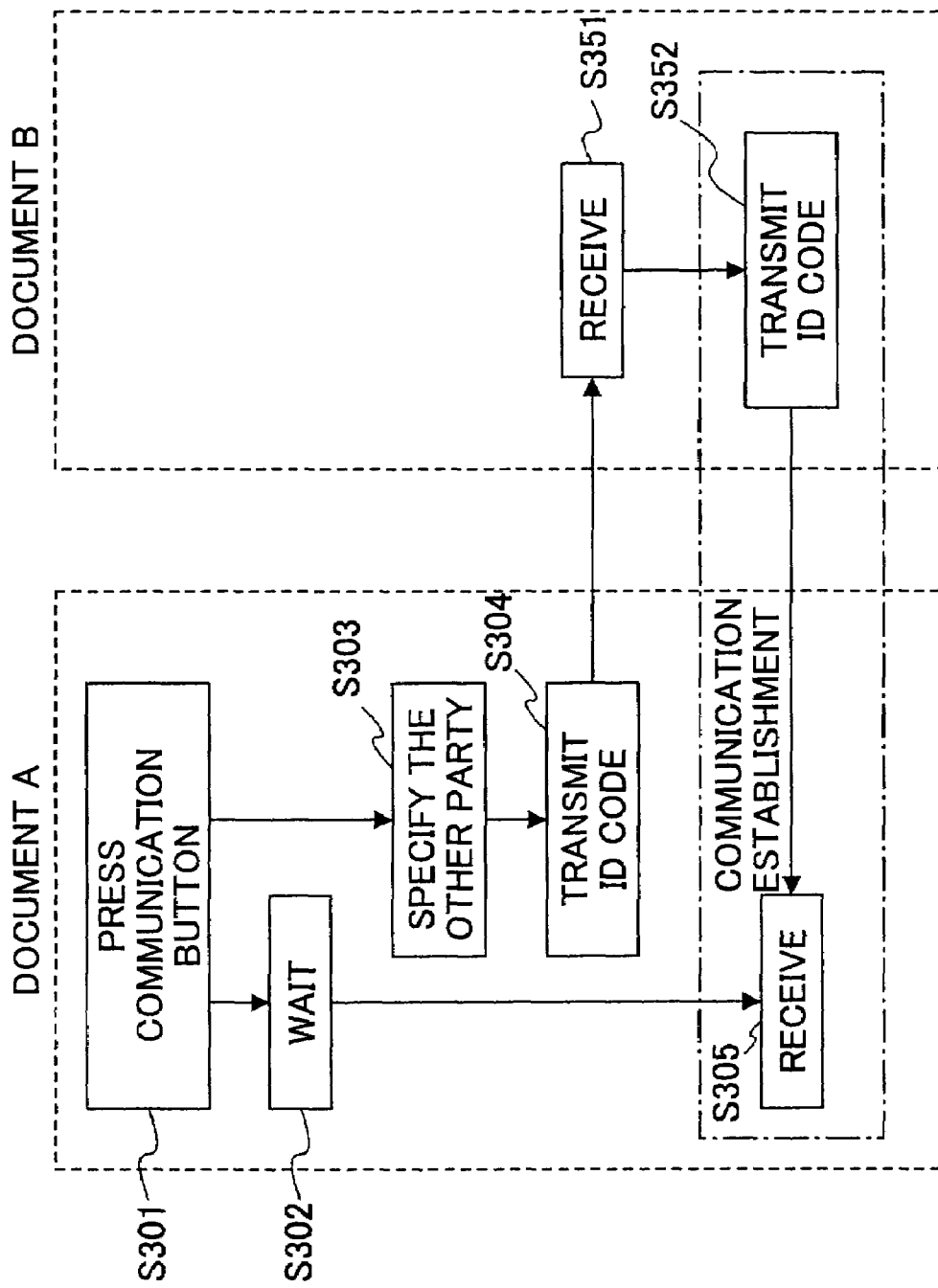
FIG. 11 is a flow for explaining a communication establishment process for a 1:1 communication between encapsulated documents.

FIG. 11 is a flow for explaining a communication establishment process for a 1:1 communication between the encapsulated documents 101. For the sake of convenience, a description will be given of the establishment of the communication between two encapsulated documents 101, namely, a document A which is started in one of two separate personal computers 301 (terminal TA) and a document B which is started in the other of the two separate personal computers 301 (terminal TB).

In the document A started in the terminal TA, when the expansion program 112 determines that the communication button is clicked by the mouse 312 in a step S301, a socket is opened to assume a communication wait state in a step S302. In this case, the port may be used in common by each of the documents.

Next, when specifying the document B started in the terminal B at the other end of the communication in a step S303, the document A sends a document identification code 401 thereof in a step S304. The step S304 may be performed by another thread.

Figures 12, 13:
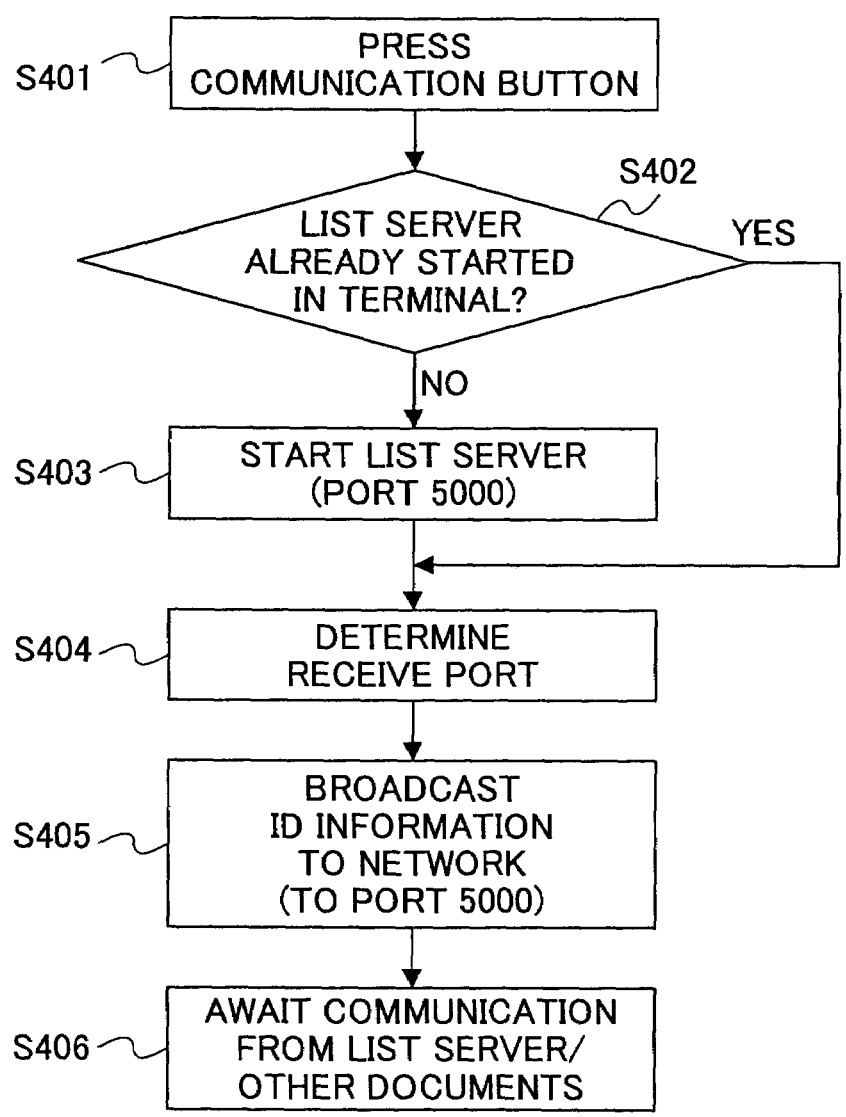
FIG. 12 is a diagram showing a document identification code.
FIG. 13 is a flow chart for explaining a communication establishment process for communication among a plurality of encapsulated documents.

FIG. 12 is a diagram showing the document identification code 401. The document identification code 401 is used to specify the document, and includes an ID number 402, a network address number (IP address) 403, a port number 404, a title 405, a version 406, and a user name 407, as shown in FIG. 12.

When sending the document identification code 401 in the step S304, the document A may specify the document B at the other end of the communication by the network address number (IP address) 403 or, by the user name 407.

Then, when the document B at the transmitting destination is in a state capable of receiving the transmission (communication), the document B receives a communication establish request from the document A in a step S351. The document B which receives the communication establish request from the document A registers the document A as the other end of the communication, and send the document identification code 401 of the document B to the document A in a step S352. The document identification code 401 in this case may by the network address number (IP address) 403 of the document B, the user name 407 of the document B, or other information of the document B.

The document A receives the document identification code 401 of the document B sent from the document B, in a step S305, and thus, the communication is established between the document A and document B. The communication establishment process for the 1:1 communication between the encapsulated documents 101 in this manner.

FIG. 13 is a flow chart for explaining a communication establishment process for communication among a plurality of encapsulated documents 101. The communication establishment process among the plurality of encapsulated documents 101 relies on a list server which is one of the functions of the personal computer 301 connected in the network. A detailed description on the roles and operations of the list server will be given later in the specification.

As shown in FIG. 13, a communication button displayed in a certain encapsulated document 101 is clicked by the mouse 312 in a step S401, the personal computer 301 which started the certain encapsulated document 101 decides whether or not a list server is started, in a step S402. This list server is provided as a program (hereinafter referred to as a communicatable document management program) which manages the documents capable of making communication and is included in the expansion program 112. If the decision result in the step S402 is NO, the list server is started and a port to be used is determined in a step S403. For example, the port to be used is determined to be port No. 5000. The process advances to a step S404 after the step S403 or, if the decision result in the step S402 is YES.

A reception port of the document itself is arbitrarily acquired in the step S404. This reception port is used for acquiring the document state, and when starting a plurality of communicatable encapsulated documents 101 in the same personal computer 301, different numbers are assigned to each of the encapsulated documents 101. The port of the list server is used for receiving the document identification code 401, and has a port number which is common to each of the personal computers 301.

The encapsulated document 101 broadcasts its document identification code 401 (IP address 403, port number 404, title 405, version 406, user name 407, etc.), including the port number for document state reception, via the network interface 309 to the port (port 5000 in this case) of the list server, in a step S405. The broadcasting is made to a broadcast address such as the IP address "255.255.255.255", and the document identification code 401 is sent to all the personal computers 301. within a sub network.

By performing the series of processes described above, the encapsulated document 101 assumes a state capable of receiving the document state by a peculiar port number, in a step S406. Moreover, the list server which receives the broadcast notification adds the document identification code 401 to its own list.

The list server manages the communicatable encapsulated document 101 in each personal computer 301. In this case, the list server has a function of grasping all of the communicatable encapsulated documents 101 in the network. Moreover, the list server does not start when another list server has already started in the personal computer 301 in which the encapsulated document 101 has started. This is because, when a plurality of communicatable encapsulated documents 101 are started in one personal computer 301 and each encapsulated document 101 were to grasp all of the communicatable encapsulated documents 101 in the network, the same information would be managed in an overlapping manner to thereby increase the load unnecessarily. In order to avoid such a situation, only one list server is started in one personal computer 301. Hence, it is possible to concentrate the load of processing the communicatable documents when a plurality of encapsulated documents 101 are started to only a single encapsulated document 101.

Figure 14:
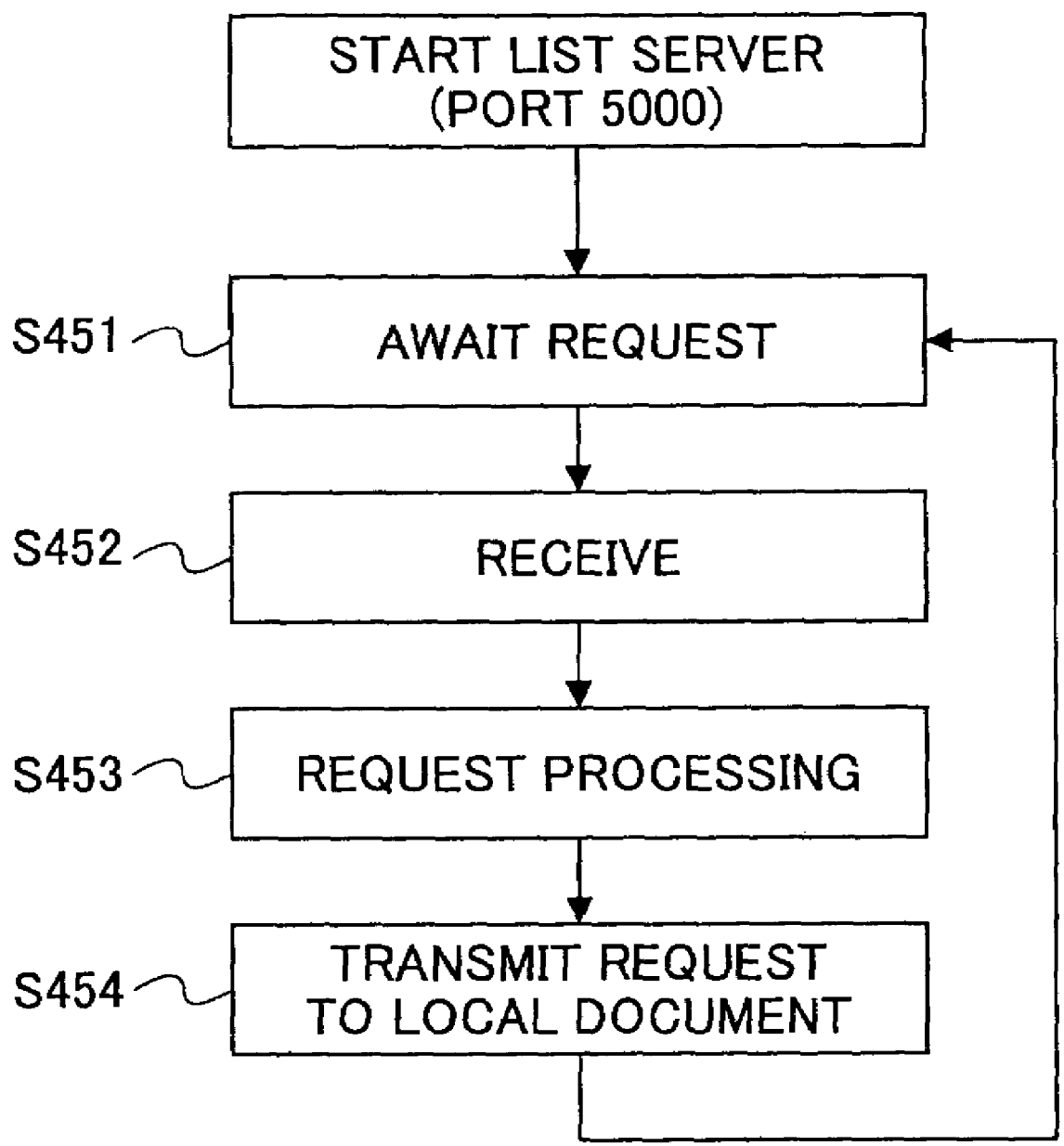
FIG. 14 is a flow chart for explaining a process of a list server.

FIG. 14 is a flow chart for explaining a process of the list server. The list server waits for various requests (identification code data) in a step S451. The various requests include a participating request, a leaving request, a list adding request, and the like.

These requests are specified as a state ID added to the header of the data. When the list server receives the request in a step S452, the list server determines the type of request based on the state ID and processes the request in a step 453. When the participating request is received, for example, the list server notifies the participating request to a local encapsulated document 101 having the same title and the same version as the encapsulated document 101 which made the participating request, in a step S454.

The personal computer 301 which started the local encapsulated document 101 receives this participating request, and adds the communicatable encapsulated document 101 to the list of the local encapsulated document 101. On the other hand, the corresponding encapsulated document 101 is deleted from the list of the local encapsulated document 101 when the leaving request is received.

Figure 15:
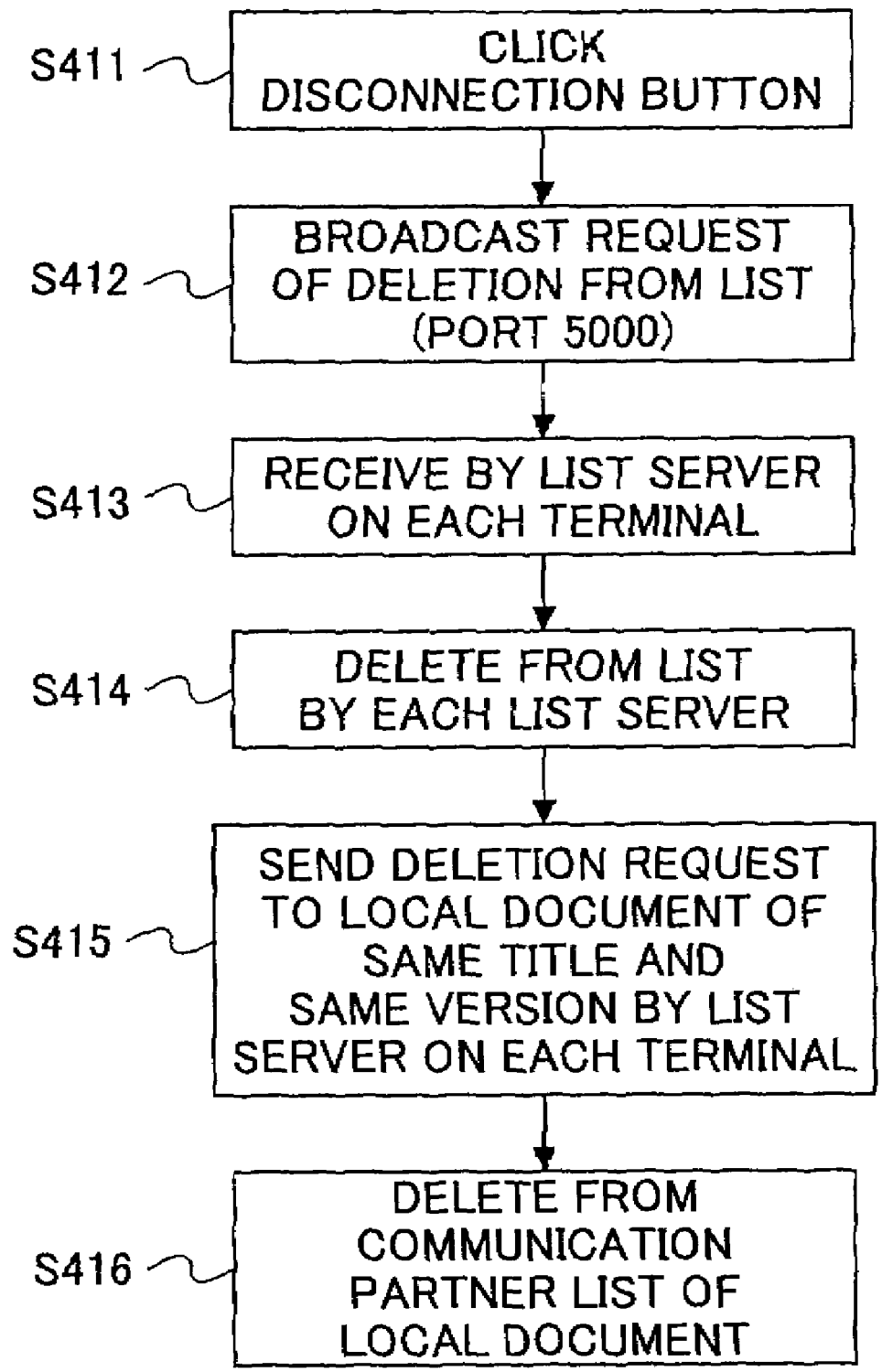
FIG. 15 is a flow chart for explaining a process of disconnecting communications among the encapsulated documents when leaving seat.

FIG. 15 is a flow chart for explaining a process of disconnecting communications among the plurality of encapsulated documents 101 when leaving seat. When a disconnect button is clicked by the mouse 312 for the encapsulated document 101 which is started in a personal computer 101 in a step S411, a delete request to make a deletion from the list is broadcast in a step S412. When the list server of each personal computer 301 receives this delete request in a step S413, each list server deletes the encapsulated document 101 for which the disconnect button is clicked from the list of communicatable encapsulated documents 101 in a step S414. Hence, the list server of each personal computer 301 sends the deletion request to the local encapsulated documents 101 having the same title and the same version as the corresponding (deleted) encapsulated document 101, in a step S415. Hence, the corresponding encapsulated document 101 is deleted from list of each local encapsulated document 101 in a step S416.

In a case where a terminal TC (personal computer 301) additionally participates in the communication in a state where the terminals TA and TB (personal computers 301) communicate with each other, the terminals TA and TB (personal computers 301) can recognize that the terminal TC has additionally participated by receiving the document identification code 401 broadcast from the terminal TC. However, the terminal TC cannot recognize at this point in time which encapsulated document 101 is communicatable. For this reason, when the participating request is received from another personal computer 301, the list server also has a function of sending the list of presently communicatable encapsulated documents 101 to the personal computer 301 which made the participating request.

The list of communicatable encapsulated documents 101 refers to a collection of document identification codes 401 unique to the documents which are exchanged at the time of the communication. In this case, a response may be sent from all of the personal computers 301 in which the list server is started in the network. However, since each terminal (list server) has the list of the communicable encapsulated documents 101 in the network, it is not practical to respond from all of the list severs. Accordingly, by considering reduction of the load of the network, one personal computer 301 is arbitrarily selected, and the list is sent from the selected personal computer 301 to a personal computer 301 which newly made the participating request. For example, the personal computer 301 which is to send the list may be selected to that having the IP address closest to the personal computer 301 which sent the participating request. The exchange of data for selecting the personal computer 301 and sending the list may be performed using standard protocols such as the User Datagram Protocol (UDP) and the Transmission Control Protocol/Internet Protocol (TCP/IP).

By the above described process, the list of communicatable documents can be created in each encapsulated document 101. By displaying this list as the synchronization button in the encapsulated document 101, for example, the synchronization with the encapsulated document 101 becomes possible by clicking this synchronization button by the mouse 312. Moreover, it is possible to provide a button for simultaneously synchronizing all of the communicatable encapsulated documents 101.

Figure 16:
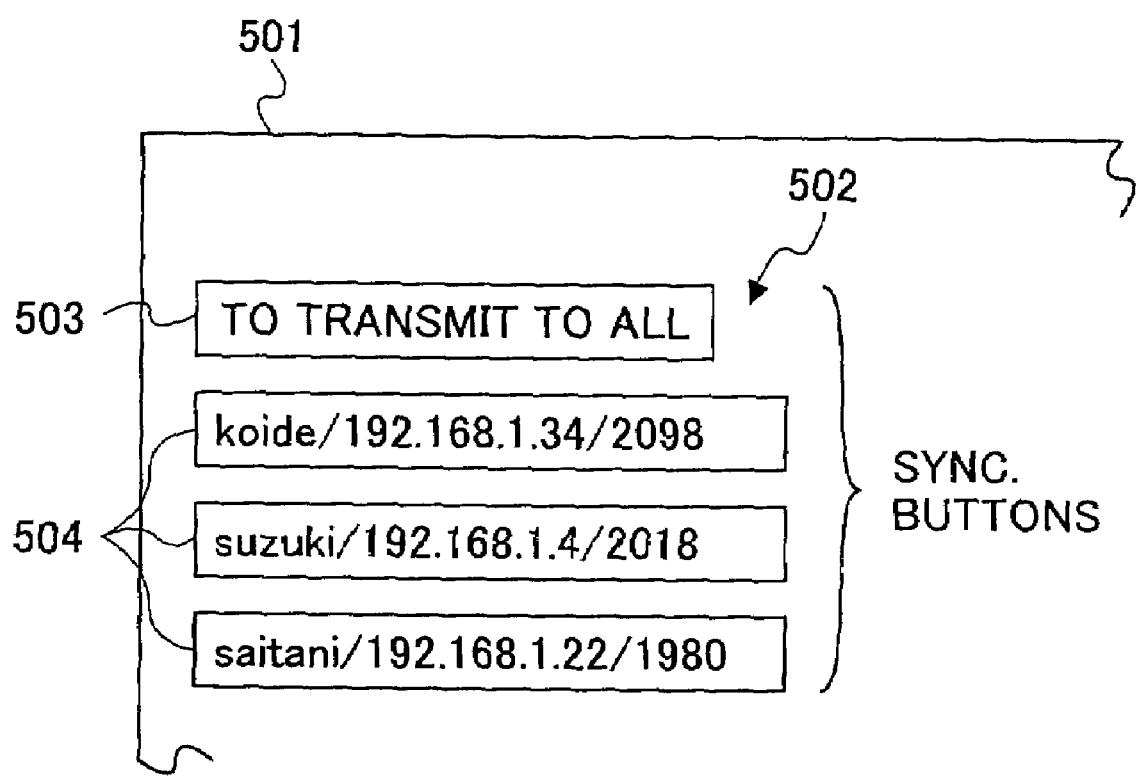
FIG. 16 is a diagram showing a synchronization button displayed within a document panel of the encapsulated document.

FIG. 16 is a diagram showing a synchronization button displayed within a document panel of the encapsulated document 101. As shown in FIG. 16, the list of communicatable (sendable) encapsulated documents 101 is displayed as synchronization buttons 502 on a document panel 501 which appears within the display image of the encapsulated document 101. Of the synchronization button 502, a select-all button 503 displayed at the top and indicated as "TO TRANSMIT TO ALL" is used to select the transmission to all of the communicatable encapsulated documents 101. Buttons 504 under the select-all button 503 are used to select the transmission to the corresponding encapsulated documents 101.

When the select-all button 503 or one of the buttons 504 is clicked, the document state of the encapsulated document 101 is transmitted to one or more relevant encapsulated documents 101, to thereby synchronize each of the encapsulated document 101. The exchange of the document state is performed directly by utilizing the pair of the IP address in the identification code and the port number for document state reception of each document. Thus, the list server does not intervene in the exchange of the document state.

Figure 17:
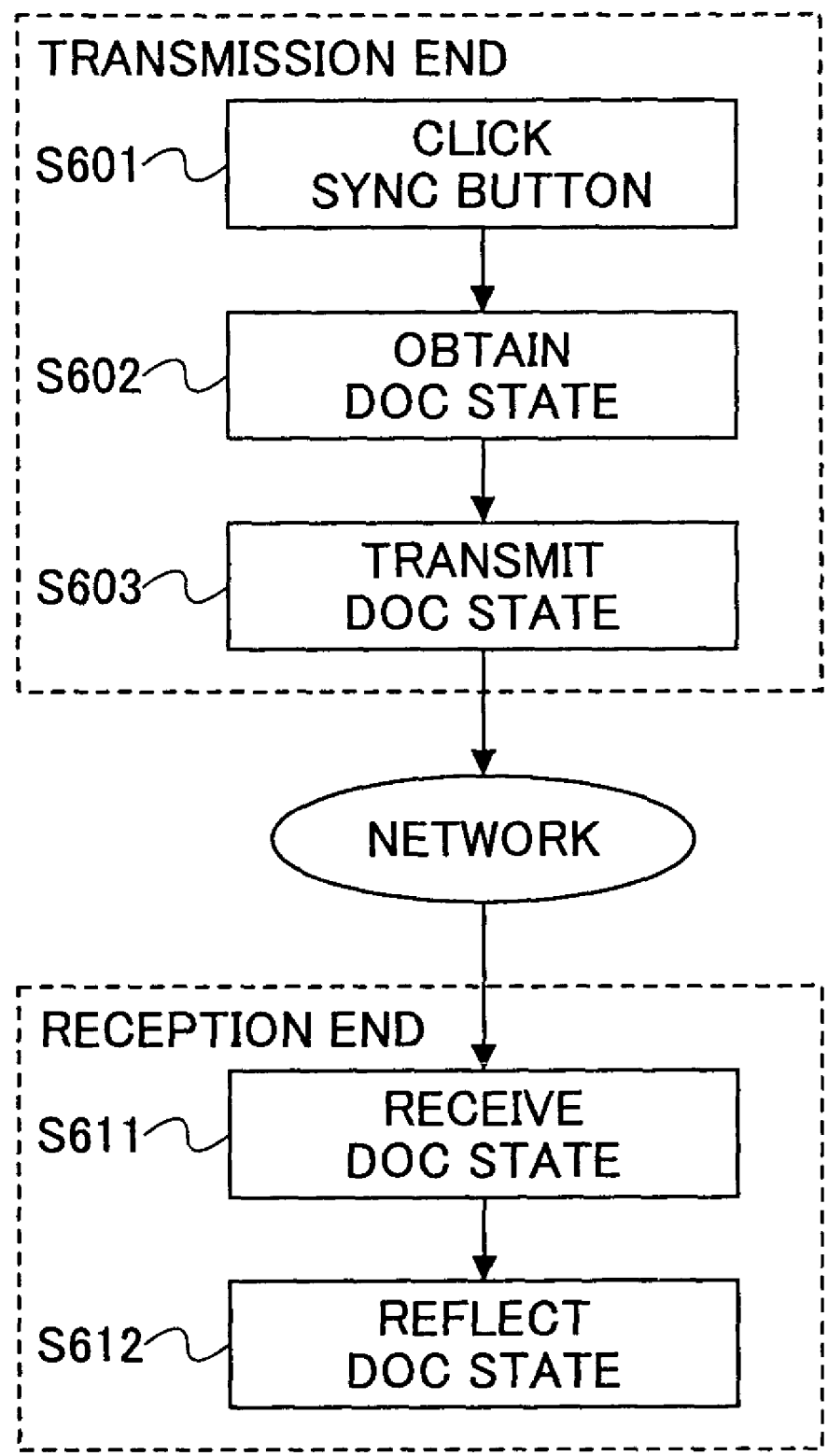
FIG. 17 is a flow chart for explaining a process after the synchronization button is clicked.

FIG. 17 is a flow chart for explaining a process carried out after the synchronization button 502, that is, one of the select-all button 503 and the buttons 504, is clicked by the mouse 312. First, when the synchronization button 502 is clicked in a step S601, the expansion program 112 within the encapsulated document 101 detects this event in the step S210 shown in FIG. 10, and performs a process according to the detected event in the step S211. The process according to the event in this case is sending an information collecting request. That is, in the personal computer 301 at the transmitting end, the document state of the encapsulated document 101 which is started is acquired by the process of the expansion program 112 in a step S602. This document state refers to a collection of information such as information related to a state where a page "a" of the document is displayed and an image is popped up at a coordinate (x, y) of the display device 310. Then, the expansion program 112 sends the acquired document state via the network interface 309 to the personal computer 301 which started another encapsulated document 101, using a standard protocol, in a step S603.

Figure 18:
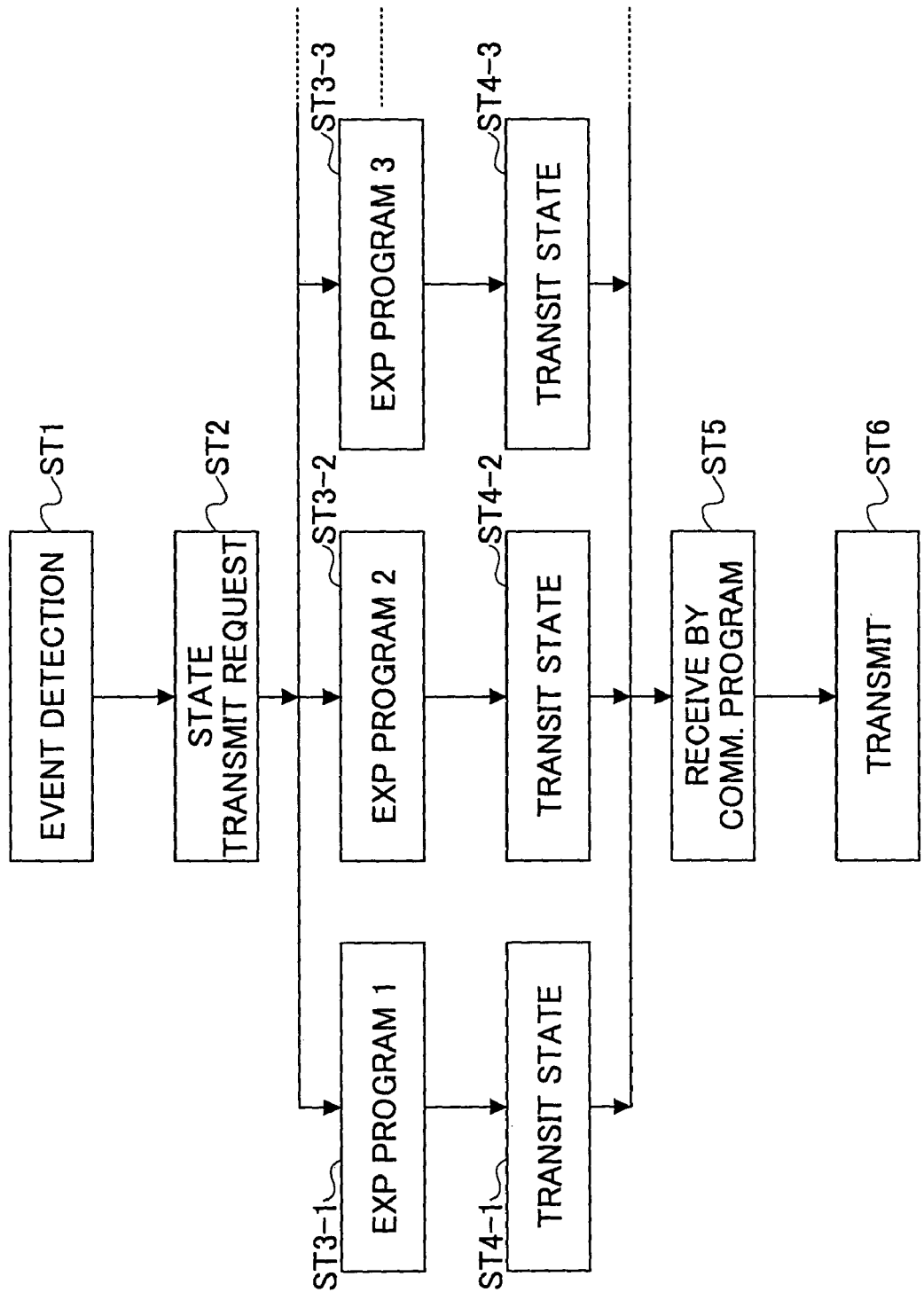
FIG. 18 is a diagram showing the process shown FIG. 17 in more detail.

FIG. 18 is a diagram showing the process shown FIG. 17 in more detail. When the expansion program 112 detects the event in response to the clicking of the synchronization button 502 (select-all button 503 or button 504) by the mouse 312 in a step ST1, the expansion program 112 makes a state transmission request in a step ST2. Hence, expansion program modules M1, M2, M3, . . . of the expansion program 112 receive the state transmission request in respective steps ST3-1, ST3-2, ST3-3, . . . , and send the document state information in respective steps ST4-1, ST4-2, ST4-3, . . . . The document state information is received by a communication program module M11 of the expansion program 112 in a step ST5, and the received document state information is sent to the network via the network interface 309 in a step ST6.

Then, returning to the flow chart of FIG. 17, the personal computer 301 at the receiving end receives the document state information via the network interface 309 in a step S611. Then, based on the received document state information, the personal computer 301 at the receiving end reflects document state information to the display image of the encapsulated document 101 which is started and displayed on the display device 310.

Figure 19:
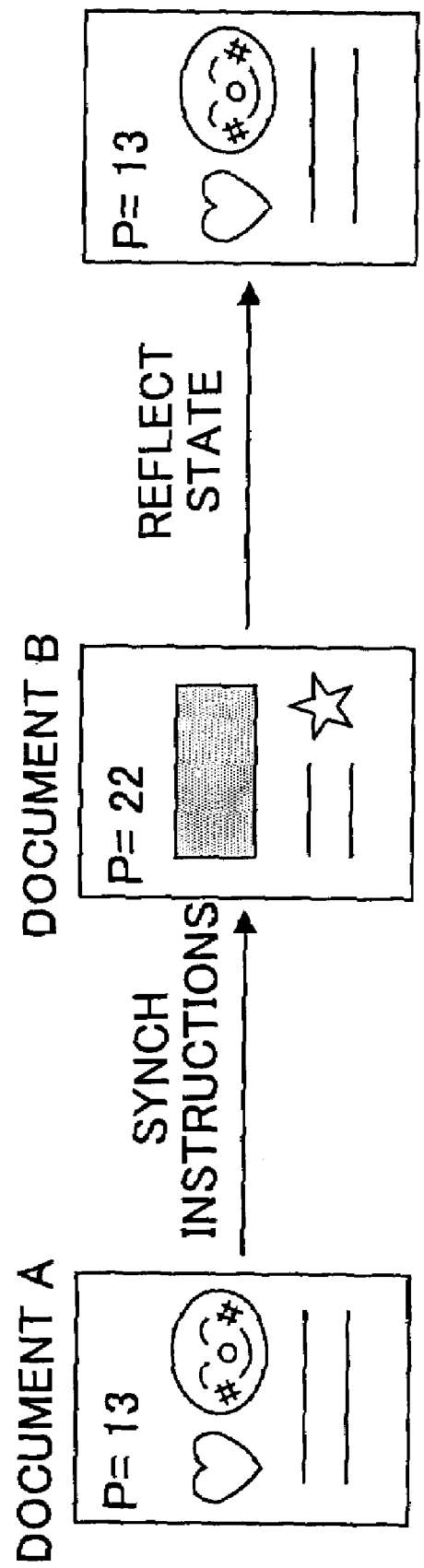
FIG. 19 is a diagram showing a state where two encapsulated documents A and B are synchronized.

FIG. 19 is a diagram showing a state where two encapsulated documents A and B (101) are synchronized. These documents A and document B are encapsulated documents 101 having the same contents. The document A started in one personal computer 301 displays the 13th page. (P.13) of the document A for example, while the document B started in another personal computer 301 displays the 22nd page (P.22) of the document B for example. When the document state information is sent from the document A to the document B in this state, the document B receives and reflects the document state information to the display of the document B, so that the display of the document B also becomes the 13th page (P.13) which is the same as that of the document A.

Such a synchronization process may be carried out in real-time. That is, in the case described above, when the synchronization button 502 is selected (or released), this selecting (or releasing) action is detected as an event, and the information collecting request for the document state information is sent to each of the expansion program modules M1 M2, M3, . . . included in the expansion program 112. But instead, an event which occurs after a certain action such as a turning over the page, displaying the image and enlarging the image, may be detected. Such an event may be detected by detecting a release of a button after clicking of the mouse 312. Then, based on the detected event, the information collecting request for document state information is sent to each of the expansion program modules M1, M2, M3, . . . included in the expansion program 112, and the communication program module M11 included in the expansion program 112 receives and sends the document state information in a manner similar to the above. It is thus possible to always synchronize the encapsulated documents 101 when the event is generated.

Thus, by synchronizing the encapsulated documents 101 in a plurality of personal computers 301, it becomes possible to exchange information between the encapsulated documents 101. For example, when a certain page of a certain encapsulated document 101 started in a plurality of personal computers 301 is to be viewed by the participants of the conference, the speaker opens this certain page of the certain encapsulated document 101 and clicks the synchronization button 502 by the mouse 312. In response to this selection of the synchronization button 502, the certain page is opened in another encapsulated document 101 which is started in the personal computer 301 and includes the same contents as the certain encapsulated document 101. As a result, the same certain page can be inspected by all of the participants of the conference, so that sharing or collaboration of the information becomes possible among the participants.

[User Action Recording and Reproducing Function Using Expansion Program 112]

A description will be given of the user action recording and reproducing function using the expansion program 112.

Although the recording and reproducing function of the encapsulated document 101 will be described in the following, it is not essential for the document to be the encapsulated document 101 in order to realize the recording and reproducing function. However, it is more useful to realize the recording and reproducing function for the encapsulated document 101 from the point of view of adding a function by the expansion program 112.

In the encapsulated document 101, in order to record the user action such as the user operation and communication information, an XML tag <RECORDER/> may be provided, for example.

When the program 105 reads the tag <RECORDER/>, a recording program (module) which is formed the expansion program 112 for the user operation and communication recording function is started, and a record button (not shown) is displayed within the display image of the encapsulated document 101.

For example, in a case where the display contents of the encapsulated document 101 on the display device 310 are "display of page x", data indicating a document display state such as "page=x" is recorded by the user operation and communication recording function.

Figure 20:
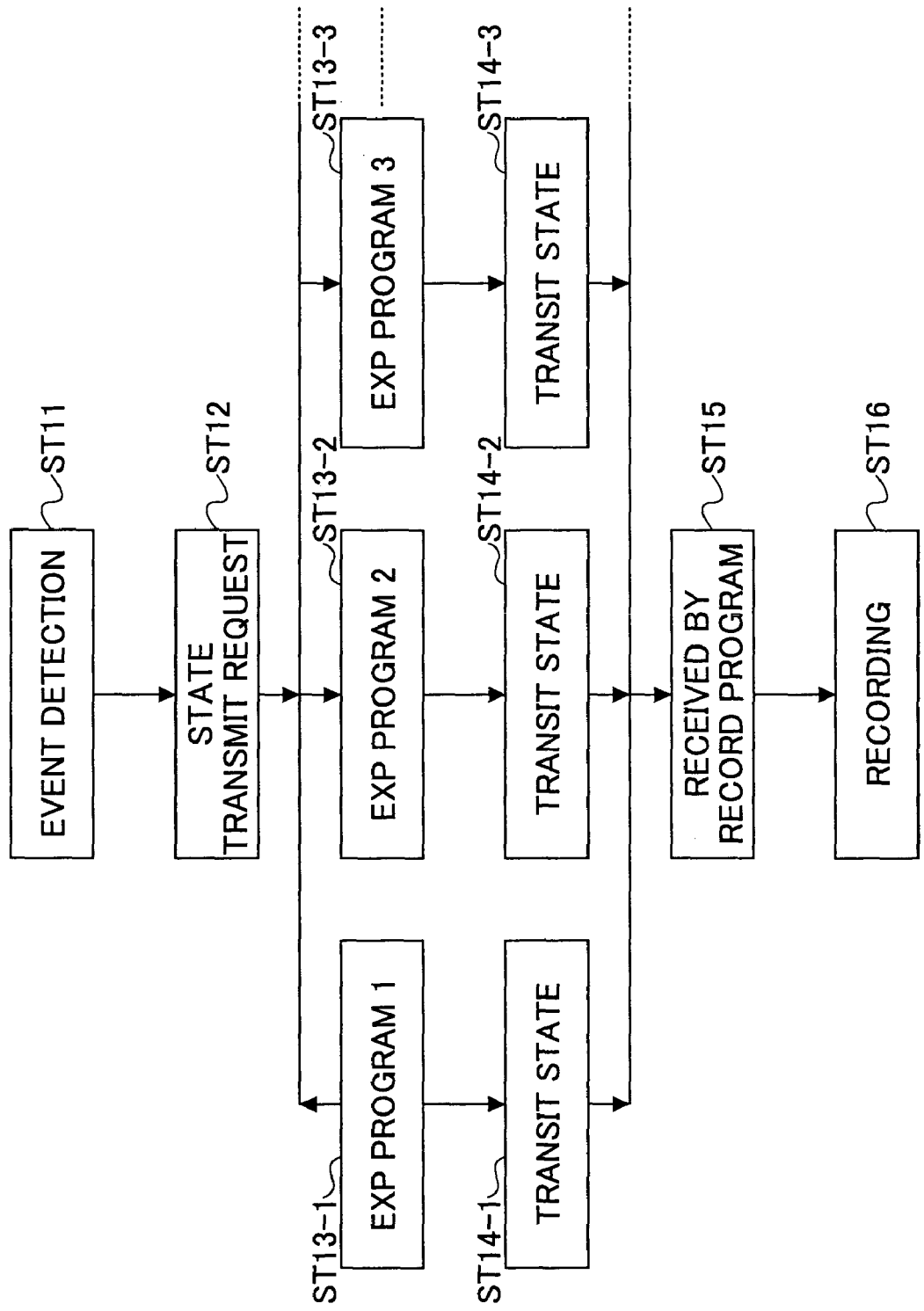
FIG. 20 is a diagram showing a procedure for collecting documents states of displayed documents.

FIG. 20 is a diagram showing a procedure for collecting documents states of documents displayed on the display device 310. When an event such as a clicking of the mouse 312 is detected in the step 210 shown in FIG. 10, this event is detected in a step ST11 shown in FIG. 20, and an information collecting request is issued with respect to expansion program modules M21, M22, M23, . . . of the expansion program 211 in a step ST12. The information collecting request is received by the expansion program modules M21, M22, M23 . . . in respective steps S13-1, ST13-2, ST13-3, . . . , and the document state information is sent to the recording program (module M31) of the expansion program 211 for recording and reproducing the user action. The recording program acquires a collection of the document state information in a step ST15, and records the collection of the document state information in a step ST16. The user action which is recorded in this manner includes, in addition to the specific user operations, communication information related to the communication between the encapsulated documents 101 realized by the communication function.

A description will now be given of the recording of the communication information. When communications are performed among the encapsulated documents 101, the document state information is sent to each of the expansion program modules M21, M22, M23, . . . . Hence, the recording program which receives the document state information from each of the expansion program modules M21, M22, M23, . . . records the document state information.

Figure 21:
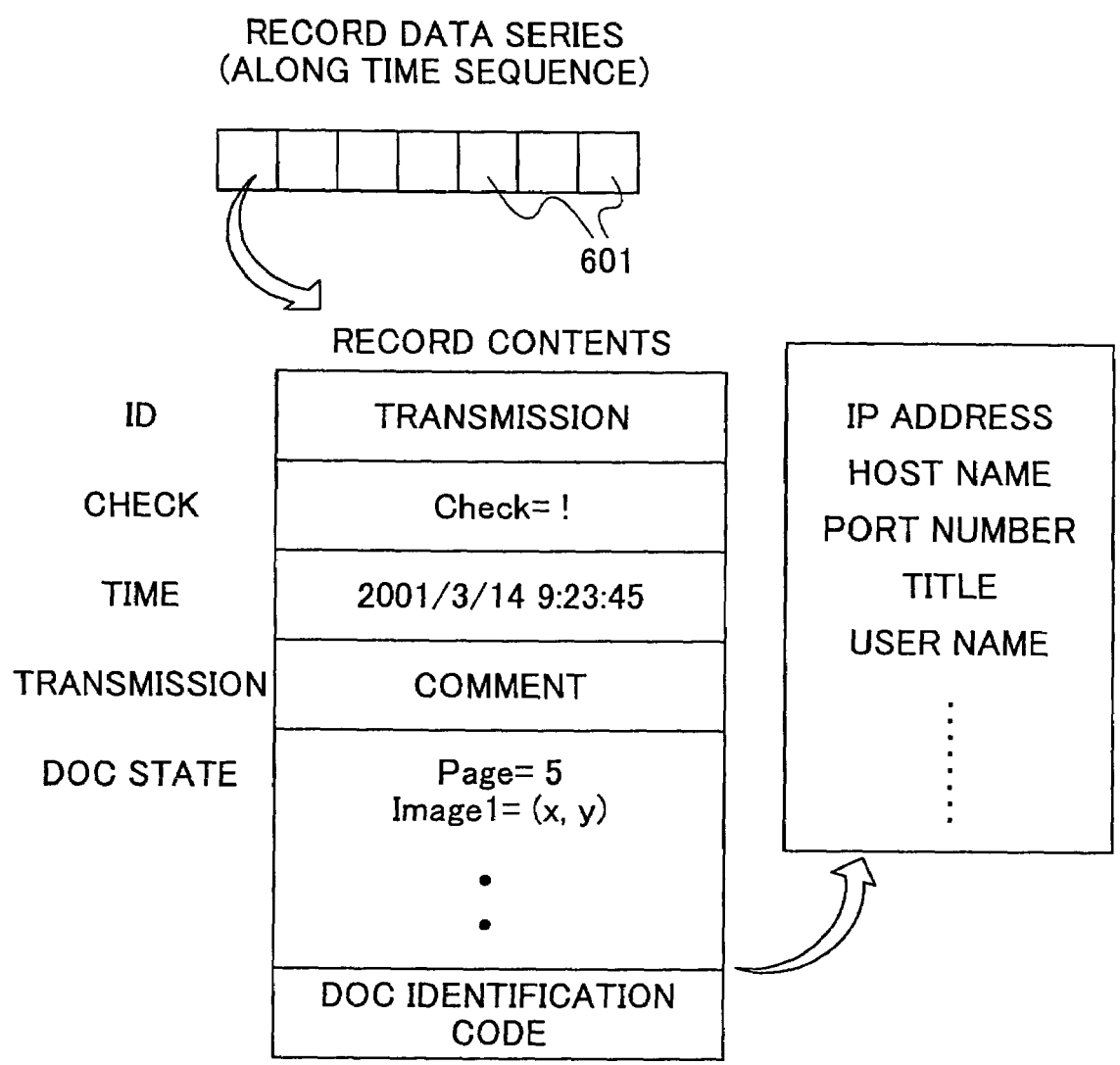
FIG. 21 is a diagram showing a data structure of record data recorded by a recording program.

FIG. 21 is a diagram. showing a data structure of the record data recorded by the recording program. As shown in FIG. 21, the record data is time-sequentially arranged and recorded for each recording unit which may be made arbitrarily set by the user. The contents of the record data include the transmission ID, the time of transmission, existence or absence of the check, the document state and the like in the case of the data at the time of the transmission. Moreover, an identification code is also recorded for the information which is recording, such as the identification code of the transmitting source in the case of the transmitting source, and the identification code of the document in the case of the recording of the user operation.

Figure 22:
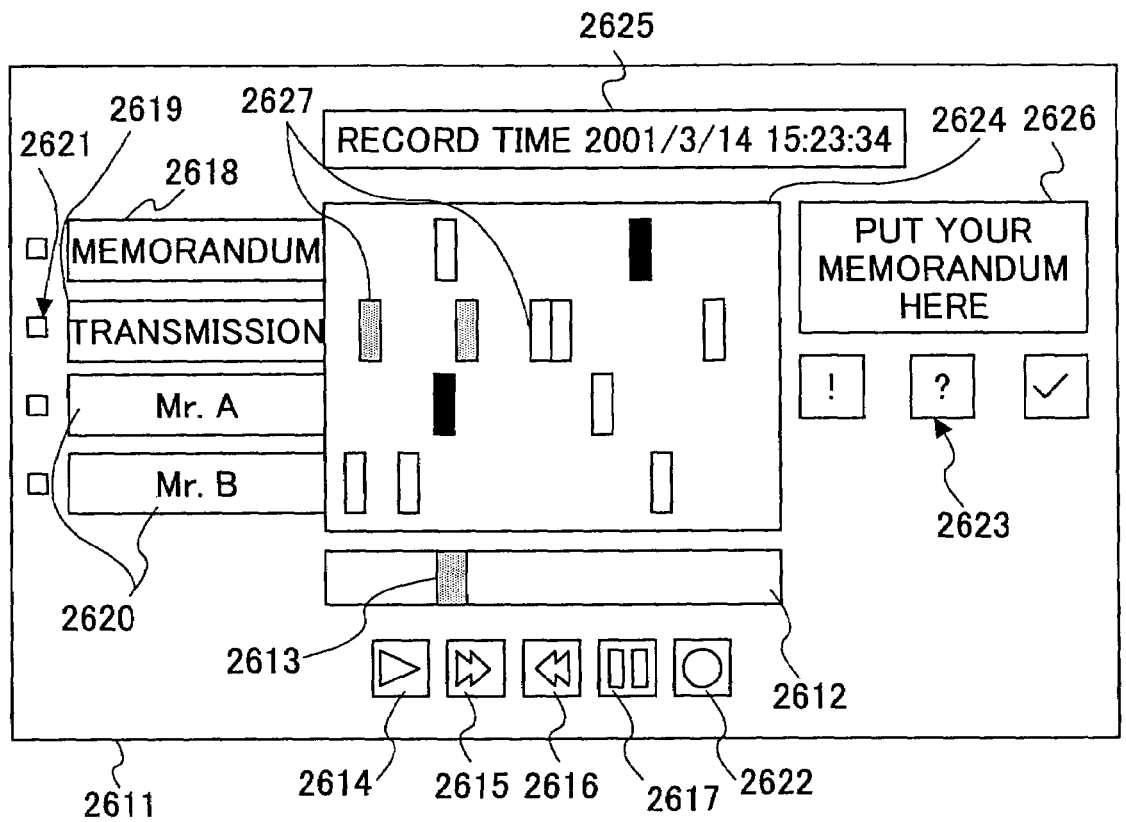
FIG. 22 is a diagram showing a display at the time of a recording.

FIG. 22 is a diagram showing the display at the time of the recording. When the record button (not shown) included in the encapsulated document 101 displayed on the display device 310 is clicked by the mouse 312, the program 105 detects this action and a pop-up display of a pop-up window 611 shown in FIG. 22 is displayed on the display device 310. A record of the operations made by the user, the record of transmissions, the record of receptions, and timings when the operations, transmission and receptions were made are displayed in this pop-up window 611.

A description will be given of the objects displayed within the pop-up window 611. A record display slider 612, a reproduction button 614, a fast forward button 615, a rewind button 616, a pause button 617, a memorandum button 618, a transmit button 619, receive buttons 620, check boxes 621, a record button 622, and check buttons 623 are displayed within the pop-up window 611 as shown in FIG. 22.

Further, a recording progress display field 624, a time display field 625, and a memorandum writing field 626 are also displayed within the pop-up window 611, as shown in FIG. 22. Record identifiers 627 which become metaphors of the records are displayed within the record progress display field 624. These record identifiers 627 visually indicate the state of the records by being arranged in correspondence with the memorandum button 618, the transmit button 619 and the receive button 620 which are regarded as the ordinate, and the elapse of time regarded as the abscissa.

By moving a bar 613 of the record display slider 612 to a desired time for display, the document state is called from the information stored at the desired time, and the display of the document is changed to the called document state. Hence, the record display slider 612 functions as an object for changing the display of the document to the document state stored at the desired time which is specified by moving the bar 613.

Figure 23:
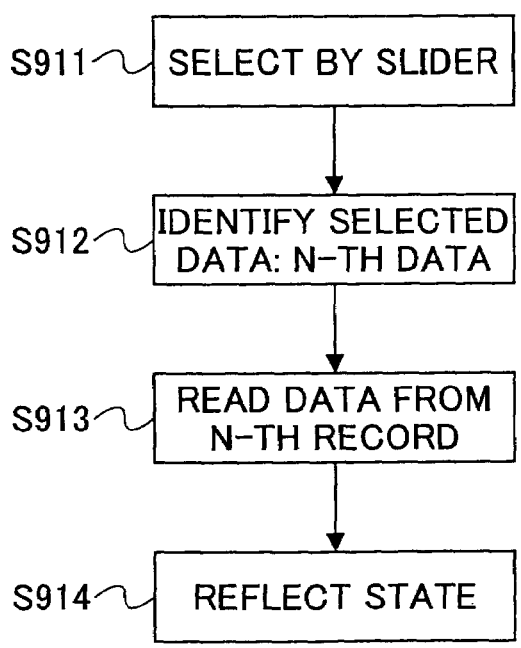
FIG. 23 is a flow chart for explaining a process executed by an expansion program depending on an operation of a record display slider.

FIG. 23 is a flow chart for explaining a process executed by the expansion program 112 depending on the operation of the record display slider 612. As shown in FIG. 23, when a record for which the state display is to be made is selected by the record display slider 612 in a step S911, the number of the selected record in the time-sequential record data is acquired in a step S912. For example, if the selected record is the Nth data in the time-sequential record data shown in FIG. 21, the Nth record data is read out in a step S913. Then, the corresponding document state information stored in a storage region (not shown) is read out to display the document state with the contents based on the document state information, and the document state is reflected to the present display in a step S914.

The reproduction button 614 is used to instruct the change of the document state to be displayed time-sequentially. The fast forward button 615, the rewind button 616 and the pause button 617 are used to instruct the respective functions. The memorandum button 618, the transmit button 619, the receive buttons 620 indicated as "Mr. A" and "Mr. B", and the check boxes 621 on the left are used to select the data to be reproduced.

Figure 24:
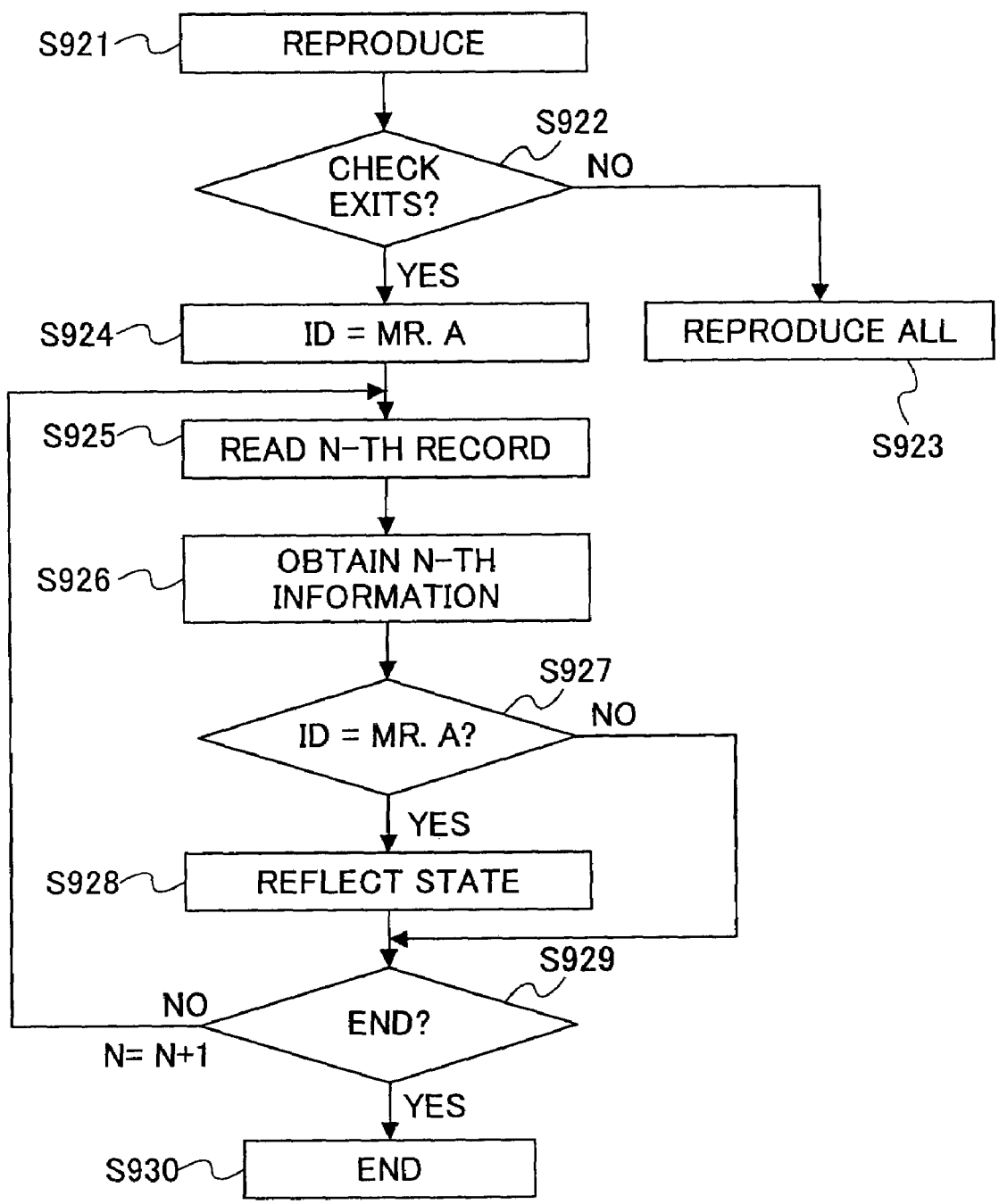
FIG. 24 is a flow chart for explaining a reproducing process.
Figure 25:
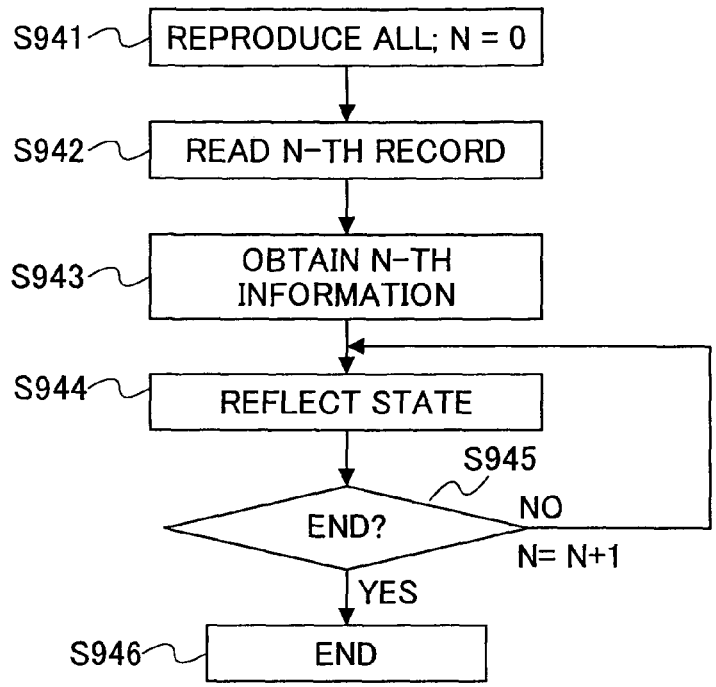
FIG. 25 is a flow chart for explaining the reproducing process.

FIGS. 24 and 25 are flow charts for explaining a reproducing process. When the program 105 detects that the reproduction button 614 is clicked by the mouse 312 in a step S921, a confirmation is made to determine whether or not the check boxes 621 have been checked, in a step S922.

As a result, if no check box 621 is checked and the decision result in the step S922 is NO, all of the records are reproduced and reflected to the document time-sequentially in a step S923. For this purpose, as shown in FIG. 25, a data number N which specifies the time-sequential order of the records is set to N=0 in a step S941, and the reading of the record is started from the Nth data in a step S942. The Nth data is acquired in a step S943. Then, the document display is changed based on the document state information of the acquired data to the state indicated by the document state information, so as to reflect the document state information to the document in a step S944. Thereafter, a judgement is made to determine whether the end of the data sequence is reached, in a step S945. If the decision result in the step S945 is NO, the data number N is incremented to N=N+1, and the process returns to the step S942 so as to read, acquire and display the Nth data in the steps S942 through S944. The process ends in a step S946 if the decision result in the step S945 is YES.

On the other hand, if one or more check boxes 621 are checked and the decision result in the step S922 is YES, only the records having the check marks are reproduced. FIG. 24 shows process for a case where the check mark is inserted with respect to the record of a transmission received from "Mr. A". In other words, since the check mark is inserted with respect to the record of the transmission received from "Mr. A" as a result of confirmation of the check boxes 621 in the step S922, only the record of "Mr. A" is reflected to the display in by setting the ID information to ID=A in a step S924. The reading of the record is started from the Nth data in a step S925 by setting the data number N which specifies the time-sequential order of the records to N=0, and the Nth data is acquired in a step S926. The ID information in the read data is checked to determine whether or not ID=A in a step S927.

As shown in FIG. 21 which shows the data structure of the record data, the record contents include the ID information. This ID information indicates the type of record or the record contents. For example, in a case where the record is related to a transmission made by the user, information such as "ID=transmission" is indicated by the ID information. In a case where the record is related to a reception of a transmission received from "Mr. A", information such as "ID=Mr. A" is indicated by the ID information.

Hence, in the flow chart shown in FIG. 25, the ID information in the read data is checked to determine whether or not ID=A in the step S927, and if the decision result in the step S927 is YES, the state of this record is reflected to the present display of the document in a step S928. On the other hand, if the decision result in the step S927 is NO or after the step S928, a confirmation is made to determined whether or not the data is the last data of the record in a step S929. If the decision result in the step S928 is NO, the data number N is incremented to N=N+1, and the process returns to the step S925, so as to repeat the above described process until the end of the data of the record is reached. The process ends in a step S930 if the decision result in the step S929 is YES.

The record button 622 is clicked by the mouse 312 when the user wishes to save the record of the document state intentionally.

The check buttons 623 are used to add information such as "important (!)", "question (?)" and the like to the record of the document state. When such information is added by clicking the check buttons 623 by the mouse 312, the colors of the corresponding record identifiers 627 displayed in the record progress display field 624 are changed depending on the added information.

In a case where the check buttons 623 are displayed together with the record button 622 within the initial document panel and if the check button 623 corresponding to "important (!)" is clicked, for example, the document state may be recorded by setting the Check information within the record data shown in FIG. 21 to "Check=!".

The contents written in the memorandum writing field 626 are recorded together with the record data. The record data in this case is the record data displayed at the time when the comments are written.

Moreover, at a time of the recording, time information is acquired from the personal computer 301 and stored with the record of the document state. The time when the document is started may be also stored, and lapse of time from this started time may also be stored. Such time information is displayed in the time display field 625.

Figure 26:
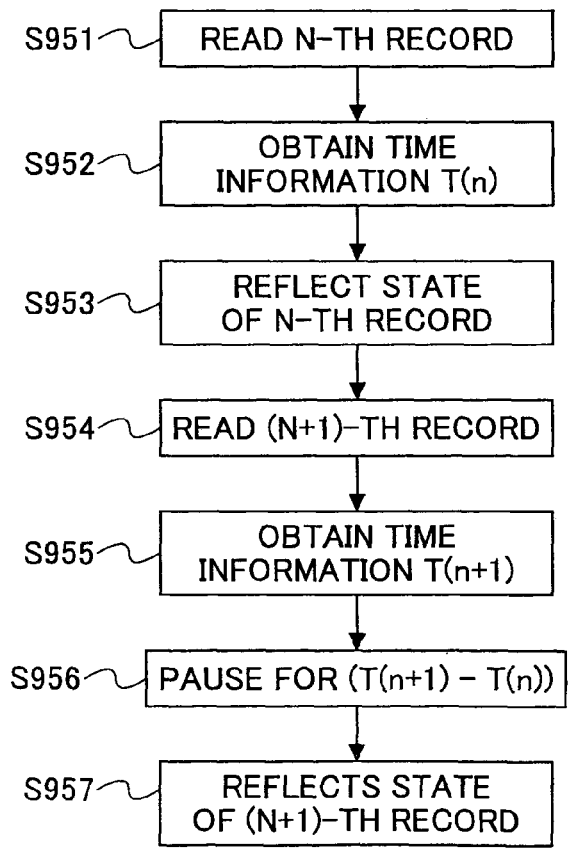
FIG. 26 is a flow chart for explaining a time setting process.

FIG. 26 is a flow chart for explaining a time setting process. The control of the time interval when carrying out the reproduction, fast forward, rewind and pause processes is performed based on the time acquired from the personal computer 301. That is, when changing the reproduction from the nth record to the (n+1)th record as in the case shown in FIG. 26, for example, the data sequence of the nth record is read in a step S951, and time information T(n) of the nth record is acquired in a step S952. The state of the nth record is reflected to the display in a step S953. The (n+1)th data is read in a step S954, and time information T(n+1) of the (n+1)th record is acquired in a step S955. A time difference between the nth record and the (n+1)th record is computed from the time information T(n) and T(n+1) in a step S956, so as to delay the reflection of the (n+1)th record to the display by the time difference. For example, this time difference is reduced to one-half in the case of the fast forward process. After the delay amounting to this time difference, the (n+1)th record is reflected to the display in a step S957.

When making the records, a time difference between the present record data and the immediately preceding record data may be computed and stored in advance as a part of the data. In this case, the record data may be used without having to compute the time difference.

Since the record described above is recorded by each encapsulated document 101, each encapsulated document 101 has a unique communication record and a unique operation record.

EMBODIMENTS

A description will now be given of various embodiments of the data communication method, the data communication apparatus, the data communication system and the computer-readable storage medium according to the present invention, which operate under the above described preconditions.

[System Structure]

Figure 27A:
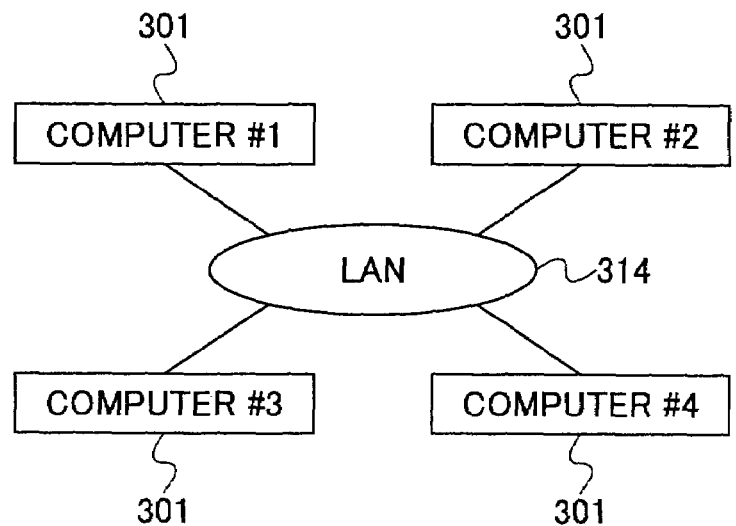
FIGS. 27A, 27B and 27C respectively are system block diagrams showing a system structure of an embodiment of a data communication system according to the present invention.
Figure 27B:
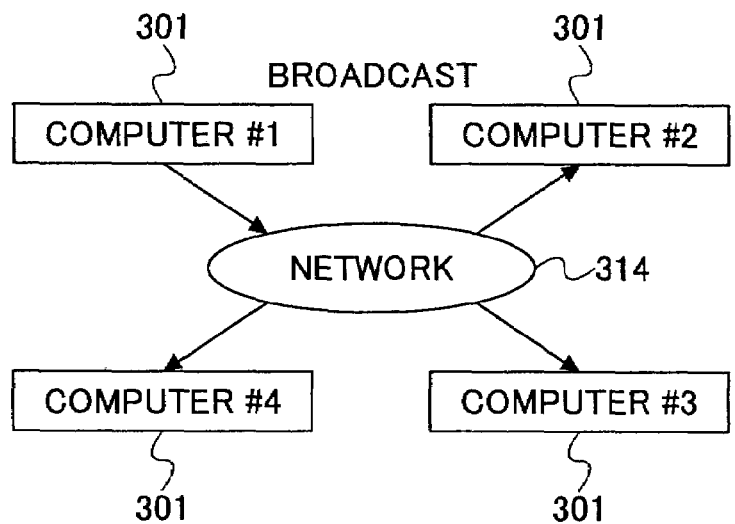
Figure 27C:
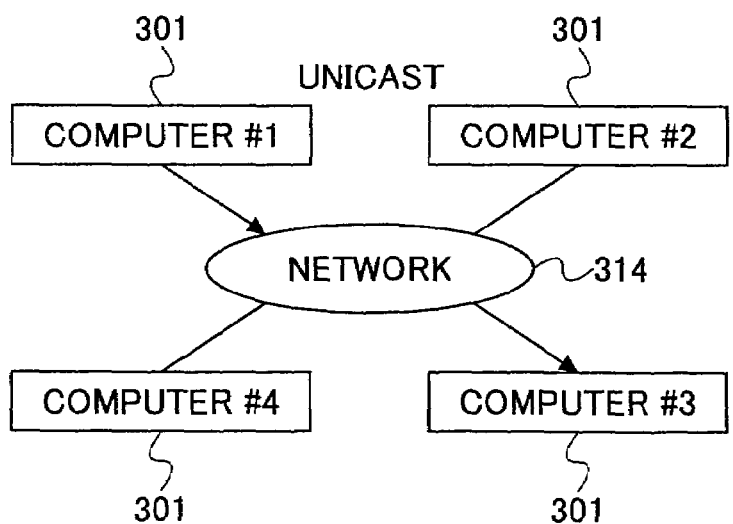

This embodiment of the data communication system is suited for application to a conference system or the like, and is formed by a plurality of computers which respectively function as a data communication apparatus and are connected to a network. FIGS. 27A, 27B and 27C respectively are system block diagrams showing a system structure of this embodiment of the data communication system according to the present invention.

The personal computer 301 having the structure shown in FIG. 8 is used as the computer which functions as the data communication apparatus. The application program of the personal computer 301 exchanges information (data) with another personal computer 301 via the network interfaces 309 of the two personal computers 301. In an office environment, a local area network (LAN) 314 is formed as the network, and the personal computers 301 (#1 through #4) are connected to the LAN 314 via respective network interfaces 309, as shown in FIG. 27A.

An IP address and a host name is allocated to each personal computer 301, so that each personal computer 301 may be uniquely determined. Since a unique IP address is allocated to each personal computer 301, it is possible to uniquely determine each personal computer 301, and exchange information via the network interface 309 as described above.

The generally existing network environment is provided with a broadcast or multicast function which enables simultaneous transmission to a large number of personal computers 301. The broadcast function enables the simultaneous transmission to a large number of unspecified personal computers 301. The multicast function enables the simultaneous transmission to a large number of specified personal computers 301, and only the personal computers 301 belonging to a specified multicast group receive the transmission. The broadcast and multicast functions can simultaneously distribute the same data to a large number of personal computers 301 by making the transmission to a specific exclusive IP address.

According to the broadcasting or multicasting, the information normally does not propagate beyond the LAN 314 (or sub network) which is the network structure unit. The information will propagate beyond the LAN 314 only if a Time To Live (TTL) which determines the propagation number of the multicast data is set to a value greater than 0, and a router (or network device) which relays the data between LANs and determines the data path (or route) is set to permit such a propagation beyond the LAN 314. In addition, depending on the router, the router may not be designed to cope with the multicasting itself.

The program which exchanges information with another personal computer 301 simultaneously transmits the same data from one personal computer 301 to a large number of other personal computers 301 as shown in FIG. 27B or, from one personal computer 301 to another personal computer 301 as shown in FIG. 27C. FIG. 27B shows the broadcasting or multicasting, where the same data is simultaneously transmitted from one personal computer 301 (#1) to other personal computers 301 (#2 through #4). On the other hand, 27C shows the unicasting, where the same data is simultaneously transmitted from one personal computer 301 (#1) to another personal computer 301 (#3).

[Program Structure]

Figure 28:
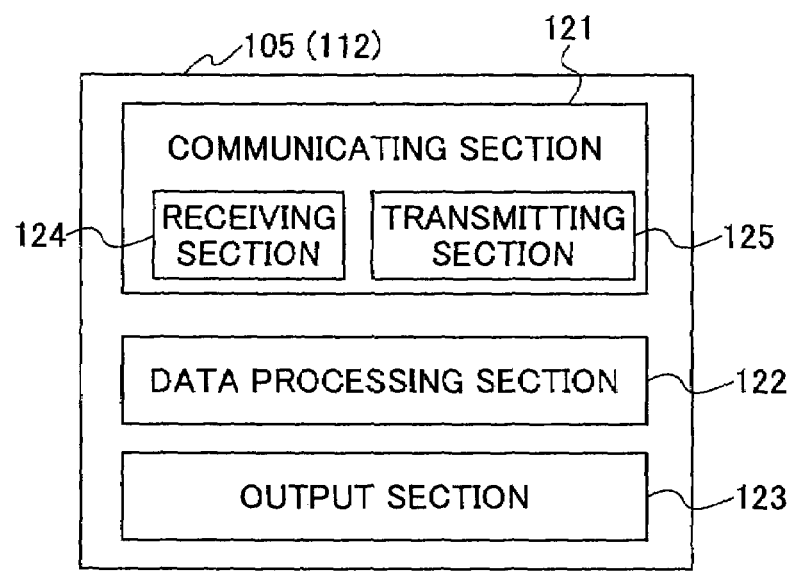
FIG. 28 is a diagram showing a structure of a program stored in the encapsulated document.

FIG. 28 is a diagram showing the structure of the program stored in the encapsulated document 101. It is not essential for the program to be integrated into the encapsulated document 101, but in this embodiment, it is assumed for the sake of convenience that the program stored in the encapsulated document 101 is one of the expansion programs 112 within the program 105 which is integrated into the encapsulated document 101.

This program includes a communication section (or communication program module) 121, a data processing section (or data processing program module) 122, and an output section (or output program module) 123. The communication section 121 has a communicating function for exchanging information between the personal computers 301. The data processing section 122 has a data processing function for storing received data, preparing transmitting data to be transmitted, and acquiring operation information. The output section 123 has an output function for displaying the received data and the like on the display device 310 with respect to the user.

The communication section 121 includes a receiving section (or receiving program module) 124 for receiving data, and a transmitting section (or transmitting program module) 125 for transmitting data. The receiving section 124 and the transmitting section 125 are used to exchange the data according to the User Datagram Protocol (UDP), Transmission Control Protocol/Internet Protocol (TCP/IP) or the like.

Figure 29:
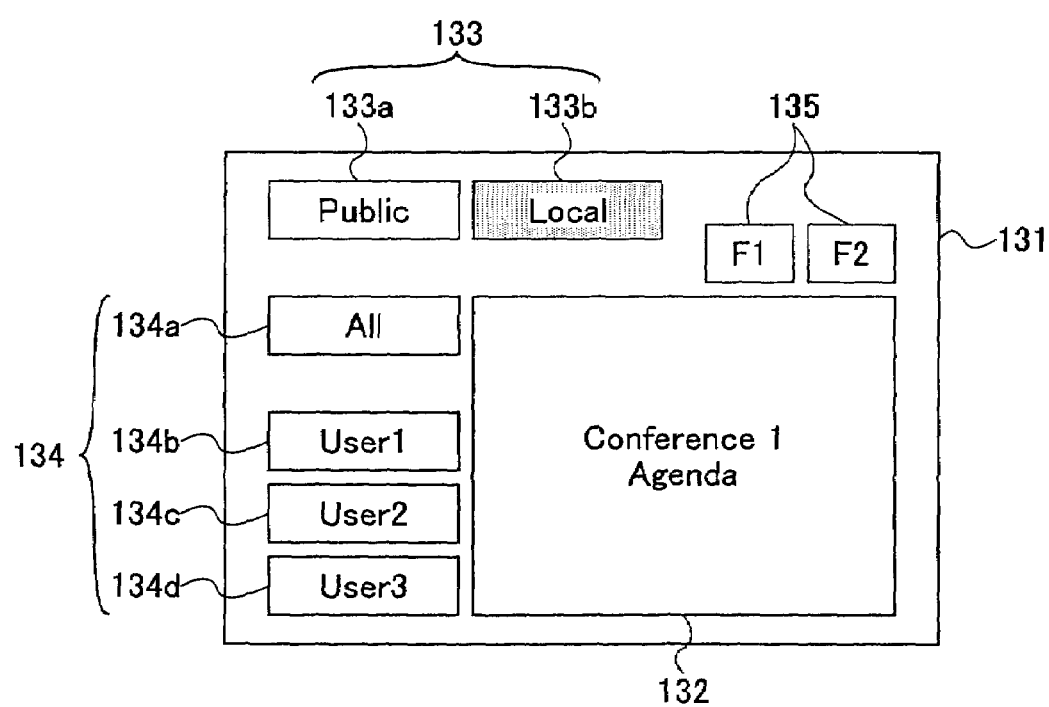
FIG. 29 is a diagram showing a display image.

The output section 123 displays a display image shown in FIG. 29 on the display device 310. FIG. 29 is a diagram showing the display image, that is, a user interface. This user interface includes an application frame 131 which indicates a window region of the application program, a contents display panel 132 for displaying the data contents, mode buttons 133 for switching the communication mode, transmit buttons 134 for transmitting data to specific users, and function buttons 135 such as "F1" and "F2" for adding a function with respect to the contents. The function added with respect to the contents may be the additional writing or the turning of the page. The mode buttons 133 include a public mode button 133a and a local mode button 133b in this embodiment. The operations in the three kinds of modes, including the public mode, the local mode and the private mode, will be described later in the specification.

A description will be given of the communication modes of this embodiment. At the time of the reception in the public mode, the information transmitted from another personal computer 301 in the public mode is received by the personal computer 301, and the received information is processed and transferred immediately to the output section 123 so as to reflect the received information to the display. At the time of the transmission, information related to the document state upon operation of the personal computer 301 is transmitted by broadcasting or multicasting when the operation information is acquired by an operation information acquiring function which will be described later without having the operate (click) the transmit buttons 134. The information related to the document state upon operation of the personal computer 301 indicates the state at the time when an event such as turning the page, additional writing and moving occurs.

In the local mode, the personal computer 301 itself does not transmit information. At the time of the reception, a background program of the personal computer 301 receives and stores the information transmitted from another personal computer 301 (program) in the public mode.

In the private mode, the personal computer 301 exchanges information with a specific personal computer 301 (program) by a 1:1 communication. At the time of the reception, a background program of the personal computer 301 receives and stores the information transmitted from another personal computer 301 (program) in the public mode.

In this embodiment, the operation in the public mode, the local mode and the private mode is controlled generally under the preconditions described above.

Of the transmit buttons 134, an "All" button 134a is operated when the transmission is to be made to all of the users (personal computers 301) with which the communication is established. The users (personal computers 301) with which the communication is established, that is, the communicatable personal computers 301 in the network 314, are displayed as a "User1" button 134b, a "User2" button 134c and a "User3" button 134d of the transmit buttons 134. In this particular case, the buttons 134b, 134c and 134d are operated when the transmission is to be made to corresponding users User1, User2 and User3.

The program started in each personal computer 301 broadcasts the information when started, so as to notify the programs already started in other personal computers 301. The information broadcast from the personal computer includes the IP address, host name, port number used for the communication, and the like. The program which receives such a notification returns user information stored in the program to the program which made the notification, so that each of the programs can obtain the common user information. In the case of a program located at a position which cannot receive the broadcast information, the user may transmit the information by directly specifying the IP address of the program. In the following description, the state where the communication is established refers to this state where the concerned personal computers 301 (programs) mutually hold the information such as the IP address and the port number used for the communication.

[Data Reception Under Public Mode/Local Mode Support]

Figure 30:
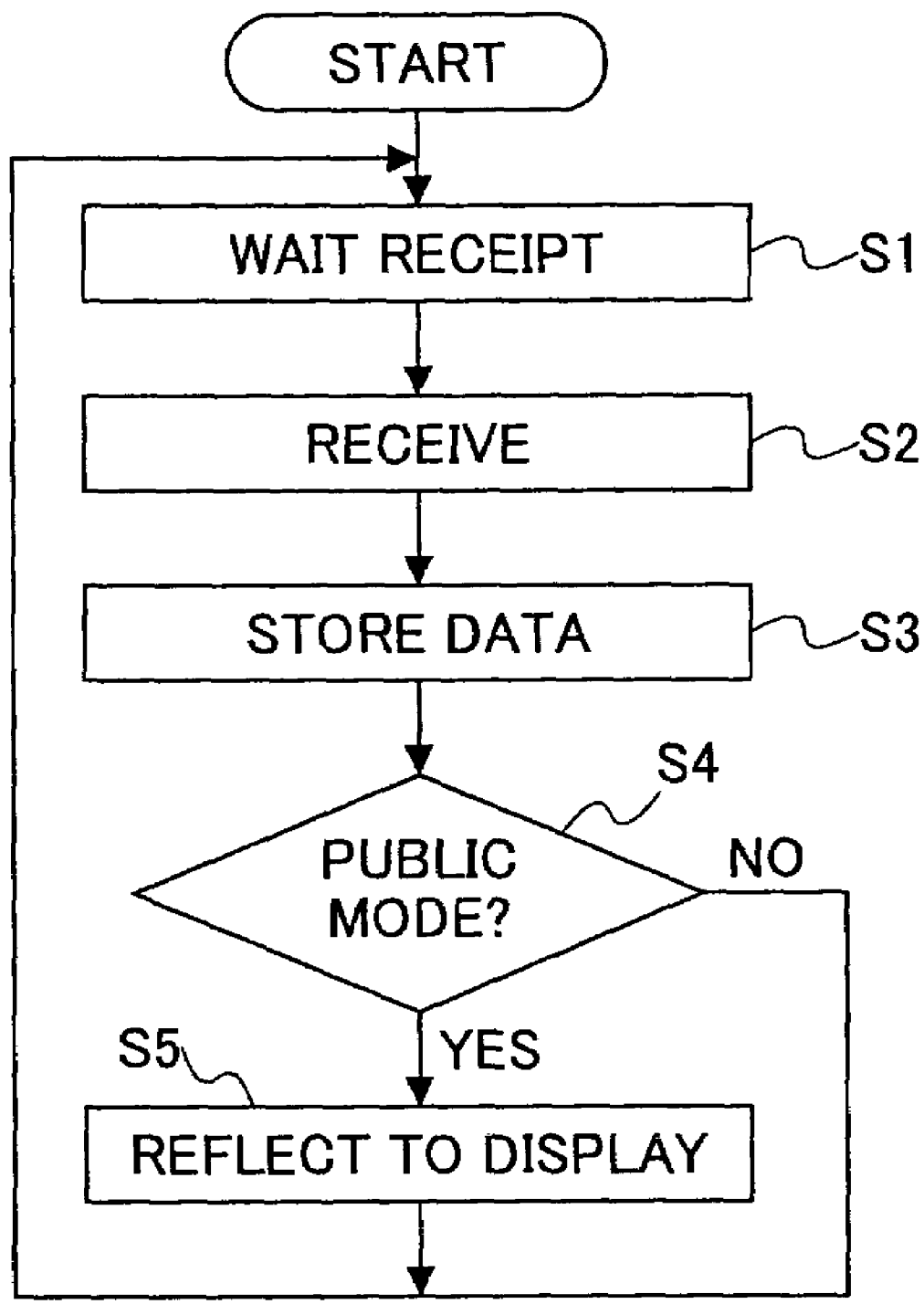
FIG. 30 is a flow chart for explaining a process at the time of a data reception.

After the communication is established, the document state at the time when the event such as the turning of the page and the additional writing occurs is transmitted and received among the personal computers 301 (programs). A description will be given of a process at the time of the data reception to receive the state information. FIG. 30 is a flow chart for explaining the process at the time of the data reception.

In FIG. 30, the program, when started, assumes a data wait state in a step S1. When data is received in a step S2, the received data is stored in a memory such as the RAM 304 shown in FIG. 8. in a step S3, regardless of the communication mode of the personal computer 301 in which the program is started. This step S3 which is independent of the communication mode forms to a storing step or a storing means (or section). A step S4 decides whether or not the communication mode of the program is the public mode. If the decision result in the step S4 is YES, the received data is sent to a display program of the output section 123 in a step S5 so as to reflect the received data on the display on the display device 310. On the other hand, if the decision result in the step S4 is NO, no data is sent to the display program of the output section 123. The process returns to the step S1 after the step S5 or, if the decision result in the step S4 is NO. The step S4 forms a mode judging step or a mode judging means (or section). The step S5 and the step S4 when the decision result in the step S4 is YES form a public mode receiving step or a public mode receiving means (or section). The step S4 when the decision result in the step S4 is NO forms a local mode receiving step or a local mode receiving means (or section).

Accordingly, in the public mode, the information transmitted from other programs are reflected as it is to the program. If not in the public mode, that is, in the local mode, the received data is stored by the background program, and the display is not changed depending on the data received from other programs.

Figure 31:
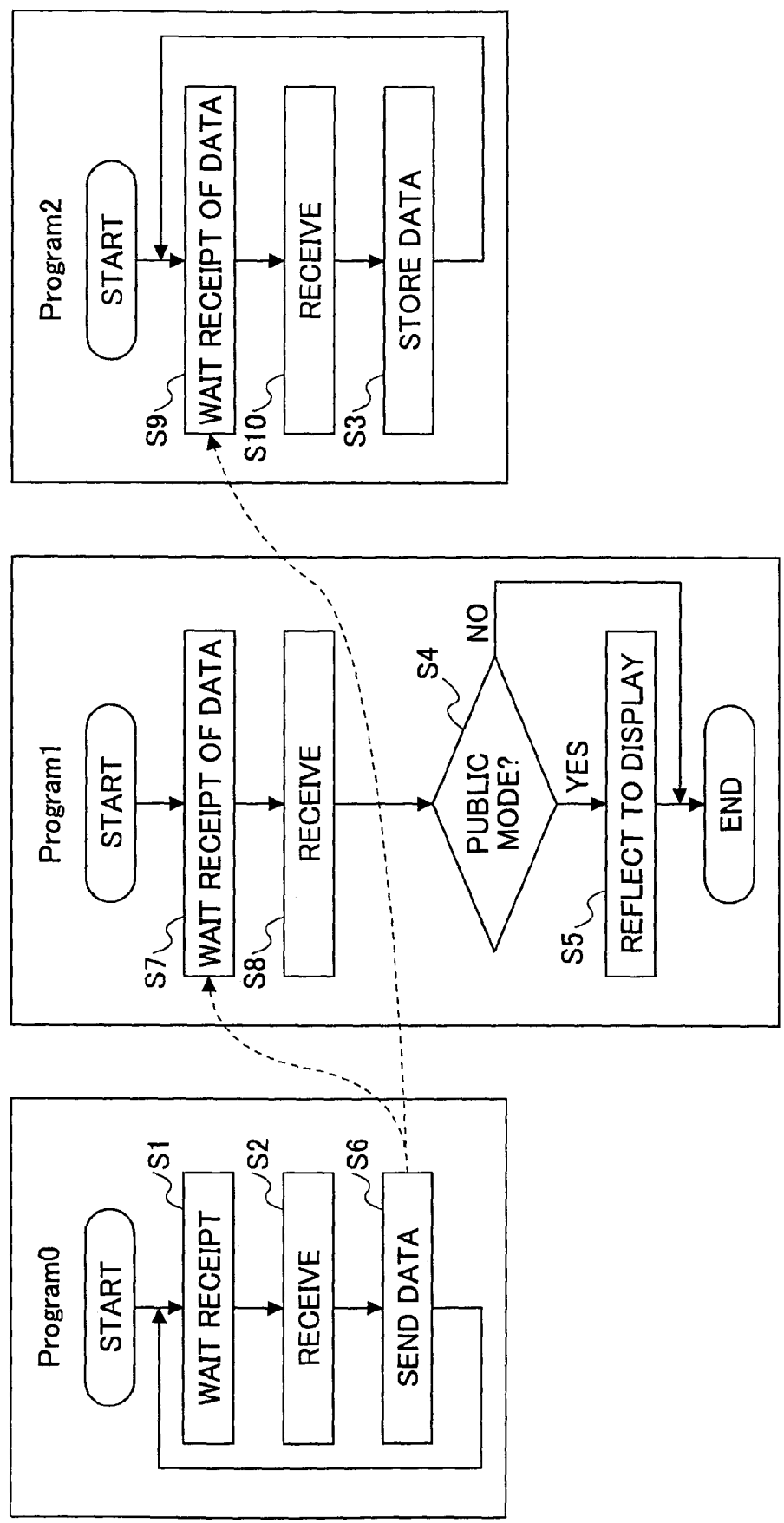
FIG. 31 is a flow chart for explaining processes of a communication program and two data processing programs.

FIG. 31 is a flow chart for explaining processes of a communication program Program0 of the receiving section 124 within the communication section 121, and two data processing programs Program1 and Program2 of the data processing section 122.

The communication program Program0 focuses on the data reception. The step S1 assumes a data wait state, the step S2 receives the data, and a step S6 immediately sends the received data to the data processing programs Program1 and Program2.

In the data processing program Program1, a step S7 assumes a data wait state to wait for data from the communication program Program0, and a step S8 receives the data from the communication program Program0. The step S4 decides whether or not the personal computer 301 is in the public mode. If the decision result in the step S4 is YES, the step S5 sends the received data to the display program to reflect the contents of the received data to the display, and the process ends. If the decision result in the step S4 is NO, the process ends.

In the data processing program Program2, a step S9 assumes a data wait state to wait for data from the communication program Program0, and a step S10 receives the data from the communication program Program0. The step S3 stores the received data in the memory, and the process returns to the step S9, so as to successively store the received data.

The advantage of separating the communication program Program0 and the data processing programs Program1 and Program2 is that, each program can process the data in parallel even when an extremely large amount of data is continuously received. As a result, it is possible to prevent an undesirable situation where the processing of the previously received data is delayed and the subsequent data which should have been transmitted cannot be received until the processing is completed.

Therefore, according to this embodiment, it is possible to realize the public mode which always receives the data transmitted from another personal computer 301 and immediately transfer the information related to the received data to the display program so as to reflect the information to the display, and the local mode which enables a local (personal operation) while receiving the data transmitted from another personal computer 301 by the background program. Hence, in the case of the presentation or conference, the communication mode may be set to the public mode so that the information intended by the speaker is always displayed on the display device 310 of the personal computer 301 used by the speaker. In addition, the communication mode may be set to the local mode so that the participant may locally look back at the materials or preview the materials on the display device 310 of the personal computer 301 used by the participant, without the display being forcibly changed, so that the participant may concentrate on his work. In addition, the data received during the local mode is stored and may be viewed later by the participant, so that the participant will not miss any information distributed during the presentation or conference.

[Data Reception Under Public Mode/Local Mode/Private Mode Support]

Next, a description will be given of the data reception when there are three communication modes, namely, the public mode, the local mode and the private mode.

Figure 32:
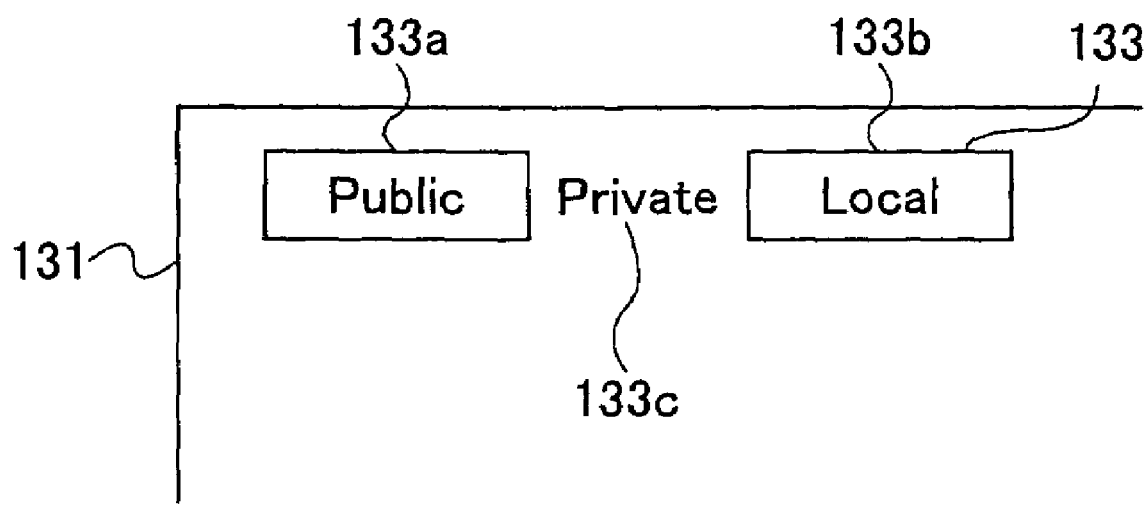
FIG. 32 is a diagram showing a part of the display image for a case including a private mode.

FIG. 32 is a diagram showing a part of the display image, that is, a user interface, for the case including the private mode in addition to the public mode and the local mode. As shown in FIG. 32, a "Private" label 133c is provided in addition to the "Public" button 133a and the "Local" button 133b which are provided to switch the communication mode. When making the transmission and reception by the unicasting, the "Private" label 133c is displayed in the application frame 171 to indicate the private mode.

Figure 33:
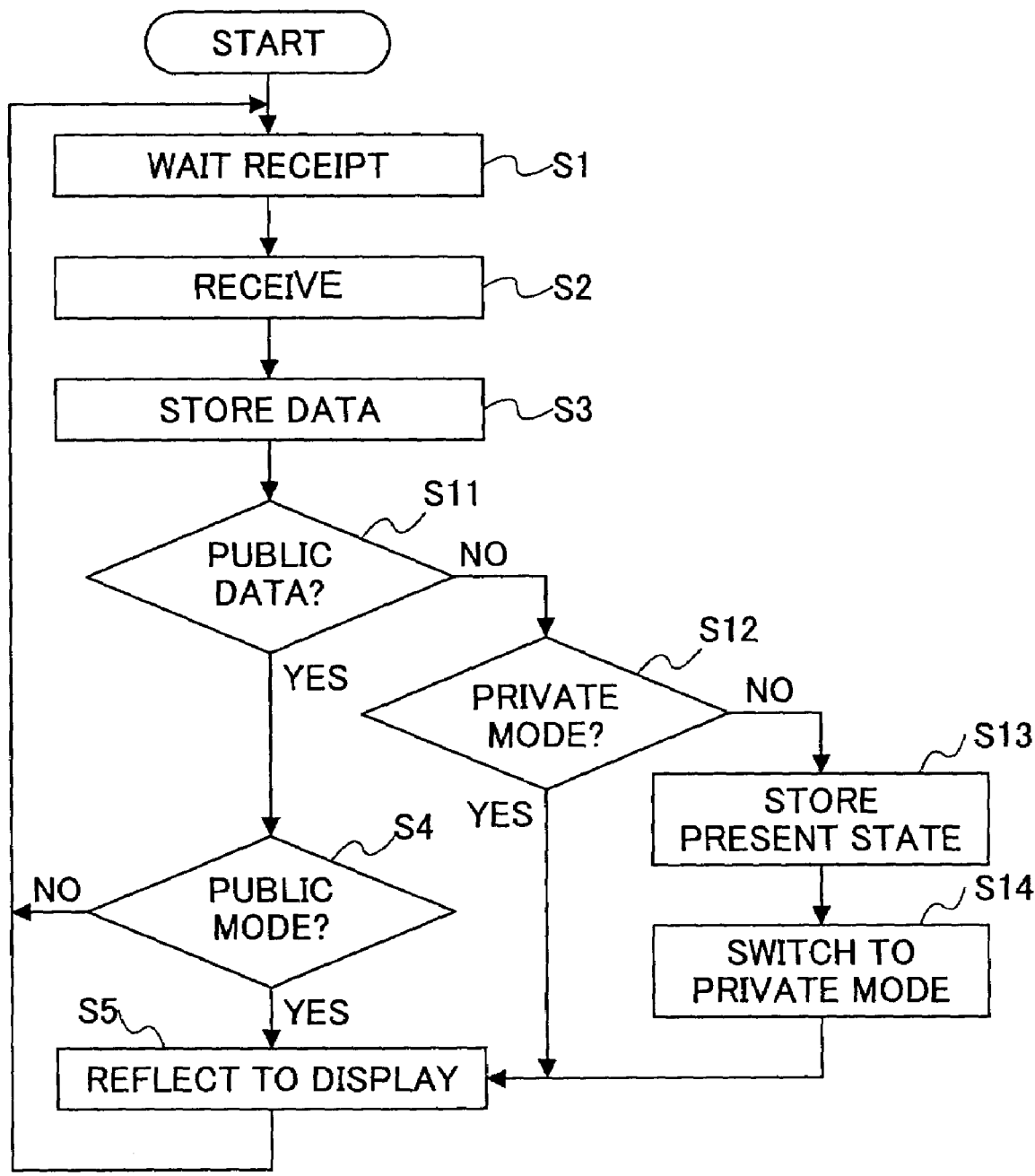
FIG. 33 is a flow chart for explaining a process at the time of the data reception for the case including the private mode.

FIG. 33 is a flow chart for explaining a process at the time of the data reception for the case including the private mode in addition to the public mode and the local mode. In FIG. 33, the program, when started, assumes a data wait state in the step S1. When data is received in the step S2, the received data is stored in the memory in the step S3, regardless of the communication mode of the personal computer 301 in which the program is started. A step S11 decides whether or not the received data is public data received from a program in the public mode, based on the mode attribute of the received data. If the decision result in the step S11 is YES, the step S4 decides whether or not the communication mode of the program is the public mode. If the decision result in the step S4 is YES, the received data is sent to the display program of the output section 123 in the step S5 so as to reflect the received data on the display on the display device 310. On the other hand, if the decision result in the step S4 is NO, no data is sent to the display program of the output section 123. The process returns to the step S1 after the step S5 or, if the decision result in the step S4 is NO.

On the other hand, if the received data is received by unicasting and the decision result in the step S11 is NO, a step S12 decides whether or not the communication mode of the program is the private mode. If the decision result in the step S12 is YES, the received data is sent to the display program of the output section 123 in the step S5 so as to reflect the received data on the display on the display device 310. If the decision result in the step S12 is NO, a step S13 stores the present display state in the memory, and a step S14 automatically switches the communication mode to the private mode. After the step S14, the received data is sent to the display program of the output section 123 in the step S5 so as to reflect the received data on the display on the display device 310.

The step S11 when the decision result is NO, the step S12 when the decision result is NO, and the step S14 form a private mode switching step or private mode switching means (or section), for quickly switching the communication mode to the private mode in which the data transmission and reception are performed between specific personal computers 301.

When storing (saving) the display state in the present communication mode of the personal computer 301, the display state is stored as the newest data of the public mode if the personal computer 301 is in the public mode, and is stored as the newest data of the local mode if the personal computer 301 is in the local mode.

Therefore, the steps S11, S4 and S12 form a mode judging step or a mode judging means (or section). Furthermore, the steps S2 and S3, the step S11 when the decision result is NO, the steps S12 through S14 and S5 form a private mode receiving step or a private mode receiving means (or section).

Figure 34:
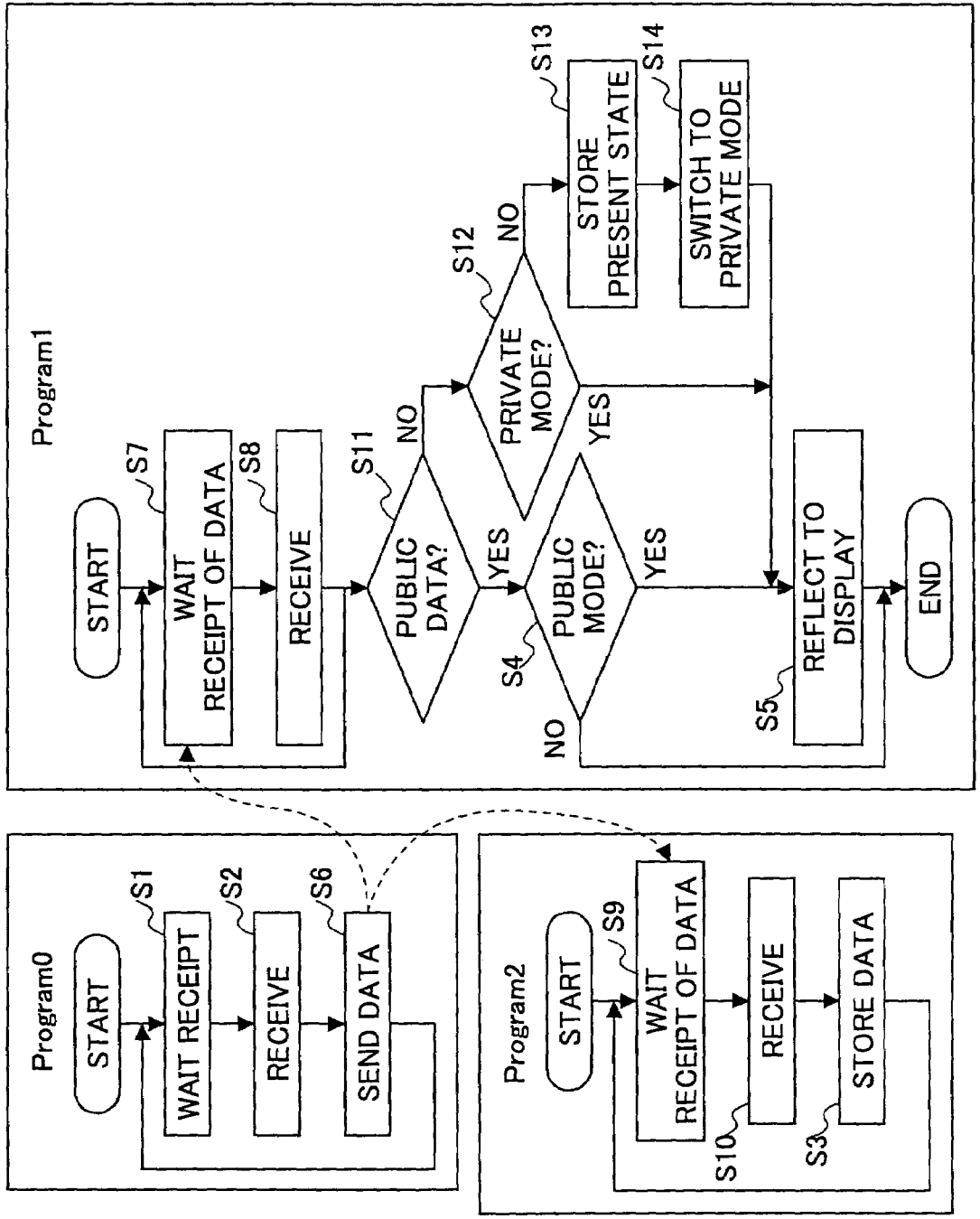
FIG. 34 is a flow chart for explaining processes of the communication program and two data processing programs.

FIG. 34 is a flow chart for explaining processes of the communication program Program0 of the receiving section 124 within the communication section 121, and the two data processing programs Program1 and Program2 of the data processing section 122. In FIG. 34, those steps which are the same as those corresponding steps in FIGS. 31 and 33 are designated by the same reference numerals, and a description thereof will be omitted.

Basically, the communication program Program0 and the data processing program Program2 shown in FIG. 34 are the same as those shown in FIG. 31. FIG. 34 differs from FIG. 31 that the steps S11 through S14 are provided within the data processing program Program1.

Therefore, in this case, the private mode for exchanging the data between the specific personal computers 301 is provided in addition to the public mode and the local mode. Since the received data is stored even during the private mode, it is possible to receive all public information which are transmitted from other personal computers 301 during the private mode, without exception. In other words, in the case of a conference or the like, information is often exchanged between specific participants without inquiring the speaker or all of the participants so as to obtain detailed information and/or confirm unclear points of discussion. Such an exchange of private information between the specific participants can be made in the private mode, so that a useful conference system may be provided with respect to the user.

In the processes described above, the judgement to determine whether the data transmitted from another program is the data in the public mode or the data in the private mode, may be made by assembling the mode attribute information within the state information. In other words, at the time of the transmission, data such as "mode=public" may be added in the case of the public mode and data such as "mode=private" may be added in the case of the private mode. In addition, because the transmission in the public mode is made by broadcasting or multicasting and the transmission in the private mode is made by unicasting, it is possible to distinguish the data received by UDP as the data transmitted from the program in the public mode and the data received by the TCP as the data transmitted from the program in the private mode. However, since the unicasting is also possible for the UDP, this distinguishing method cannot be employed if the UDP is used for the unicasting.

[Data Transmitting Operation]

Figure 35:
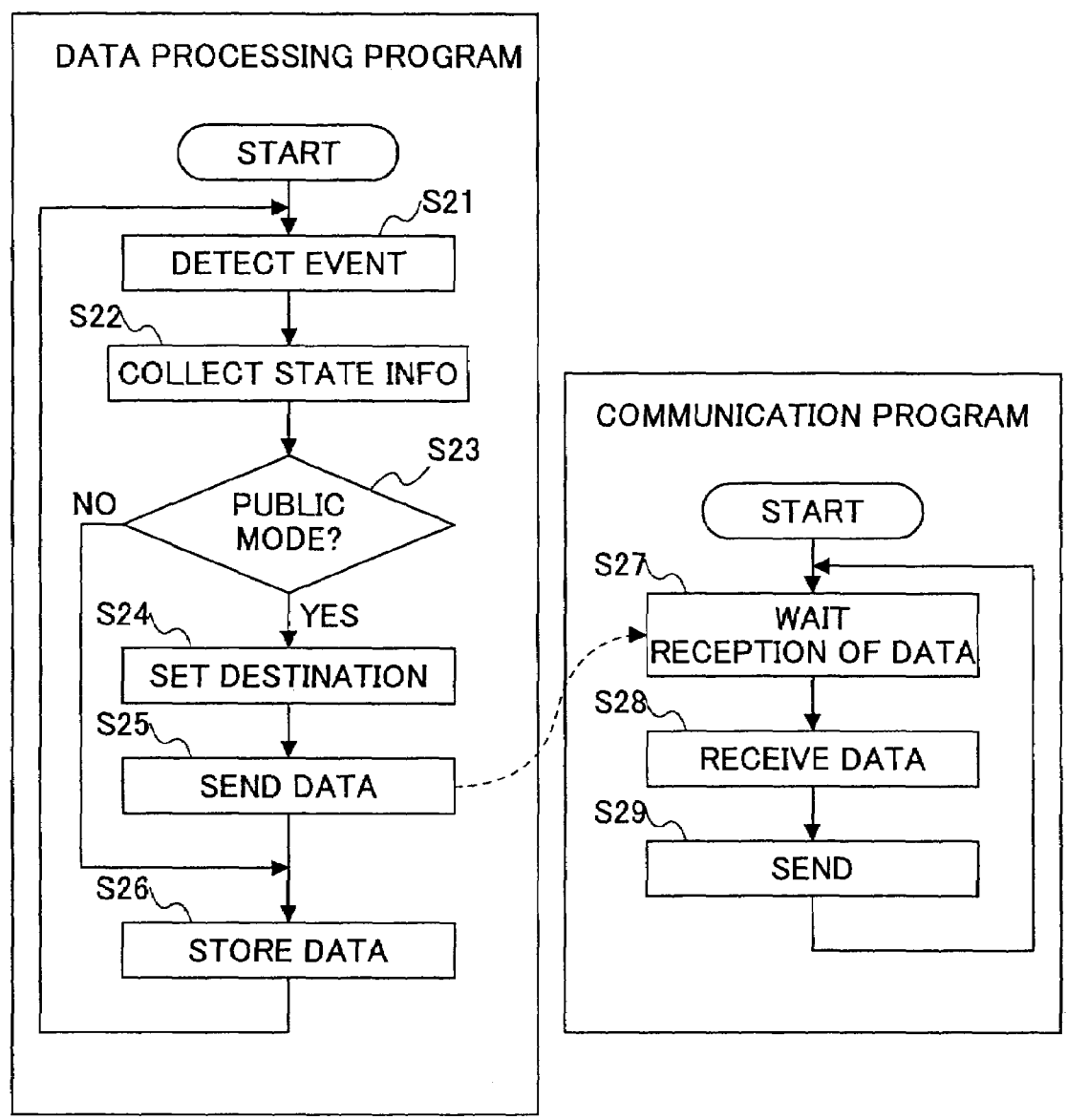
FIG. 35 is a flow chart for explaining a process at the time of a data transmission.

Next, a description will be given of the data transmitting operation of this embodiment, by referring to FIG. 35. FIG. 35 is a flow chart for explaining a process at the time of the data transmission. The data transmitting operation is the same for a case where two communication modes (public mode and local mode) are supported and for a case where three communication modes (public mode, local mode and private mode) are supported. Accordingly, a description will be given for the case where three communication modes are supported.

In FIG. 35, the data processing program within the data processing section 122 detects an event in a step S21, and collects state information such as contents information in a step S22. The event includes mouse events such as turning the page, enlarging and reducing the image and additional writing, and keyboard events such as inputting text. In addition, the state information includes information related to the state at the time when the event is generated, such as the page number being displayed, size of the displayed contents, display position, starting coordinate of the additional writing, intermediate coordinate, terminating point coordinate, color, thickness and the like. The steps S21 and S22 form an operation information acquiring function. After collecting the state information, the communication mode of the personal computer 301 is judged. More particularly, a step S23 decides whether or not the communication mode is the public mode, and if the decision result in the step S23 is YES, a transmitting destination is set with respect to the state information in a step S24. The data is sent to the communication program of the transmitting section 125 within the communication section 121 in a step S25, and the data processing program stores the state information in the memory as the transmitting data in a step S26, and the process returns to the step S21. In this case, the transmitting destination indicates the broadcasting address or the multicasting address.

On the other hand, the communication program assumes a data wait state in a step S27, and receives the data from the data processing program in a step S28. The received data is transmitted to the broadcasting address or the multicasting address, and the process returns to the step S27.

The step S23 when the decision result is YES, and the steps S24, S25 and S27 through S29 form a public mode transmitting step or a public mode transmitting means (or section), and continuously transmit the operation information as the public information in response to the acquisition of the operation information. Hence, in the public mode, the user does not need to carry out an elucidated transmitting operation, and the operation information is transmitted at the time when the operation information is acquired. For example, the information can be transmitted continuously without having to operate the transmit buttons 134, thereby eliminating the need to perform a troublesome operation of operating the transmit buttons 134.

If the personal computer 301 is not in the public mode and the decision result in the step S23 is NO, the process advances to the step S26. Thus, the data processing program does not send the data to the communication program, and the data is stored in the memory as the operation information in the step S26. The step S23 when the decision result is NO forms a local mode transmitting step or a local mode transmitting means (or section), and prohibits the data transmission in the local mode. Hence, no data transmission is made in the local mode, so as not to affect other personal computers 301.

For example, mode attribute information such as "mode=local" is added to the state information in the case of the local mode, and mode attribute information such as "mode=private" is added to the state information in the case of the private mode. The mode attribute information indicates the communication mode at the time when the stored data is transmitted, but it is not essential to use such mode attribute information. For example, three kinds of arrays may be provided for the three communication modes, namely, the local, private and public modes, so as to store the data in the array dependent on the communication mode at the time when the data is transmitted.

[Data Transmitting Operation Accompanying Elucidated Operation]

Figure 36:
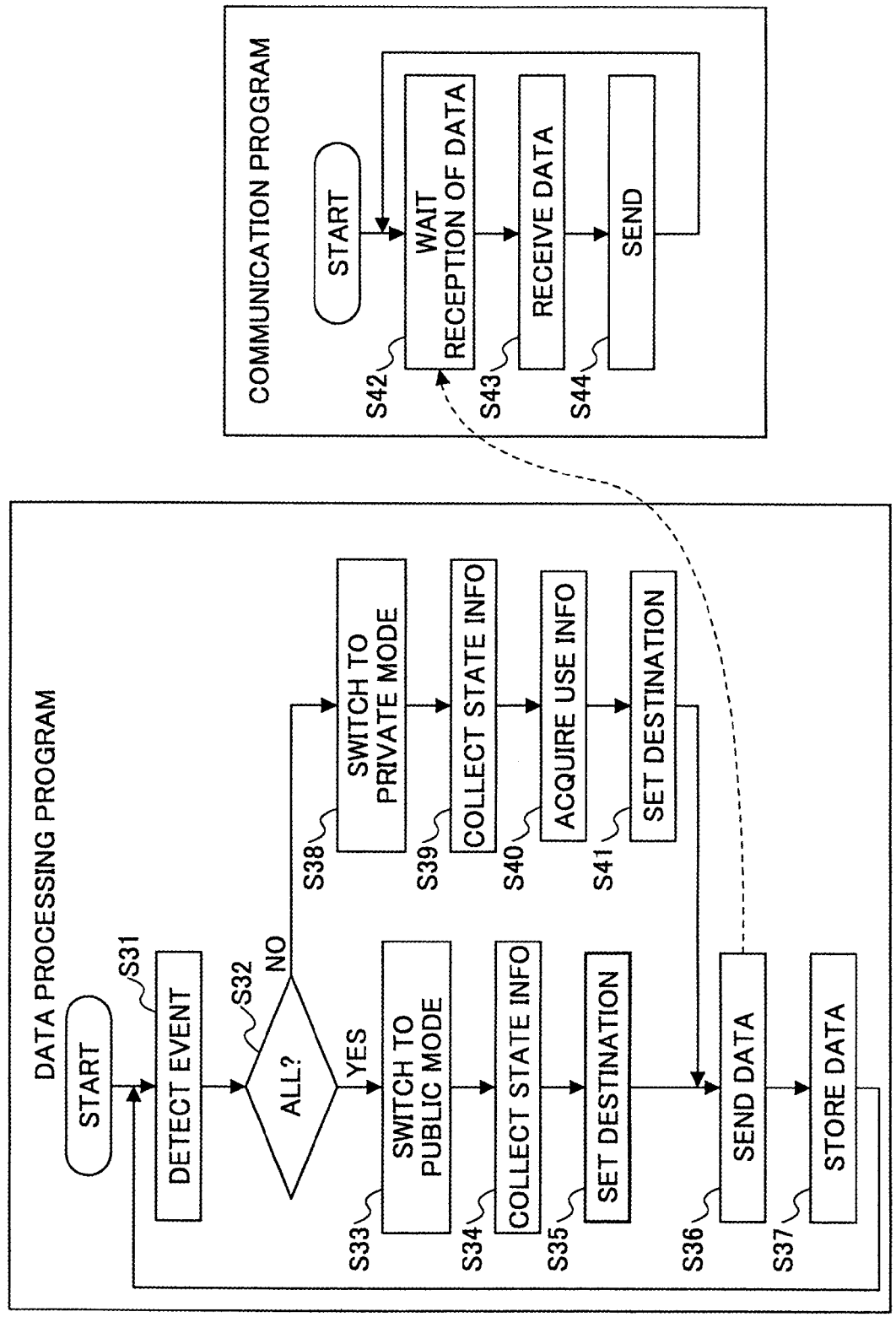
FIG. 36 is a flow chart for explaining the process at the time of the data transmission accompanying an elucidated operation.

A description will be given of the data transmitting operation for a case where one of the transmit buttons 134 shown in FIG. 29 is operated, by referring to FIG. 36. FIG. 36 is a flow chart for explaining the process at the time of the data transmission accompanying the elucidated operation.

In FIG. 36, when one of the transmit buttons 134 is clicked by the mouse 312, this event is detected in a step S31. A step S32 decides whether or not the operated transmit button 134 is the select-all button 134a. If the decision result in the step S32 is YES, a step S33 switches the communication mode to the public mode, a step S34 collects the state information, and a step S35 sets the transmitting destination. The transmitting destination is the broadcasting address or the multicasting address. In other words, the select-all button 134a may be used when the elucidated transmission is to be made with respect to all of the programs (personal computers 304) within the network 314 and in which the communication is established. A step S36 sends the data set with the transmitting destination to the communication program, and a step S37 stores the state information in the memory as the transmitting data, and the process returns to the step S31.

If one of the buttons 134b through 134d other than the select-all button 134a is operated and the decision result in the step S32 is NO, a step S38 switches the communication mode to the private mode. Of course, it is not essential to switch the communication mode to the private mode. A step S39 collects the state information, and a step S40 acquires the user information. The user information includes the IP address and the port number used for the reception. A step S41 sets the transmitting destination, and the process advances to the step S36. Hence, the step S36 sends the data set with the transmitting destination to the communication program, and the step S37 stores the state information in the memory as the transmitting data. In this case, the unicasting is made because the data transmitting destination is an address unique to the user.

The step S32 when the decision result is NO and the step S38 form a private mode switching step or a private mode switching means (or section), and the communication mode is automatically switched to the private mode when the data is transmitted to a specific personal computer 301 in response to the operation of one of the buttons 134b through 134d. Hence, the communication mode is quickly switched to the private mode in which the data is exchanged between specific personal computers 301.

The step S31 forms a data transmission waiting step or a data transmission waiting means (or section), and the data transmission is put on wait until the step S13 acquires the operation information (operation information of one of the buttons 134b through 134d) of the user for transmitting the data to a specific personal computer 301. In other words, in the private mode in which the specific personal computers 301 exchange data, the user operation becomes difficult in the personal computer 301 which receives the data continuously transmitted from the other personal computer 301. For this reason, the data is transmitted only when the user wishes to make the elucidated transmission, so as to facilitate the communication between the specific personal computers 301.

On the other hand, the communication program assumes a data wait state in a step S42, and receives the data from the data processing program in a step S43. The received data is transmitted to the broadcasting address or the multicasting address, and the process returns to the step S42.

In the processes described heretofore, the data (state information) related to the operation in the local mode, the transmission and reception in the private mode, and the transmission and reception in the public mode are all stored in the memory. However, it is not essential to store all of the state information. For example, it is possible to store only the newest data for each communication mode. But when the application of the present invention to the conference system or the like is taken into consideration, it may be preferable to store all of the state information so that the stored state information may serve as a kind of minutes of the proceedings. It is desirable to store at least the public data received in the private mode or the local mode.

[Recording And Reproducing Function]

The recording of the information that is transmitted and received was described above in conjunction with FIGS. 20 through 26. Hence, a description will only be given of the additional or differing features due to the provision of the public, private and local modes. For the sake of convenience, it is assumed that the user operation and the transmitted and received data are all recorded in each of the three communication modes. In addition, in the user interface of the application program shown in FIG. 29, it is assumed that the recording and reproducing function is allocated to the function button 135 labeled "F1".

Figure 37:
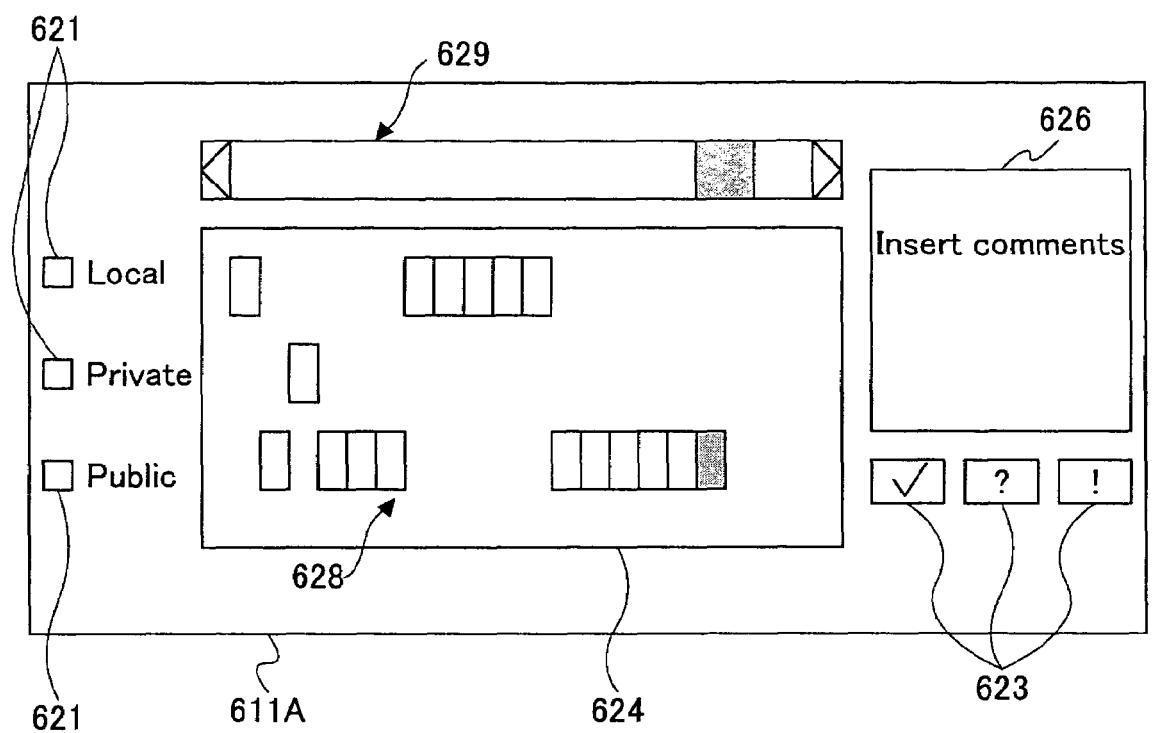
FIG. 37 is a diagram showing a display image of a log.

When the user clicks the function button 135 labeled "F1" by the mouse 312, a frame or panel is displayed as a pop-up window 611A in the user interface, as shown in FIG. 37. FIG. 37 is a diagram showing a display image, that is, the user interface, of a log. In FIG. 37, those parts which are the same as those corresponding parts in FIG. 22 are designated by the same reference numerals, and a description thereof will be omitted. Unlike the pop-up window 611 shown in FIG. 22, the pop-up window 611A displays a log (or list of operation records) for each communication mode by a list displaying step or a list displaying means (or section) using the recording and reproducing function described above.

When one of check boxes 621 shown in FIG. 37 is checked by the mouse 312, it is possible to view only the log of the desired communication mode. It is possible to display a text chip such as the participant who transmitted the data and the date and time of the transmission when a desired recording plot 628 within a log display field 624 is pointed by the mouse 312. Although the log is displayed for each communication mode in this particular case, it is possible to display the log for each participant who made the transmission, as in the case shown in FIG. 22. It is also possible to display the log separately for the operation, transmission and reception. Since the log of the operation in each communication mode is displayed as a list on the display device 310, it is possible to later confirm the past user operation such as switching of the communication mode, the changes in the received data, and the like.

The operation of looking back on the records is a personal act. Hence, although a slider 629 for reproduction is displayed in FIG. 37, it is possible to display the slider 629 only in the local mode, so that the user may look back at the records only during the local mode. Alternatively, the slider 629 may also be displayed in the local mode but made operable (or active) only during the communication modes other than the local mode. The slider 629 forms a past data inspecting step or a past data inspecting means (or section) which enables looking back at the operation information related to the personal computer 301, transmitted and received data in the public mode, and transmitted and received data in the private mode, based on the stored data, at any time during the local mode. As a result, by enabling the arbitrary looking back of the data, the operation during the local mode is facilitated.

[Operation when Mode Button is Operated]

Figure 38:
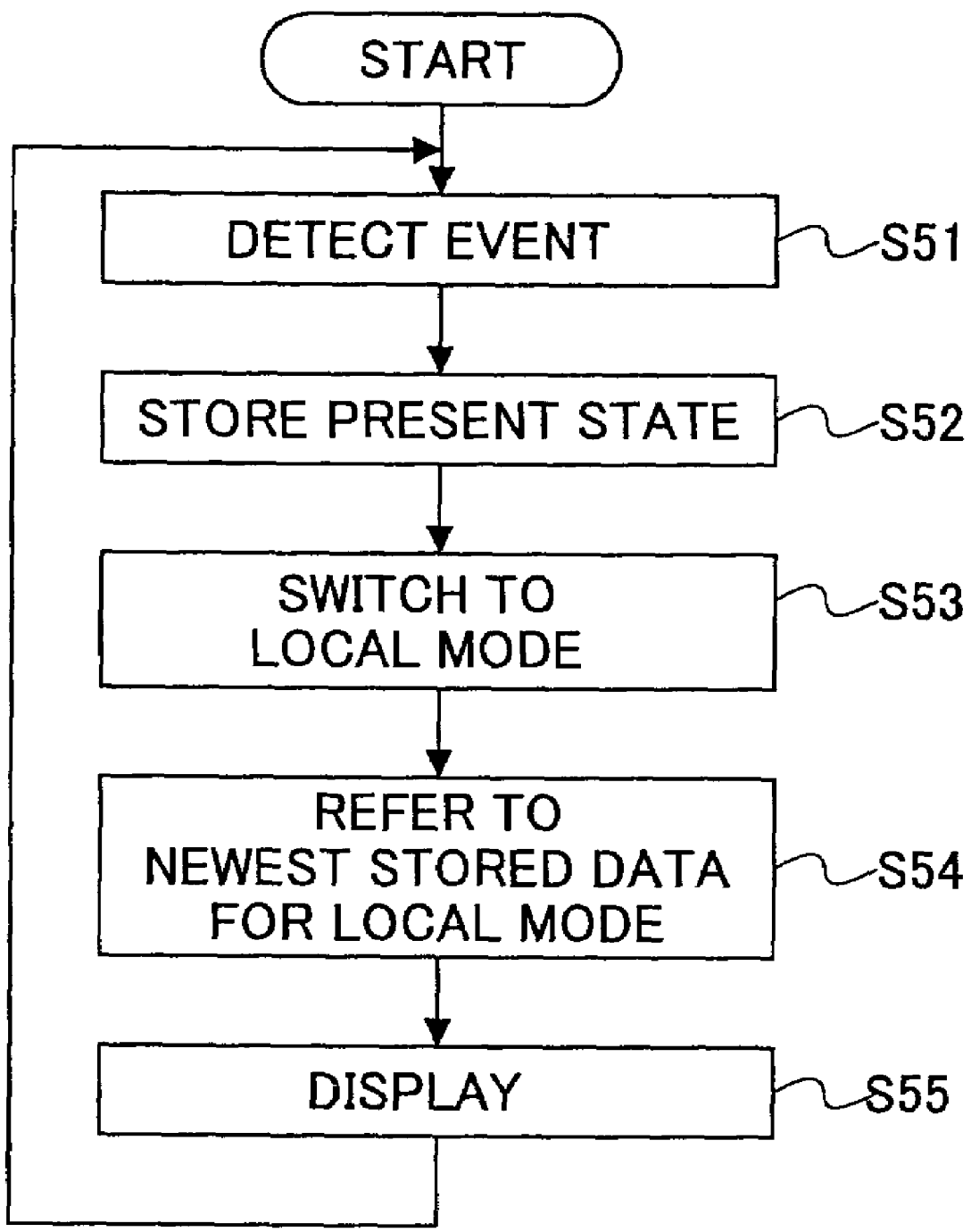
FIG. 38 is a flow chart for explaining a process when a local mode button is operated.
Figure 40:
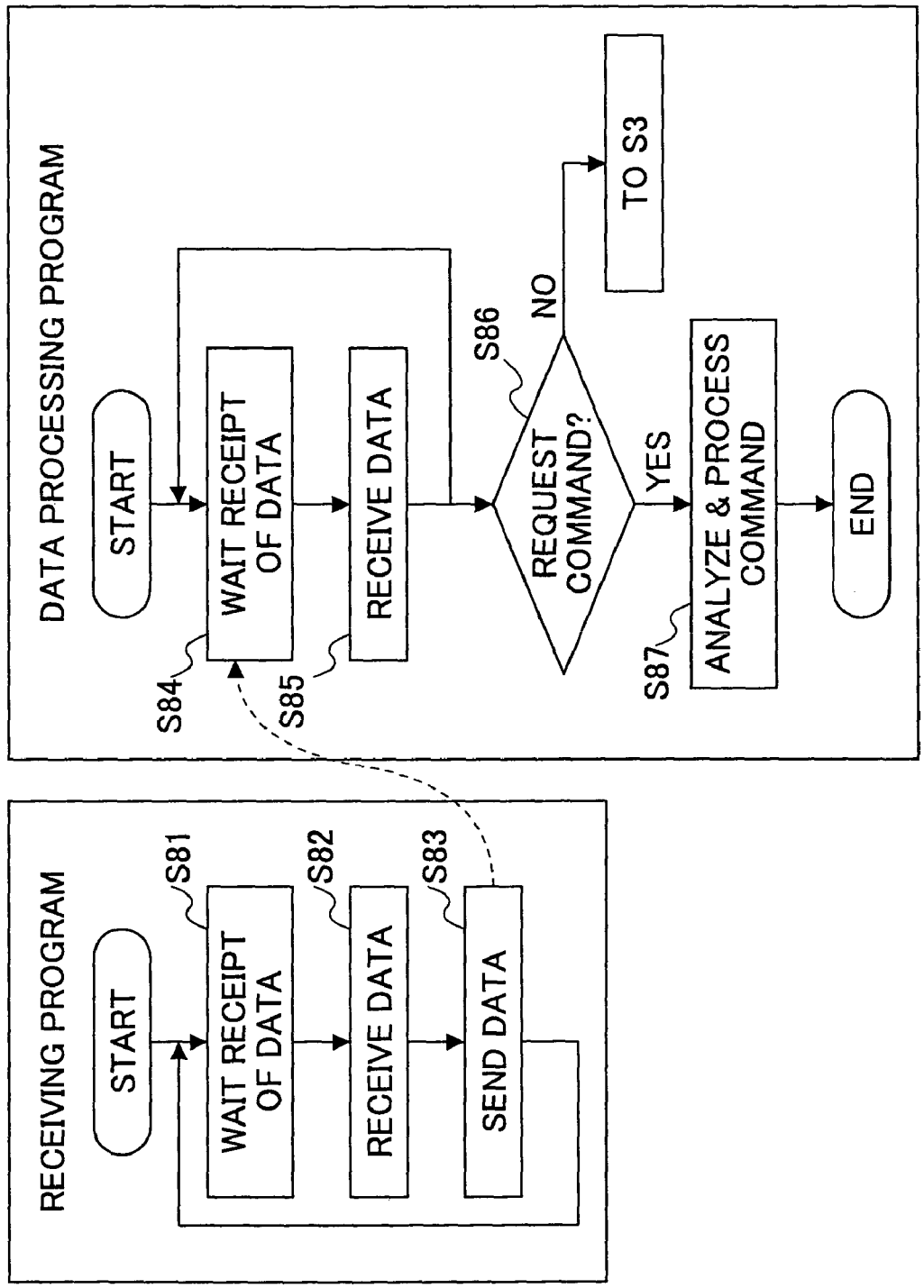
FIG. 40 is a flow chart for explaining a process on a receiving end.

A description will be given of the operation when the mode button 133 shown in FIG. 29 is operated, by referring to FIGS. 38 through 40. FIG. 38 is a flow chart for explaining a process when the local mode button 133b is operated. FIG. 39 is a flow chart for explaining a process when the public mode button 133a is operated. Moreover, FIG. 40 is a flow chart for explaining a process on a receiving end.

First, a description will be given of the operation when the local mode button 133b is clicked by the mouse 312, by referring to FIG. 38. When the user operation is accepted according to the mode selecting function and the local mode button 133b is clicked, this event is detected by the operation information acquiring function in a step S51 of the data processing program. The present state (state information) is stored in the memory in a step S52. Thereafter, the communication mode of the personal computer 301 is switched to the local mode in a step S53. The steps S52 and S53 form a mode switching step or a mode switching means (or section). Hence, when the operation information related to the switching of the communication mode is acquired, the output data at the time of the operation is stored and the communication mode is thereafter switched to the selected communication mode, so that the operation can be quickly continued (resumed) when the communication mode returns to the original communication mode. When storing the present state in the memory, it is possible to store the communication mode therewith or, to prepare an array for each communication mode and store the present state in the corresponding array depending on the communication mode.

Next, a reference is made to the newest state information stored the last time when the communication mode was the local mode, in a step S54. Although the method of making this reference differs depending on the manner in which the state information is stored, in a case where the array exclusively for the local mode is provided, the step S54 refers to the last portion of the array containing the newest information. Based on the state information obtained in the step S54, the contents and the like are displayed in a step S55 in the state the last time when the communication mode was the local mode, and the process returns to the step S51. Hence, the steps S54 and S55 form a switching time output control step or a switching time output control means (or section). Thus, when the operation information related to the switching of the communication mode is acquired and the switching is made to the selected communication mode, the newest data (state information) in the public mode is output, so that the participant may quickly join the discussions of the conference or the like. In addition, when switching from the public mode to the local mode, the personal computer 301 immediately returns to the state where the participant was working immediately before the switching of the communication mode, so that the participant may easily continue (or resume) his work.

A description will be given of the operation when the public mode button 133a is operated, by referring to FIGS. 39 and 40. When the user operation is accepted according to the mode selecting function and. the public mode button 133a is clicked, this event is detected by the operation information acquiring function in a step S61 of the data processing program shown in FIG. 39. The communication mode is switched to the public mode in a step S62. User (program) information related to the presently communicatable user is detected in a step S63. A step S64 decides whether or not a communicatable user is found. If the decision result in the step S64 is YES, an information request command is generated in a. step S65. The transmitting destination is set to the communicatable user in a step S66. The data of the communicatable user is sent to the communication program in a step S67, and the process returns to the step S61.

On the other hand, the communication program assumes a data wait state in a step S71 shown in FIG. 39, and receives the data from the data processing program in a step S72. The information request command is sent to the transmitting destination, that is, the communicatable user detected by the data processing program, in a step S73, and the process returns to the step S71.

The transmitting destination may be selected from a list of transmitting destinations corresponding to the communicatable users (users of the personal computers 301 in which the communication is established) held by the personal computer 301. In this particular case, the information request command returns the newest state information for the public mode.

The steps S65 through S67 and S71 through S73 form an information request command transmitting step or an information request command transmitting means (or section). Hence, when the operation information related to the switching of the communication mode to the public mode is acquired, the information request command which requests the newest state information (data) for the public mode is transmitted to the program running on another personal computer 301. As a result, when the participant joins the conference or the like after the conference has started, this participant does not have the public information, but can make an inquiry for the newest data for the public mode to the other personal computers 301. In this case, the step S66 may set the transmitting destination of the information request command by selecting one of the communicatable personal computers 301 in the network 314 from the list of communicatable computers 301 held by the personal computer 301.

In the receiving program of the other personal computer 301 which receives the data transmitted from the communication program shown in FIG. 39, the receiving section 124 within the communication section 121 assumes a reception wait state in a step S81 as shown in FIG. 40. The data transmitted from the communication program is received in a step S82, and the received data is sent to the data processing program shown in FIG. 40.

The data processing program assumes a data wait state in a step S84 shown in FIG. 40, and the data from the receiving program is received in a step S85. A step S86 decides whether or not the command data is received. If the decision result in the step S86 is YES, the received command data is analyzed and processed in a step S87, and the process ends. On the other hand, if the decision result in the step S86 is NO, the process advances to the normal process, that is, the step S3 shown in FIG. 30.

In this particular case, the data processing program of the other personal computer 301 shown in FIG. 40 acquires the newest state information for the public mode, and returns this newest state information to the communication program (personal computer 301) which sent the information request command.

The step S86 when the decision result is YES and the step S87 form an information request command responding step or an information request command responding means (or section). Hence, when the information request command is received, the newest state information for the public mode held in this other personal computer 301 is returned to the transmitting source, that is, the personal computer 301 which transmitted the information request command, to thereby notify the newest state information.

By carrying out the series of processes described above, the program which sends the information request command can acquire the newest state information for the public mode. This feature is particularly effective in a case where the program has just been started and no state information for the public mode is held yet, because this feature can provide a means of obtaining the contents information in the present public mode.

If no communicatable user exists and the decision result in the step S64 is NO in FIG. 39, the data processing program refers to the newest state information for the public mode stored in the personal computer 301, in a step S68. The newest state information obtained in the step S68 is displayed on the display device 310 in a step S69, and the process returns to the step S61. The step S64 when the decision result is NO and the steps S68 and S69 form a first substituting step or a first substituting means (or section) to utilize the newest data for the public mode held in the personal computer 301 itself, as a substitute measure, when there is no communicatable personal computer 301 to which the information request command may be sent.

In a case where the personal computer 301 itself does not hold the newest state information for the public mode, the newest state information for the local mode may be obtained and displayed instead. In other words, if the list of communicatable personal computers 301 held in the personal computer does not include the personal computer 301 to which the information request command may be sent, and the newest state information for the public mode is not held in the personal computer 301, the newest state information for the local mode held in the personal computer 301 may be obtained and displayed instead by a second substitute step or a second substitute means (or section), so as to effectively utilize the newest data for the local mode.

As in the case where the local mode button 133b is clicked, it is possible to display the newest data for the public mode held in the personal computer 301 when the public mode button 133a is clicked. However, the personal computer 301 does not have the information for the public mode immediately after the program of the personal computer 301 is started. Thus, in this case, the state information for the public mode cannot be obtained until the information in the public mode is received from other programs.

[Summary of Operations in the Communication Modes]

Figure 41:
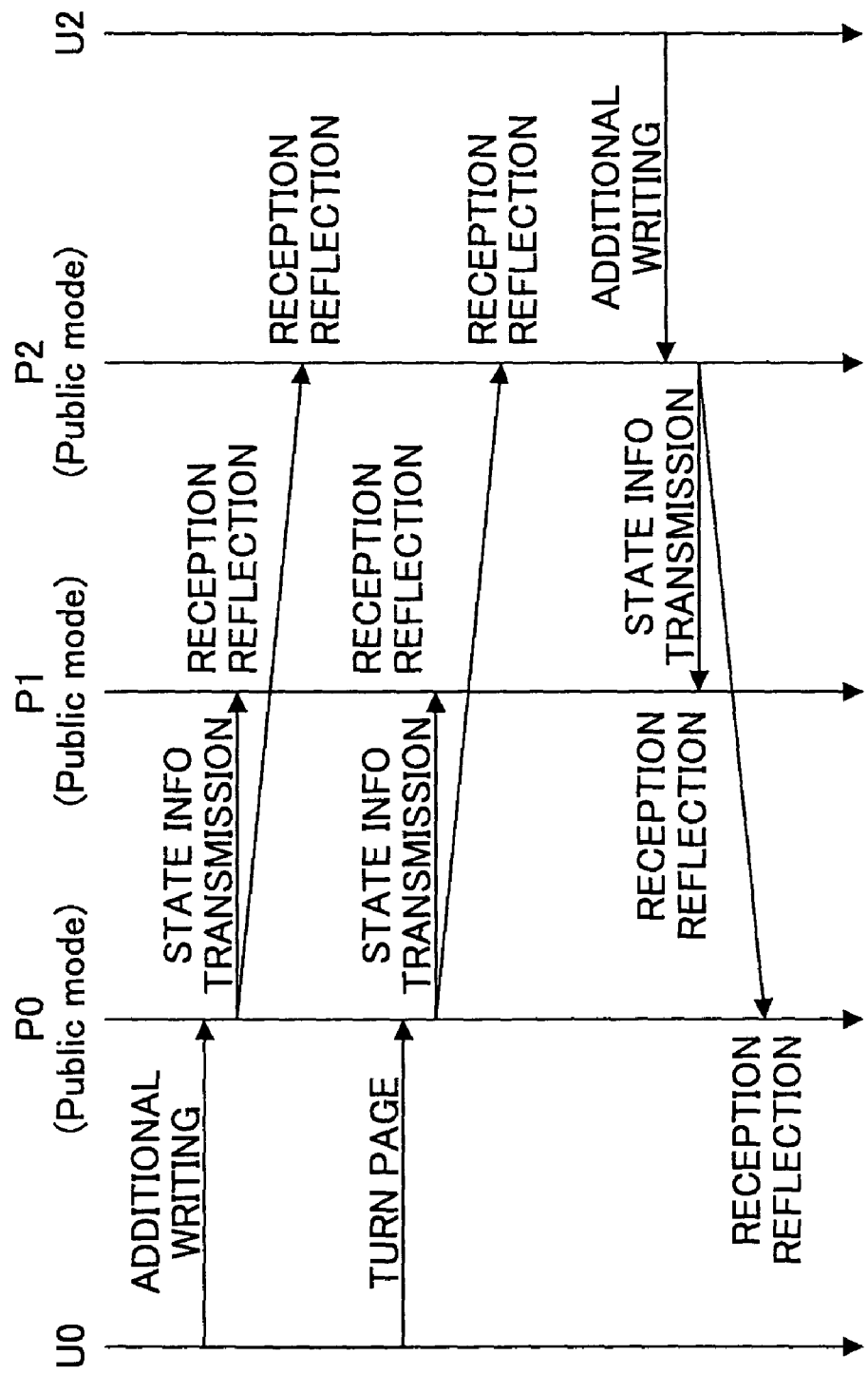
FIG. 41 is a time chart for explaining a first embodiment of the operation in each mode.
Figure 42:
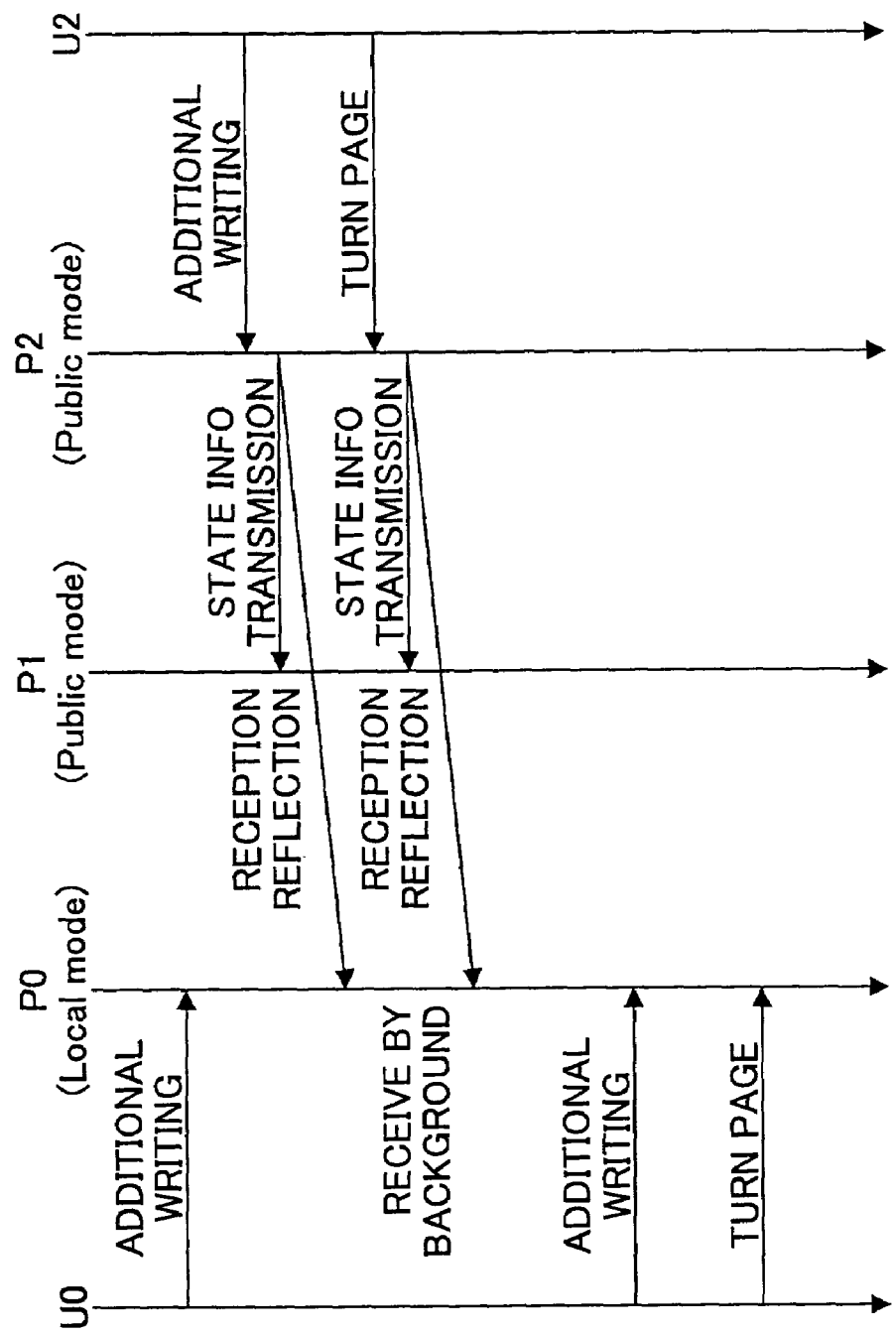
FIG. 42 is a time chart for explaining a second embodiment of the operation in each mode.
Figure 43:
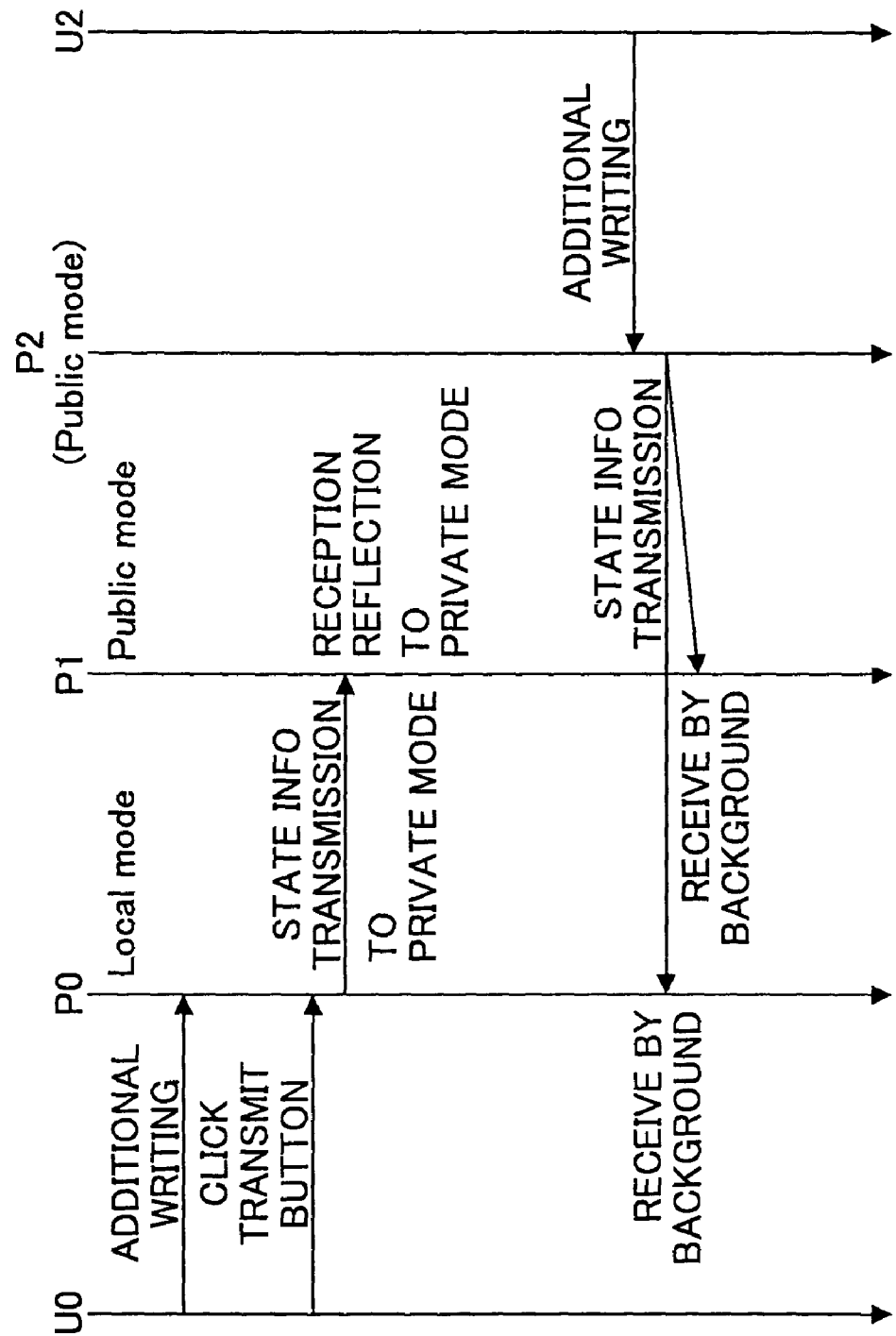
FIG. 43 is a time chart for explaining a third embodiment of the operation in each mode.

Next, a brief summary of the operations in each of the communication modes will be given, by referring to FIGS. 41 through 43. FIG. 41 is a time chart for explaining a first embodiment of the operation in each mode. FIG. 42 is a time chart for explaining a second embodiment of the operation in each mode. Further, FIG. 43 is a time chart for explaining a third embodiment of the operation in each mode.

A description will be given of the first embodiment of the operation for a case where three programs are started, the communication is established among the three programs, and all of the three programs are in the public mode, by referring to FIG. 41. The three programs include a program P0 used by a user U0, and other programs P1 and P2, where the program P2 is used by a user U2. The same designations will be used for FIGS. 41 through 43.

In FIG. 41, the user U0 makes an additional writing on the program P0, and the program P0 collects its own state information and multicasts the state information to the programs P1 and P2 by making a state information transmission. When the state information is received by the programs P1 and P2, each of the programs P1 and P2 immediately reflects the state information to the display thereof by making a reception reflection. Hence, the state such as the turning of the page is reflected to the display of the programs P1 and P2.

On the other hand, when the user U2 makes an operation such as the additional writing on the program P2, the program P2 collects its state information and multicasts the state information to the programs P0 and P1 by making a state information transmission. When the state information is received by the programs P0 and P1, each of the programs P0 and P1 immediately reflects the state information to the display thereof by making a reception reflection. Hence, in the public mode of each program, the received information is immediately reflected to the display thereof.

A description will be given of the second embodiment of the operation for a case where only the program P0 operated by the user U0 is in the local mode, by referring to FIG. 42. In this case, even when the user U0 makes an additional writing on the program P0, no information is transmitted to the other programs P1 and P2 because the program P0 is in the local mode. On the other hand, when the user U2 makes an operation such as the additional writing on the program P2, the program P2 collects its state information and multicasts the state information to the programs P0 and P1 by making a state information transmission, because the program P2 is in the public mode. When the state information is received by the program P1, the program P1 immediately reflects the state information to the display thereof by making a reception reflection, because the program P1 is in the public mode. However, the program P0 which receives the state information from the program P2 is in the local mode. For this reason, the program P0 receives the data from the program P2 by the background program, but does not reflect the received data to the display thereof.

A description will be given of the third embodiment of the operation for a case where the program P0 operated by the user U0 is initially in the local mode and the other programs P1 and P2 are in the public mode, by referring to FIG. 43. The description will be given particularly on the switching of the communication mode to the private mode, and the operation in the private mode.

In this case, even when the user U0 makes an additional writing on the program P0 as shown in FIG. 43, no information is transmitted to the other programs P1 and P2 because the program P0 is in the local mode. Thereafter, when the program P1 is specified and the corresponding transmit button is clicked, the program P0 corrects its state information and sends the state information to only the specified program P1. The program P0 operated by the user U0 is switched to the private mode at the time when the transmit button specifying the program P1 is clicked. When the program P1 receives the state information from the program P0, the program P1 switches to the private mode, and changes the display based on the received state information by making a reception reflection. Thereafter, when the user U2 makes an operation such as the additional writing on the program P2, the program P2 collects its state information and multicasts the state information by a state information transmission. However, since the programs P0 and P1 are in the private mode, the programs P0 and P1 merely receive the state information from the program P2 by respective background programs.

It is possible to escape from the private mode by clicking the local mode button 133b or the public mode button 133a. In addition, it is also possible to switch the communication mode to the public mode by clicking the select-all button 134a.

The embodiment of the computer-readable storage medium according to the present invention stores a computer program for causing a computer to carry out the processes of the personal computer 301 described above. Any suitable recording media capable of storing a computer program may be used for the computer-readable storage medium. The recording media may or may not be portable. For example, magnetic, optical and magneto-optical recording media may be used for such recording media. In addition, the computer program may be downloaded from another computer via a network.

Further, the present invention is not limited to these embodiments, but various variations and modifications may be made without departing from the scope of the present invention.

What is claimed is:

1. A computer-implemented data communication method for exchanging data among a plurality of computers which are mutually coupled via a network, each of the computers comprising a communicating function configured to transmit and receive data to and from one or more other computers, a data processing function configured to process data which are transmitted and received, and an output function configured to output data to an output section including a display depending on a process of the data processing function, said data communication method comprising:

a storing step to store data received by the communicating function by the data processing function in one computer when receiving data from one or more other computers by the communicating function;

a mode judging step to judge whether or not to output the received data to the output function of said one computer depending on a mode attribute of the received data and a communication mode of said one computer;

a public mode receiving step to immediately output the received data to the output function of said one computer and to reflect the received data to the display made by the output function of said one computer when said mode judging step judges that the mode attribute of the received data indicates a public mode and said one computer is in the public mode; and a local mode receiving step not to output the received data to the output function of said one computer while maintaining the display made by the output function of said one computer independent of the received data when said mode judging step judges that the mode attribute of the received data indicates the public mode but said one computer is in a local mode.

2. The data communication method as claimed in claim 1, wherein said local mode receiving step stores the received data in said one computer when said mode judging step judges that the mode attribute of the received data indicates the public mode but said one computer is in the local mode.

3. The data communication method as claimed in claim 2, wherein each of the computers has a private mode in which data is exchanged between specific computers coupled to the network, said data communication method further comprising:

a private mode receiving step of not outputting the received data to the output function of said one computer when said mode judging step judges that the mode attribute of the received data indicates the public mode but said one computer is in the private mode.

4. The data communication method as claimed in claim 1, wherein each of the computers exchanges data related to content information using an encapsulated document, said encapsulated document comprising a program code file related to the communicating function, the data processing function and the output function which are analyzed and executed by each of the computers and a content information file related to substance data of a document, which files are encapsulated as a single document.

5. The data communication method as claimed in claim 1, wherein each of the computers comprises an operation information acquiring function configured to acquire operation information related to a user operation, and the data transmitted and received by the communicating function includes the operation information acquired by the operation information acquiring function.

6. The data communication method as claimed in claim 5, further comprising:

a public mode transmitting step to continuously transmit the operation information to the communicating function as public information in response to acquisition of the operation information by the operation information acquiring function of said one computer in a public mode, when said one computer transmits data to another computer by the communicating function.

7. The data communication method as claimed in claim 1, further comprising:

a local mode transmitting step to prohibit transmission of data from said one computer in a local mode.

8. The data communication method as claimed in claim 3, further comprising:

a private mode switching step to automatically switch the communication mode of said one computer to the private mode when the communicating function of said one computer receives data unicasted from another computer.

9. The data communication method as claimed in claim 3, further comprising:

a private mode switching step to automatically switch the communication mode of said one computer to the private mode when the communicating function of said one computer transmits data to a specific computer.

10. The data communication method as claimed in claim 5, further comprising:

a data transmission waiting step to wait transmission of data in a private mode until the operation information acquiring function of said one computer acquires the operation information for transmitting the data to a specific computer.

11. The data communication method as claimed in claim 5, wherein each of the computers comprises a mode selecting function configured to switch the communication mode to a selected communication mode by accepting a user operation, and said mode judging step judges the communication mode of said one computer based on the selected communication mode accepted by the mode selecting function of said one computer.

12. The data communication method as claimed in claim 11, further comprising:

a mode switching step to switch the communication mode of said one computer to the selected communication mode after storing the data output to the output section at a time when the user operation is made, if the operation information acquiring function of said one computer acquires the operation information related to switching of the communication mode by the mode selecting function.

13. The data communication method as claimed in claim 11, further comprising:

a switching time output control step to refer to newest data stored for the selected communication mode and to output the newest data to the output section by the output function of said one computer, when switching the communication mode to the selected communication mode by the mode selecting function of said one computer after the operation information acquiring function of said one computer acquires the operation information related to the switching of the communication mode to the selected communication mode.

14. The data communication method as claimed in claim 11, further comprising:
an information request command transmitting step to transmit, using the communicating function of said one computer, an information request command which requests newest data for a public mode with respect to a program running on another computer, if the operation information acquiring function of said one computer acquires operation information related to the switching of the communication mode to the public mode by the mode selecting function of said one computer.

15. The data communication method as claimed in claim 14, wherein said information request command transmitting step determines the computer at a transmitting destination where the information request command is to be transmitted, by selecting the computer from a list of communicatable computers held by said one computer.

16. The data communication method as claimed in claim 15, further comprising:
a first substituting step to refer to newest data for the public mode held in said one computer and to output the newest data to the output section by the output function of said one computer, if the list includes no computer to which the information request command is to be transmitted.

17. The data communication method as claimed in claim 16, further comprising:
a second substituting step to refer to newest data for a local mode held in said one computer and to output the newest data to the output section by the output function of said one computer, if the list includes no computer to which the information request command is to be transmitted and the newest data for the public mode is not held in said one computer.

18. The data communication method as claimed in claim 15, further comprising:
an information request command responding step to transmit the newest data for the public mode stored in said one computer using the communicating function of said one computer, with respect to another computer at a transmitting source of the information request command, if the communicating function of said one computer receives the information request command.

19. A data communication apparatus for exchanging data with a plurality of apparatuses via a network, comprising:
a computer comprising a communicating function configured to transmit and receive data to and from the plurality of apparatuses, a data processing function configured to process data which are transmitted and received, and an output function configured to output data to an output section including a display depending on a process of the data processing function;
a storing section configured to store data received by the communicating function by the data processing function when receiving data from one of the plurality of apparatuses by the communicating function;
a mode judging section configured to judge whether or not to output the received data to the output function depending on a mode attribute of the received data and a communication mode of said data communication apparatus,
a public mode receiving section configured to immediately output the received data to the output function and to reflect the received data to a display made by the output function of said computer when said mode judging section judges that the mode attribute of the received data indicates a public mode and said data communication apparatus is in the public mode; and
a local mode receiving section configured not to output the received data to the output function while maintaining the display made by the output function of said computer independent of the received data when said mode judging section judges that the mode attribute of the received data indicates the public mode but said data communication apparatus is in a local mode.

20. The data communication apparatus as claimed in claim 19,
wherein said local mode receiving section stores the received data when said mode judging section judges that the mode attribute of the received data indicates the public mode but said data communication apparatus is in local mode.

21. The data communication apparatus as claimed in claim 20, which has a private mode in which data is exchanged with a specific apparatus coupled to the network, said data communication apparatus further comprising:
a private mode receiving section configured to not output the received data to the output function when said mode judging section judges that the mode attribute of the received data indicates the public mode but said data communication apparatus is in the private mode.

22. The data communication apparatus as claimed in claim 19, which exchange with the apparatuses data related to content information using an encapsulated document, said encapsulated document comprising a program code file related to the communicating function, the data processing function and the output function which are analyzed and executed by said data communication apparatus and the apparatuses and a content information file related to substance data of a document, which files are encapsulated as a single document.

23. The data communication apparatus as claimed in claim 18, further comprising:
a list displaying section configured to display a list of operation records for each communication mode.

24. The data communication apparatus as claimed in claim 19, further comprising:
a past data inspecting section configured to enable looking back at operation information related to the data communication apparatus, transmitted and received data in a public mode, and transmitted and received data in a private mode, based on the stored data, at any time during the local mode.

25. A data communication system for exchanging data among a plurality of computers which are mutually coupled via a network,
each of the computers comprising a communicating function configured to transmit and receive data to and from one or more other computers, a data processing function configured to process data which are transmitted and received, and an output function configured to output data to an output section including a display depending on a process of the data processing function,
each one of the computers receiving data by the communicating function comprising:
a storing section configured to store data received by the communicating function by the data processing function;
a mode judging section configured to judge whether or not to output the received data to the output function of said one computer depending on a mode attribute of the received data and a communication mode of said one computer;

a public mode receiving section configured to immediately output the received data to the output function of said one computer and to reflect the received data to a display made by the output function of said one computer when said mode judging step judges that the mode attribute of the received data indicates a public mode and said one computer is in the public mode; and a local mode receiving section configured not to output the received data to the output function while maintaining the display made by the output function of said one computer independent of the received data when said mode judging step judges that the mode attribute of the received data indicates the public mode but said one computer is in a local mode.

26. The data communication system as claimed in claim 25, wherein said local mode receiving section stores the received data in said one computer when said mode judging section judges that the mode attribute of the received data indicates the public mode but said one computer is in local mode.

27. The data communication system as claimed in claim 26, wherein each of the computers has a private mode in which data is exchanged between specific computers coupled to the network, said one computer further comprising:

a private mode receiving section configured to not output the received data to the output function of said one computer when said mode judging section judges that the mode attribute of the received data indicates the public mode but said one computer is in the private mode.

28. The data communication system as claimed in claim 25, wherein each of the computers exchanges data related to content information using an encapsulated document, said encapsulated document comprising a program code file related to the communicating function, the data processing function and the output function which are analyzed and executed by each of the computers and a content information file related to substance data of a document, which files are encapsulated as a single document.

29. A tangible computer-readable storage medium which stores a program for causing a computer to exchange data with a plurality of other computers which are mutually coupled via a network, said program comprising:

a communicating procedure causing the computer to transmit and receive data to and from one or more other computers;

a data processing procedure causing the computer to process data which are transmitted and received;

an output procedure causing the computer to output data to an output section including a display depending on a process of the data processing procedure;

a storing procedure causing the computer to store data received by the communicating procedure by the data processing procedure when receiving data from one or more other computers by the communicating procedure;

a mode judging procedure causing the computer to judge whether or not to output the received data to the output procedure depending on a mode attribute of the received data and a communication mode of the computer;

a public mode receiving procedure causing the computer to immediately output the received data to the output procedure and to reflect the received data to the display when said mode judging procedure judges that the mode attribute of the received data indicates a public mode and the computer is in the public mode; and a local mode receiving procedure causing the computer not to output the received data to the output procedure while maintaining the display independent of the received data when said mode judging procedure judges that the mode attribute of the received data indicates the public mode but the computer is in a local mode.

30. The tangible computer-readable storage medium as claimed in claim 29, wherein said local mode receiving procedure causes the computer to store the received data when said mode judging procedure judges that the mode attribute of the received data indicates the public mode but the computer is in the local mode.

31. The tangible computer-readable storage medium as claimed in claim 30, wherein each of the computers has a private mode in which data is exchanged between specific computers coupled to the network, said program further comprising:

a private mode receiving procedure causing the computer to not output the received data to the output procedure when said mode judging procedure judges that the mode attribute of the received data indicates the public mode but the computer is in the private mode.

* * * * *